Dec. 18, 1956 — E. H. PLACKE ET AL — 2,774,298
SELECTIVE FEED AND PRINT CONTROL MEANS IN ACCOUNTING MACHINES
Filed Jan. 28, 1955 — 34 Sheets—Sheet 8

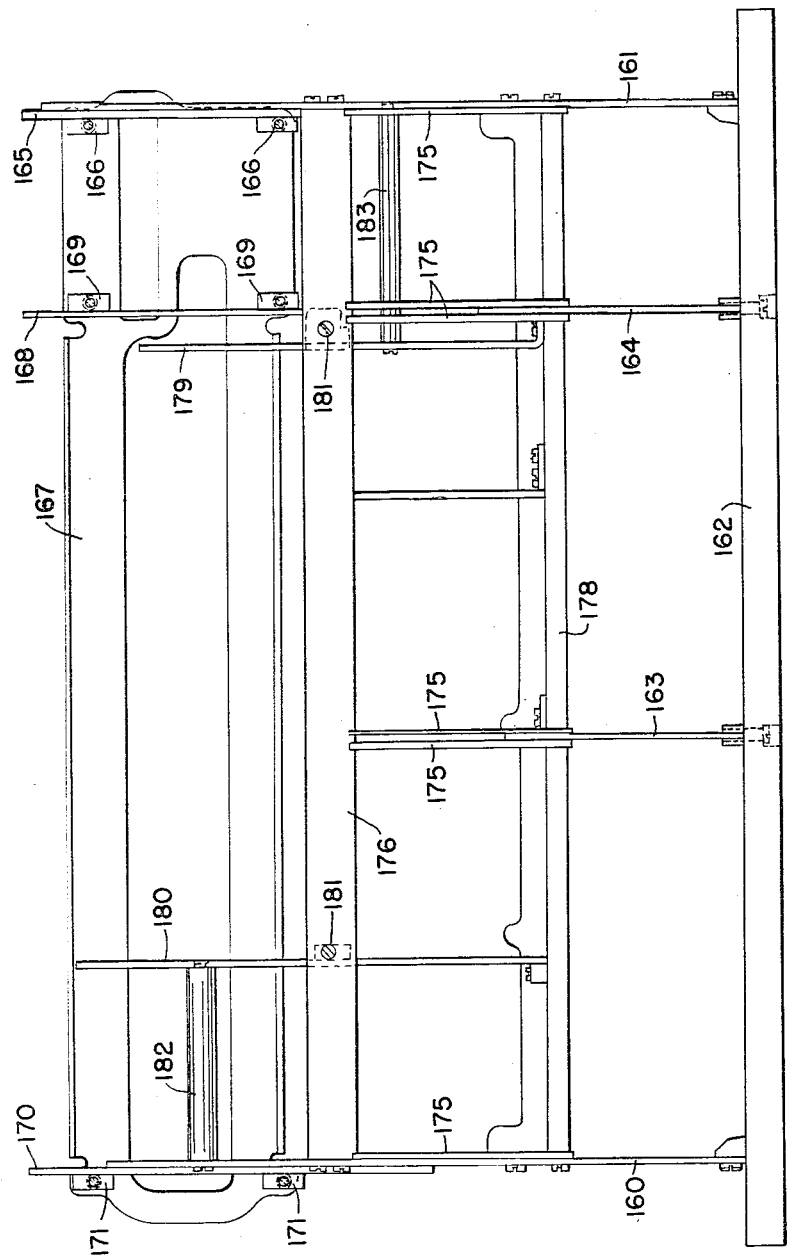

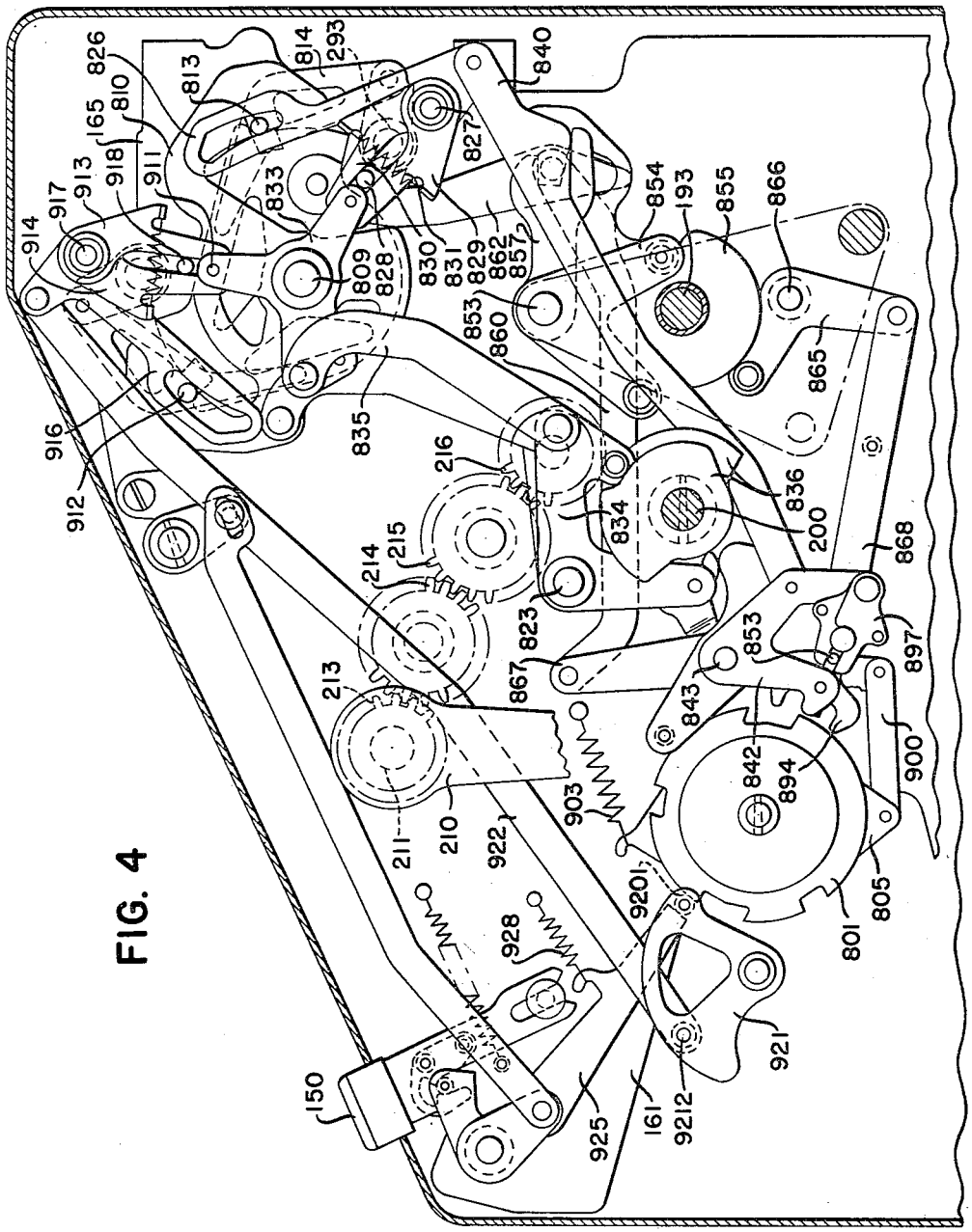

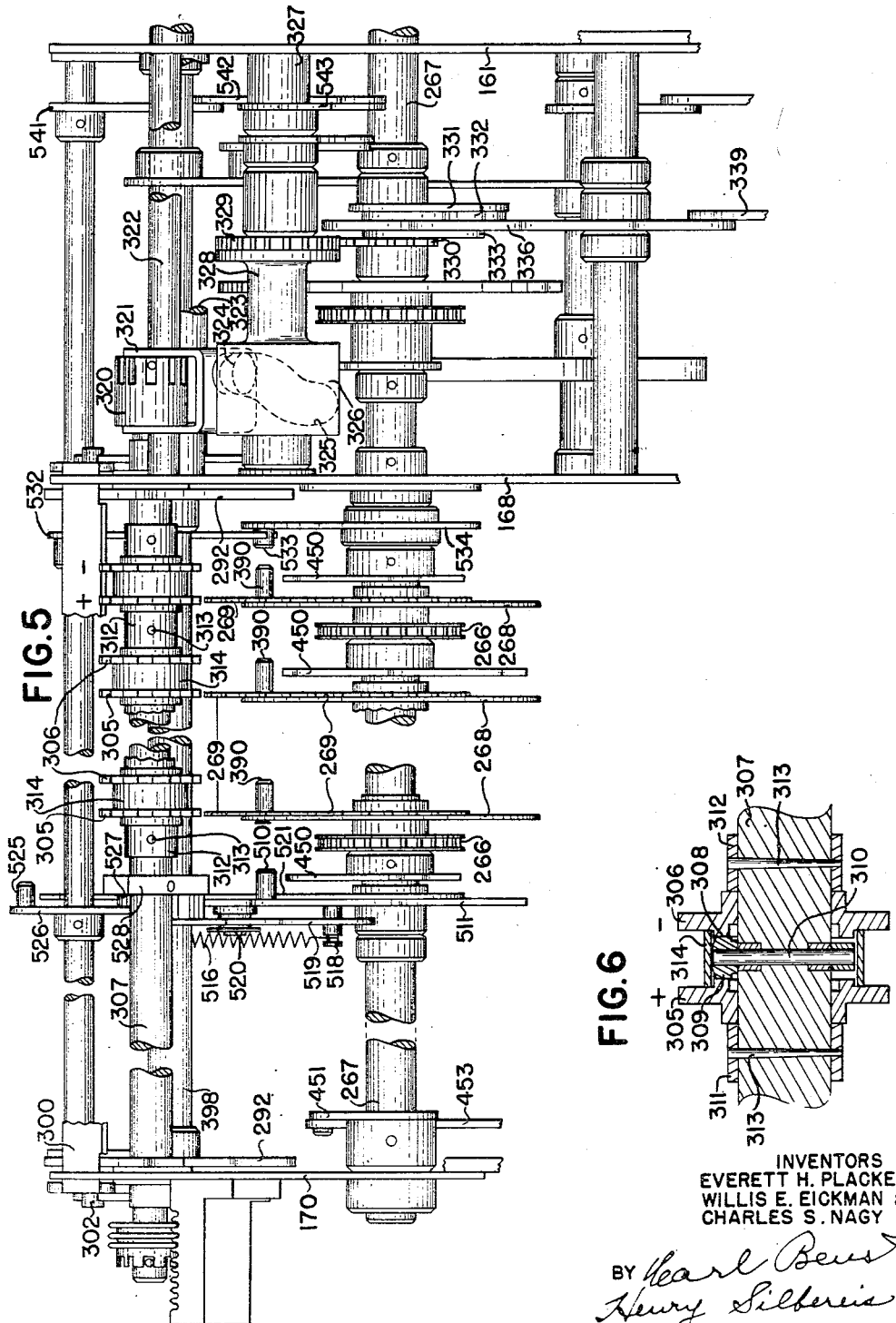

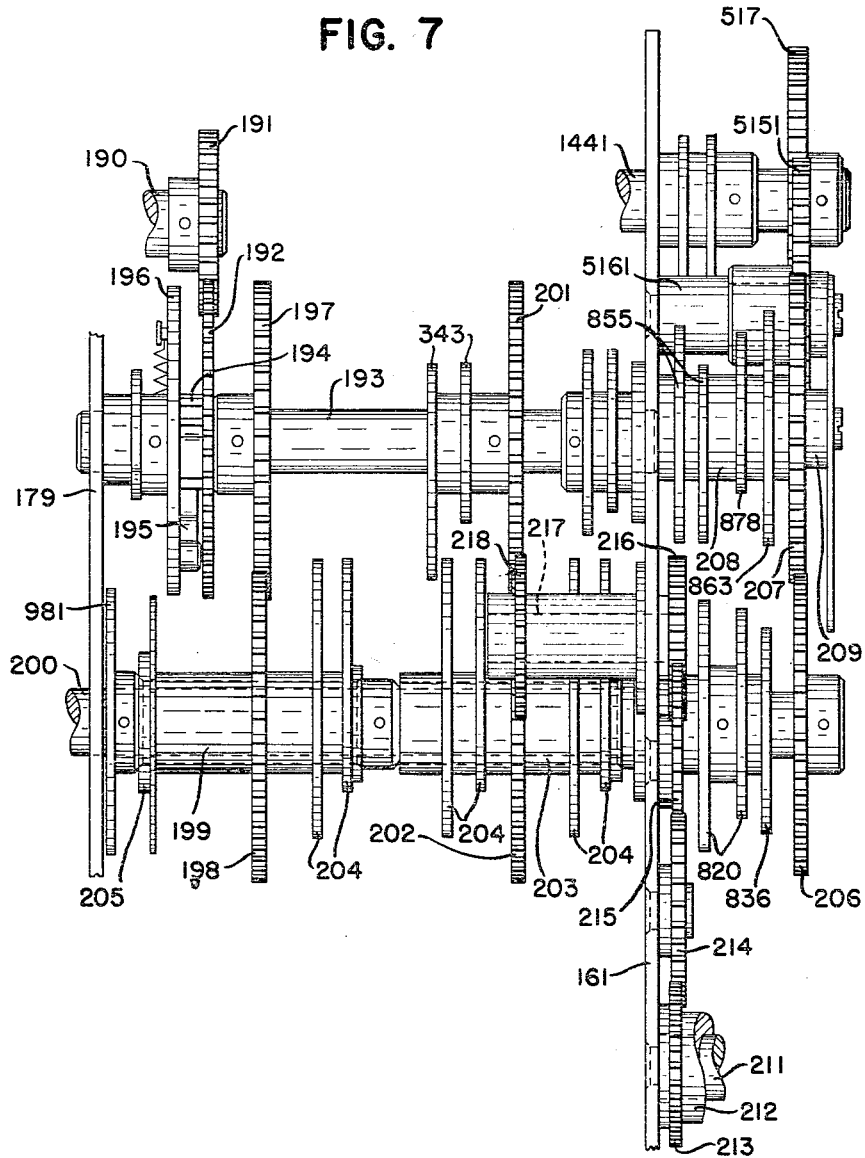

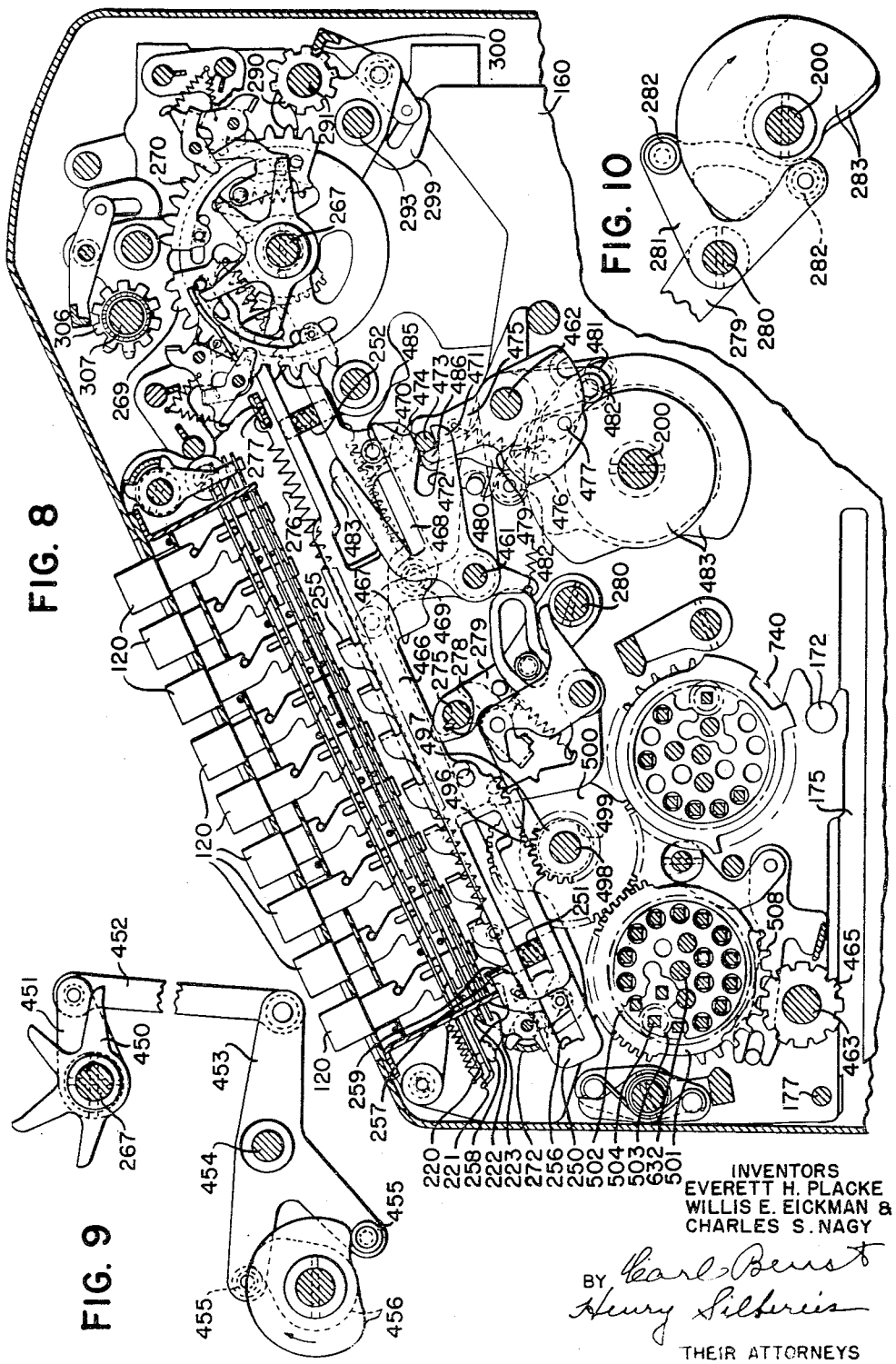

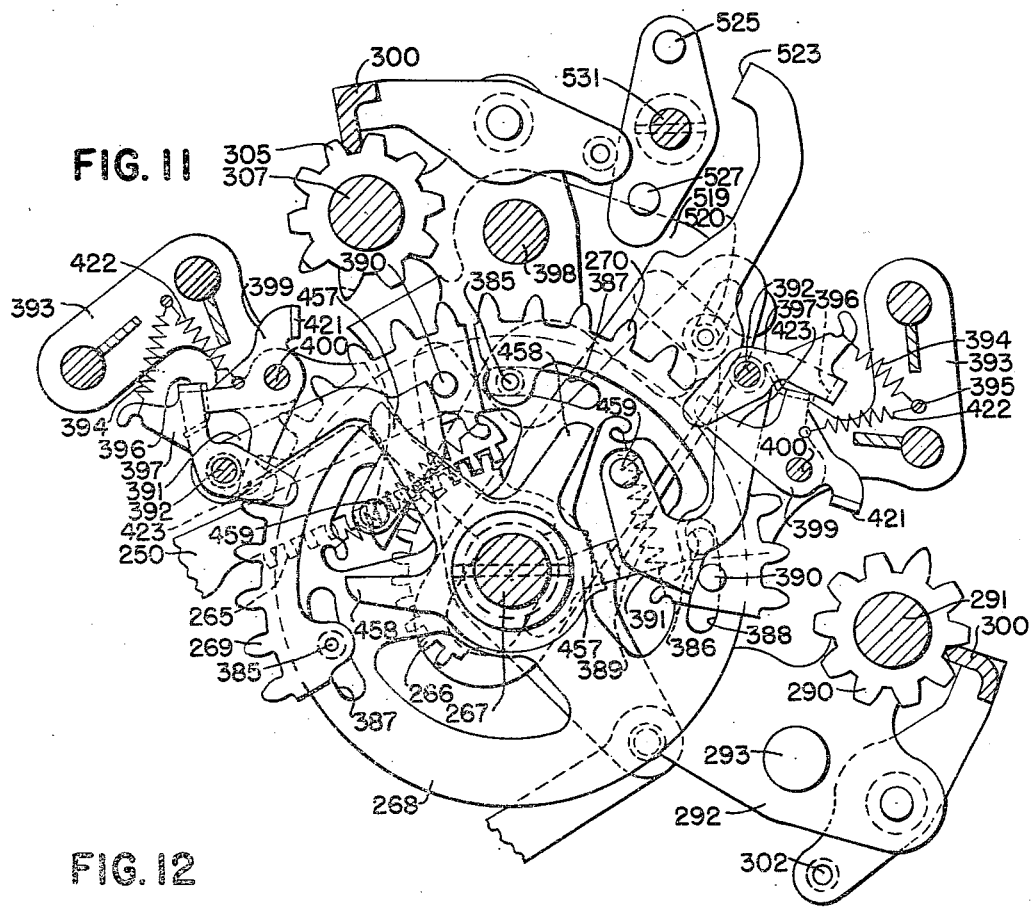

| SPACE | | | CONTROLLED BY KEYS IN ROW | | CONTROLLED BY KEYS IN ROW | | CONTROLLED BY KEYS IN ROW | |
|---|---|---|---|---|---|---|---|---|
| | | | PLATE 1 NOTCHES CUT IN | | PLATE 2 NOTCHES CUT IN | | PLATE 3 NOTCHES CUT IN | |
| 1 | HAMMER WITHDRAWAL | PLATE GROUP CARD-COL 2 | 2-4-6-8-10 | 3 | 5-6-7-9-10 | 2 | 8-9 | 1 |
| 2 | HAMMER DEP-INT | PLATE GROUP CARD-COL 3 | 1-3-5-7-9-10 | 3 | 3-5-6-7-9-10 | 2 | 8-9 | 1 |
| 3 | HAMMER BAL PICK UP | PLATE GROUP CARD-COL 5 | 1415 1414 1-8 1411 | 2 | 1413 1410 | | 1412 1409 | |
| 4 | HAMMER WITHDRAWAL | PLATE GROUP BOOK-COL 2 | 2-4-6-8-10 | 3 | 5-6-7-9-10 | 2 | 8-9 | 1 |
| 5 | HAMMER DEP-INT | PLATE GROUP BOOK-COL 3 | 1-3-5-7-9-10 | 3 | 3-5-6-7-9-10 | 2 | 8-9 | 1 |

NOTE
HAMMERS REQUIRE A DEEP NOTCH IN EACH PLATE TO PRINT

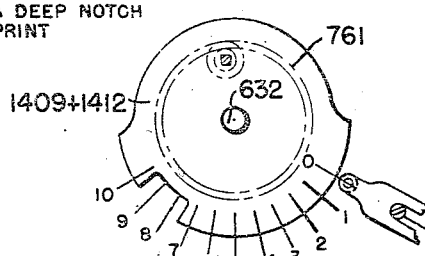

INVENTORS
EVERETT H. PLACKE
WILLIS E. EICKMAN &
CHARLES S. NAGY
BY Karl Beust
Henry Silbereis
THEIR ATTORNEYS

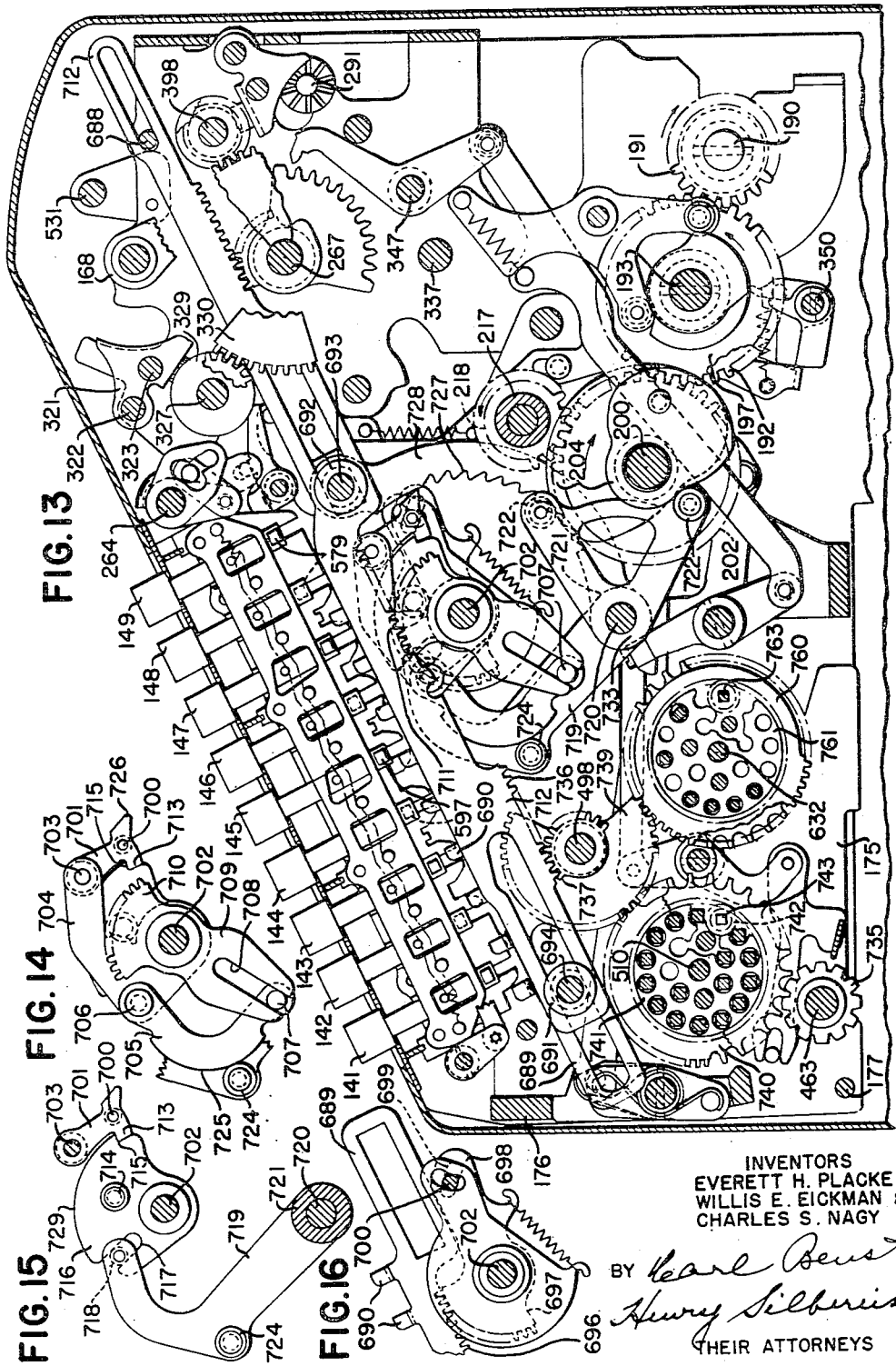

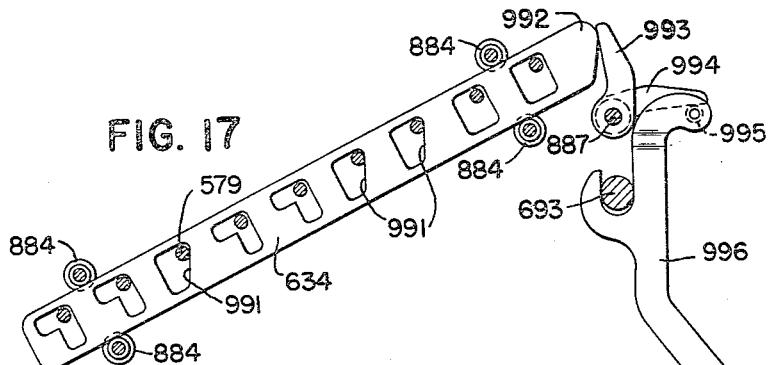
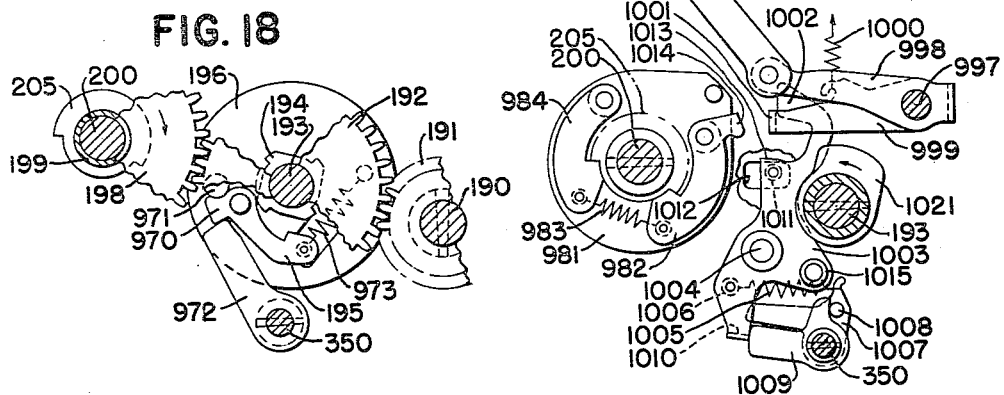
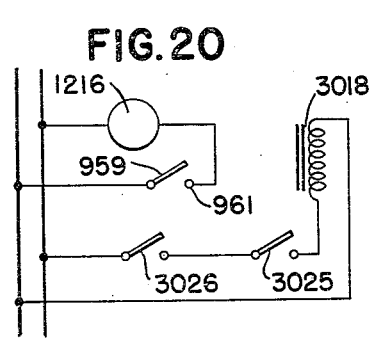
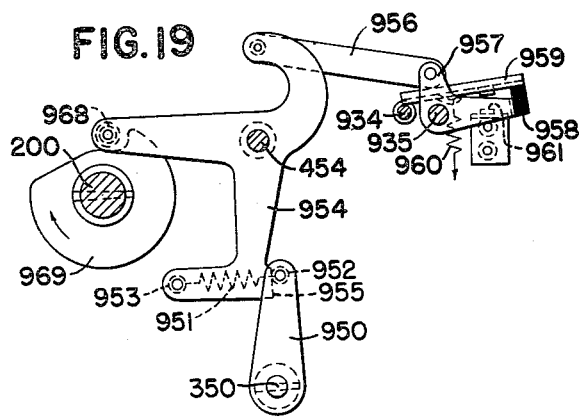
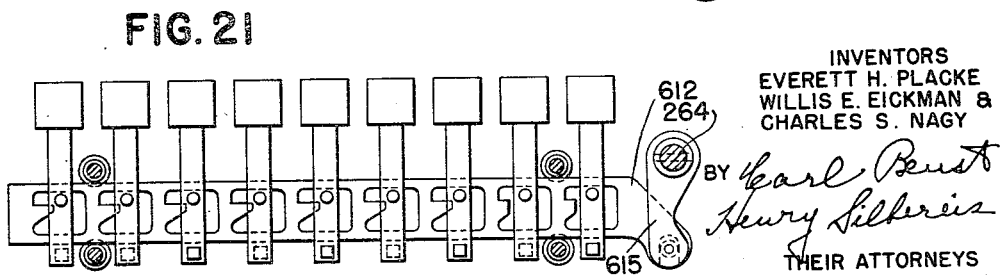

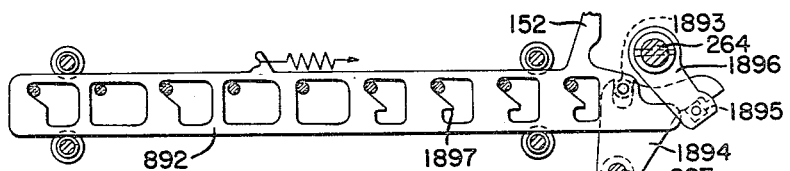
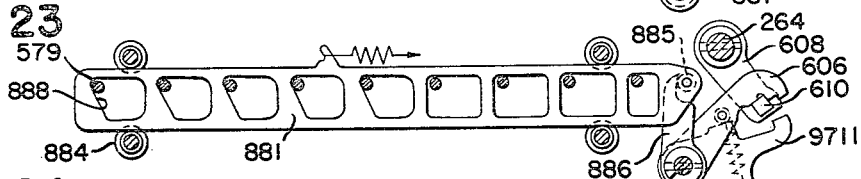
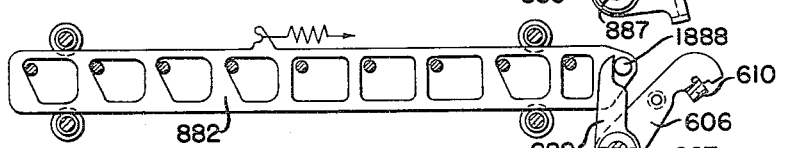
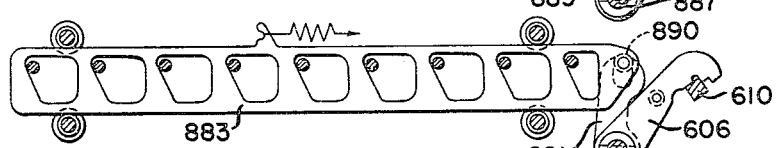
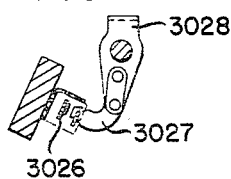
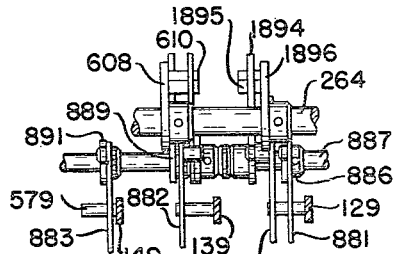
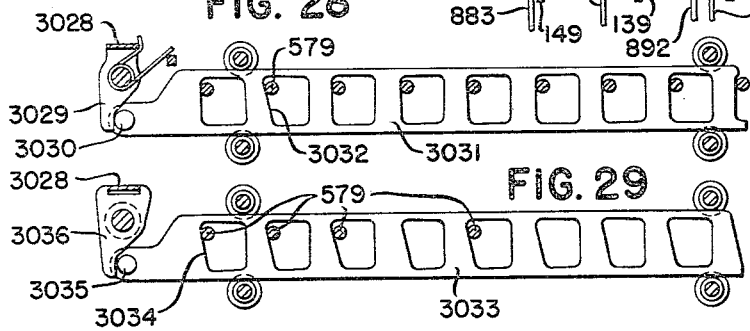
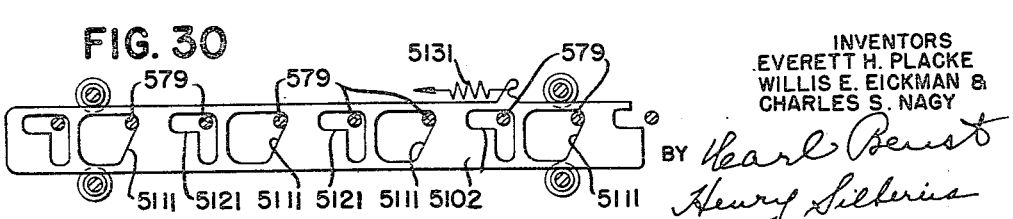

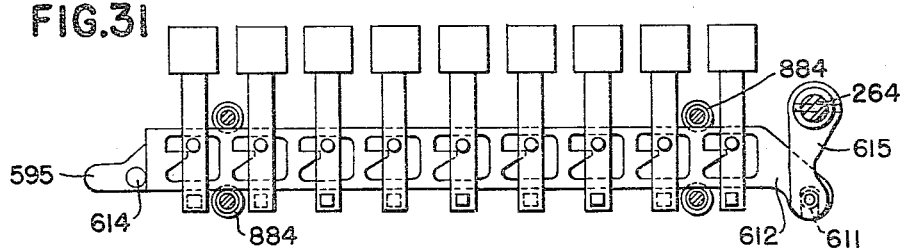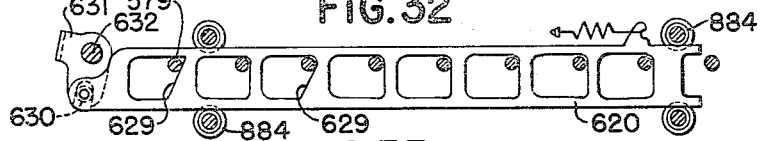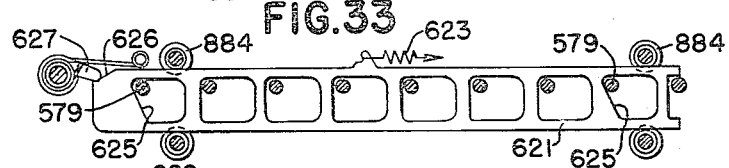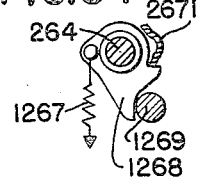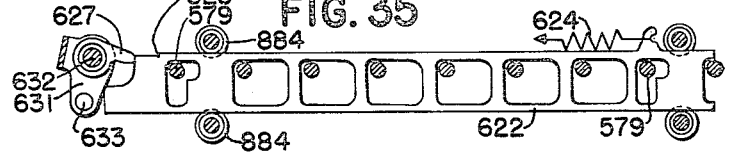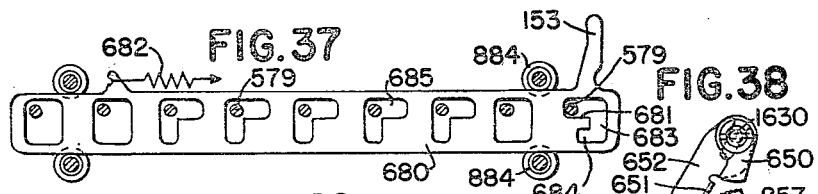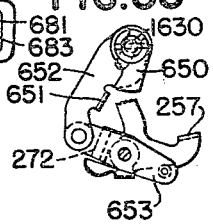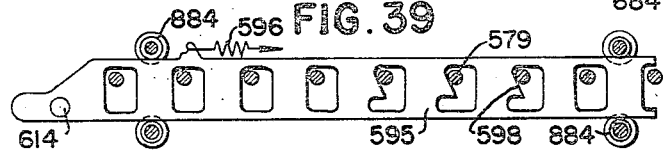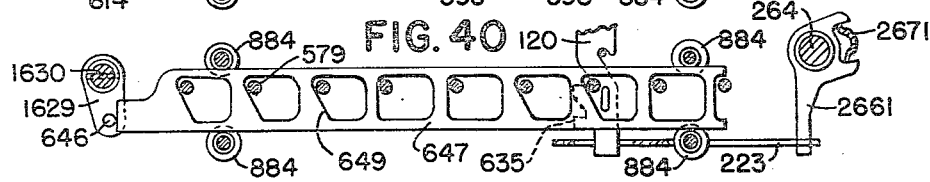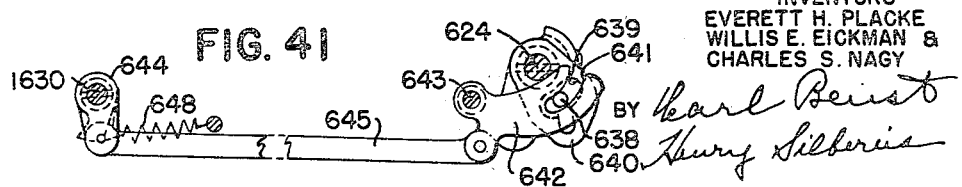

Dec. 18, 1956     E. H. PLACKE ET AL     2,774,298
SELECTIVE FEED AND PRINT CONTROL
MEANS IN ACCOUNTING MACHINES
Filed Jan. 28, 1955     34 Sheets-Sheet 13
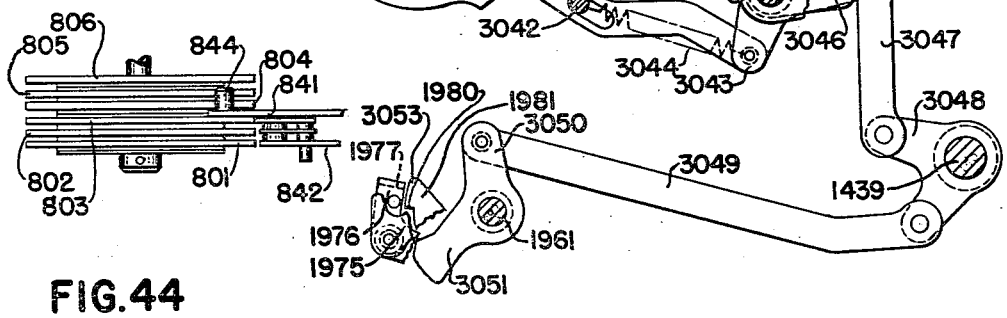
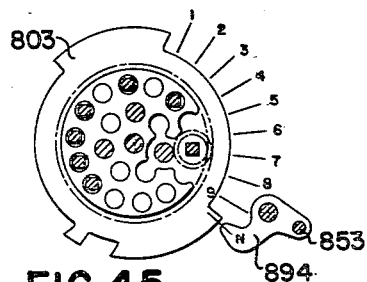
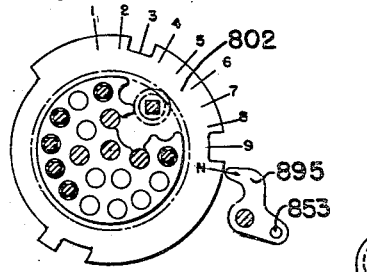
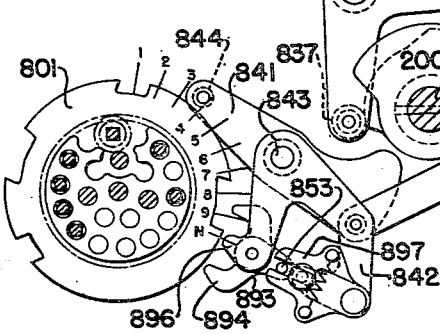
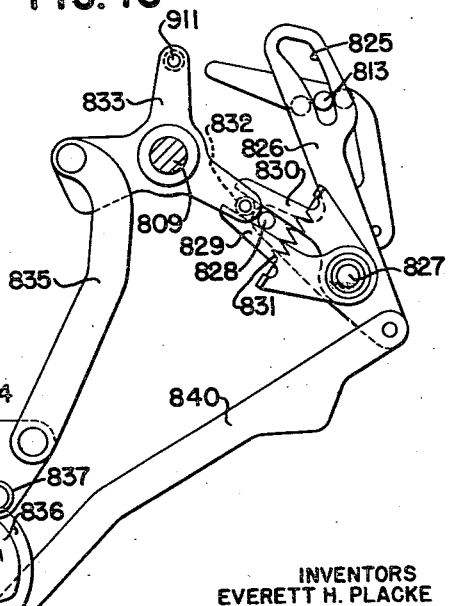
INVENTORS
EVERETT H. PLACKE
WILLIS E. EICKMAN &
CHARLES S. NAGY
THEIR ATTORNEYS

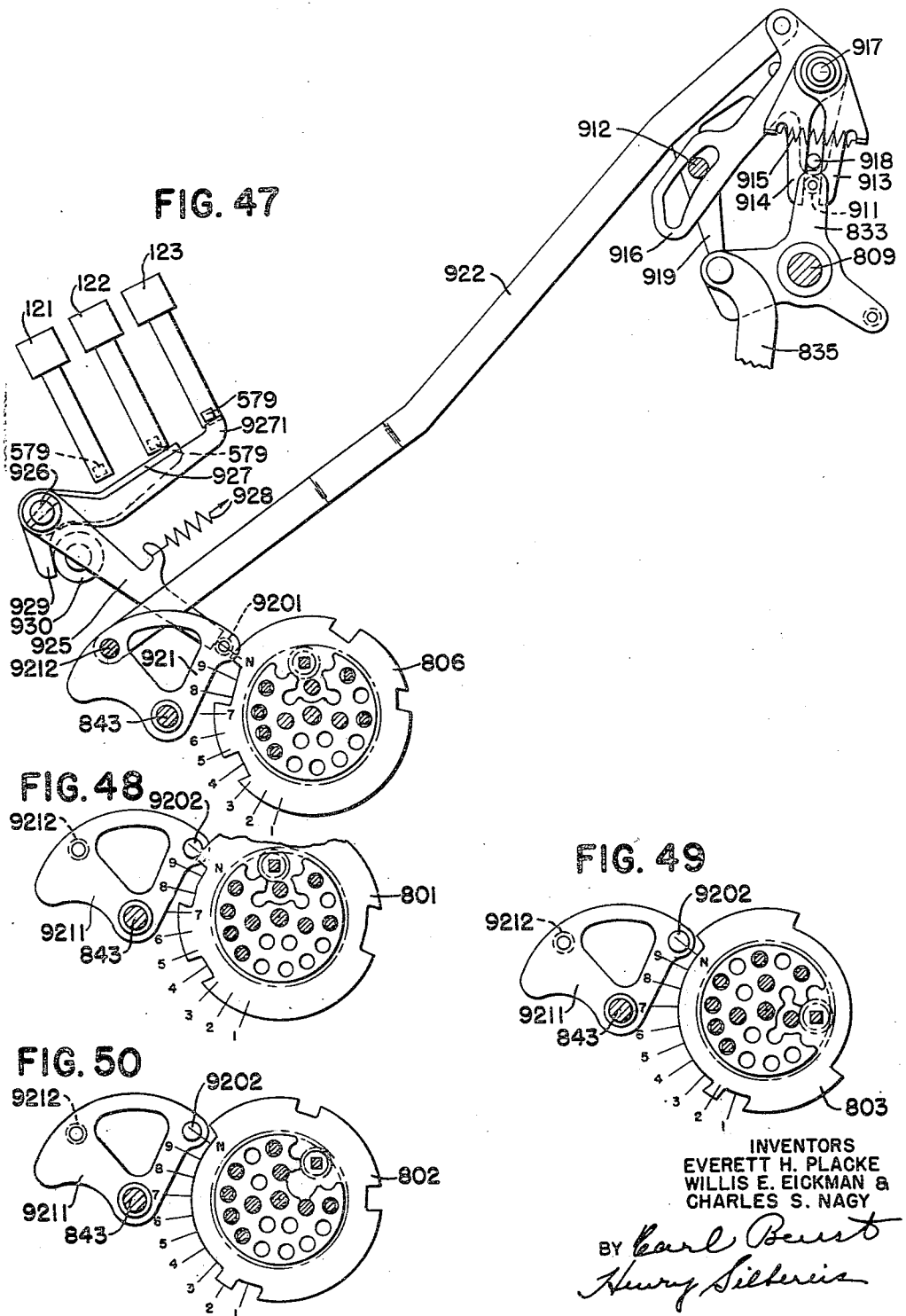

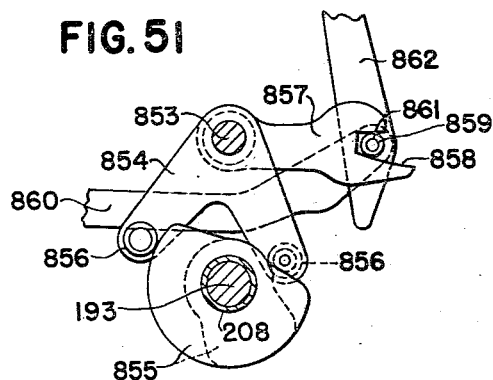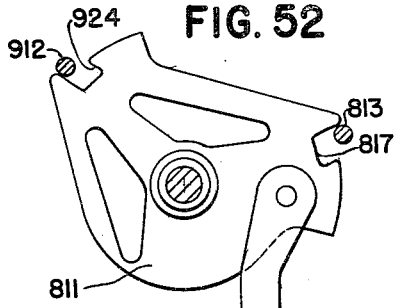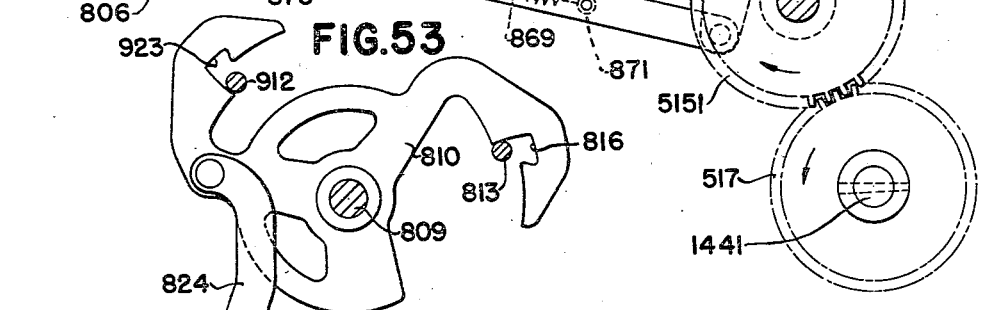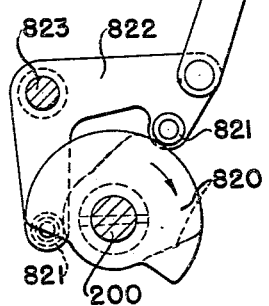

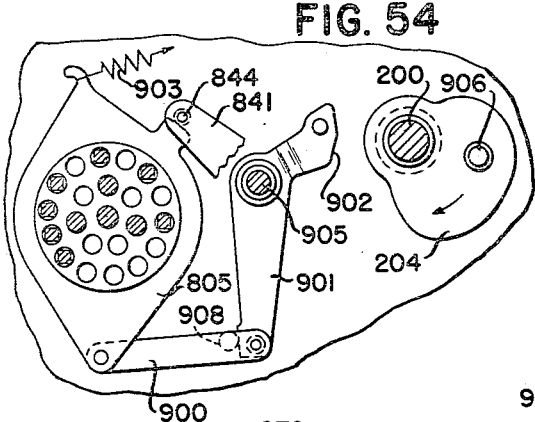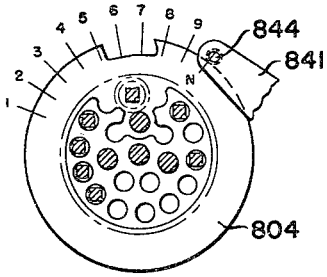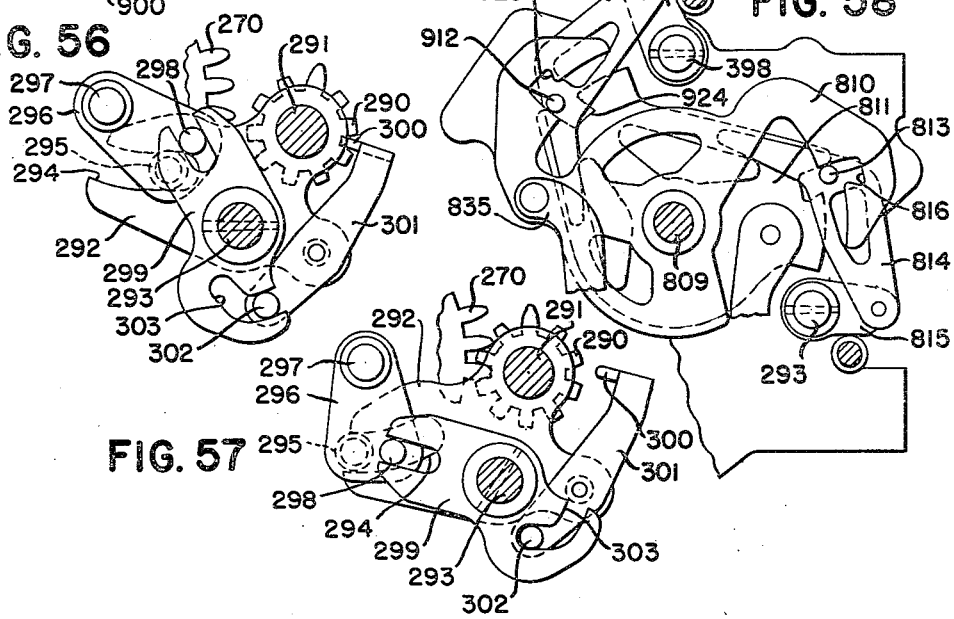

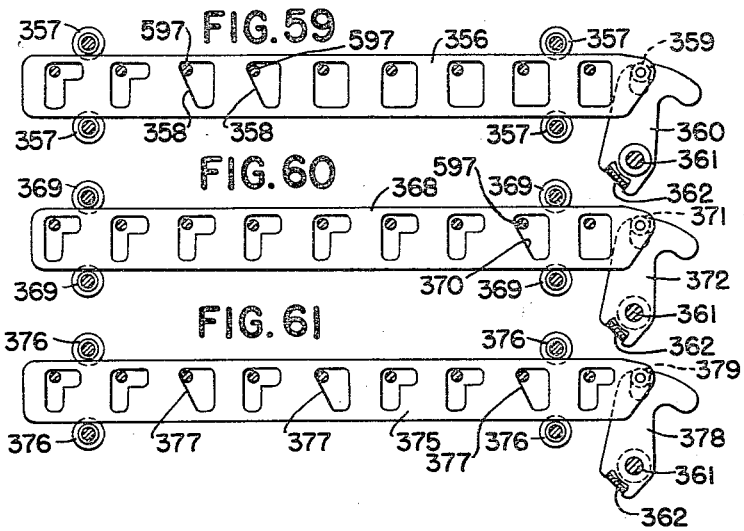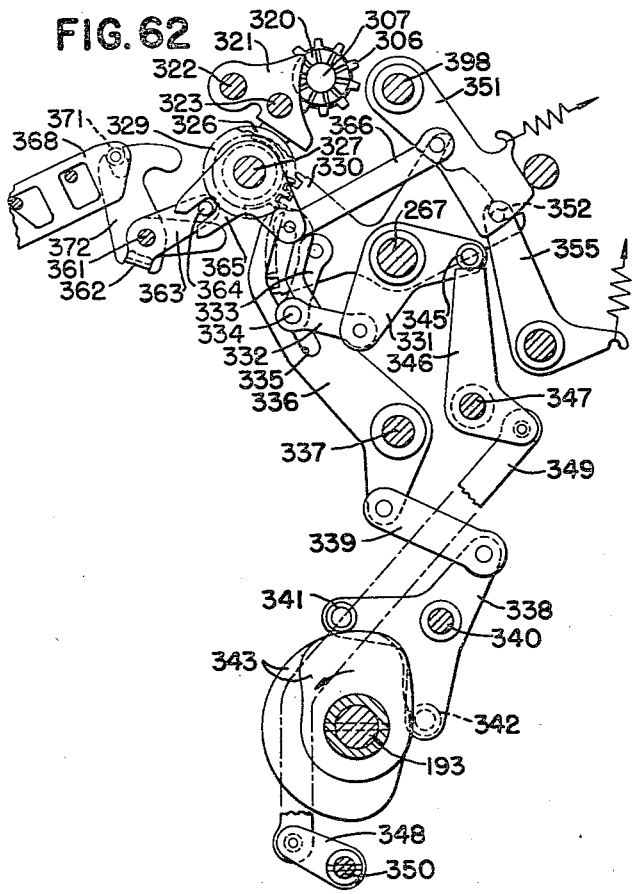

Dec. 18, 1956  E. H. PLACKE ET AL  2,774,298
SELECTIVE FEED AND PRINT CONTROL
MEANS IN ACCOUNTING MACHINES
Filed Jan. 28, 1955  34 Sheets-Sheet 18
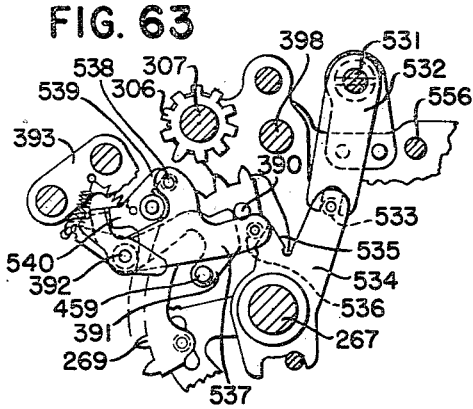
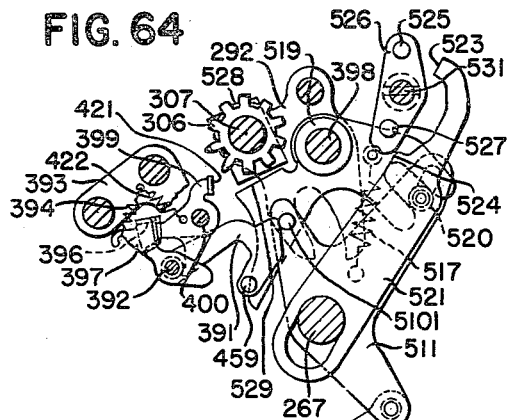
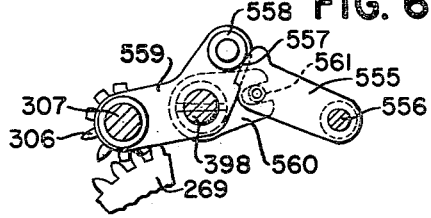
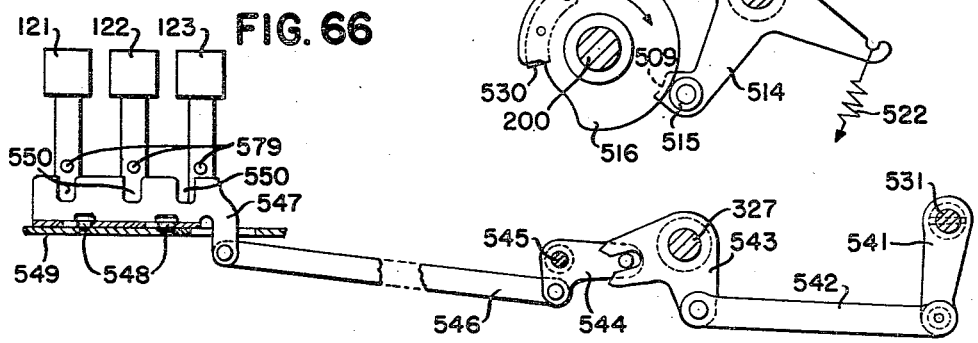
INVENTORS
EVERETT H. PLACKE
WILLIS E. EICKMAN &
CHARLES S. NAGY
BY
THEIR ATTORNEYS Dec. 18, 1956

E. H. PLACKE ET AL 2,774,298

SELECTIVE FEED AND PRINT CONTROL
MEANS IN ACCOUNTING MACHINES

Filed Jan. 28, 1955

INVENTORS
EVERETT H. PLACKE
WILLIS E. EICKMAN &
CHARLES S. NAGY

BY
THEIR ATTORNEYS

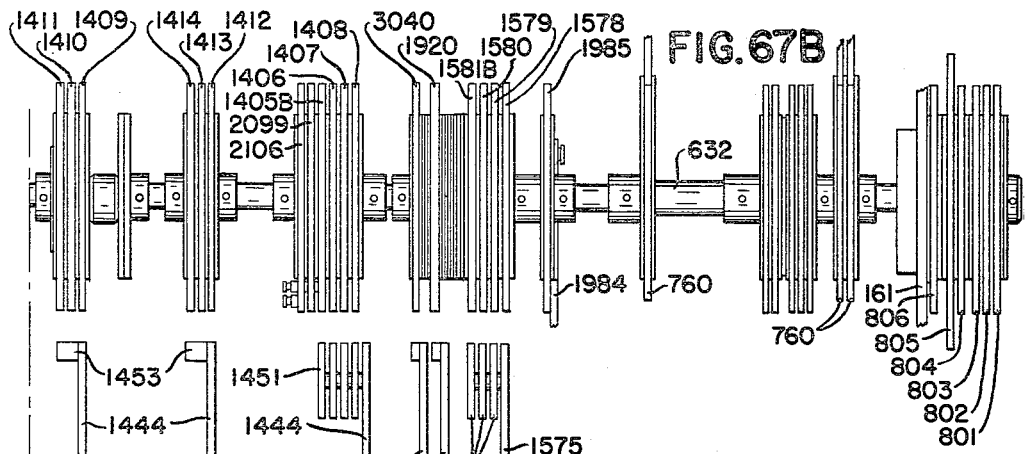
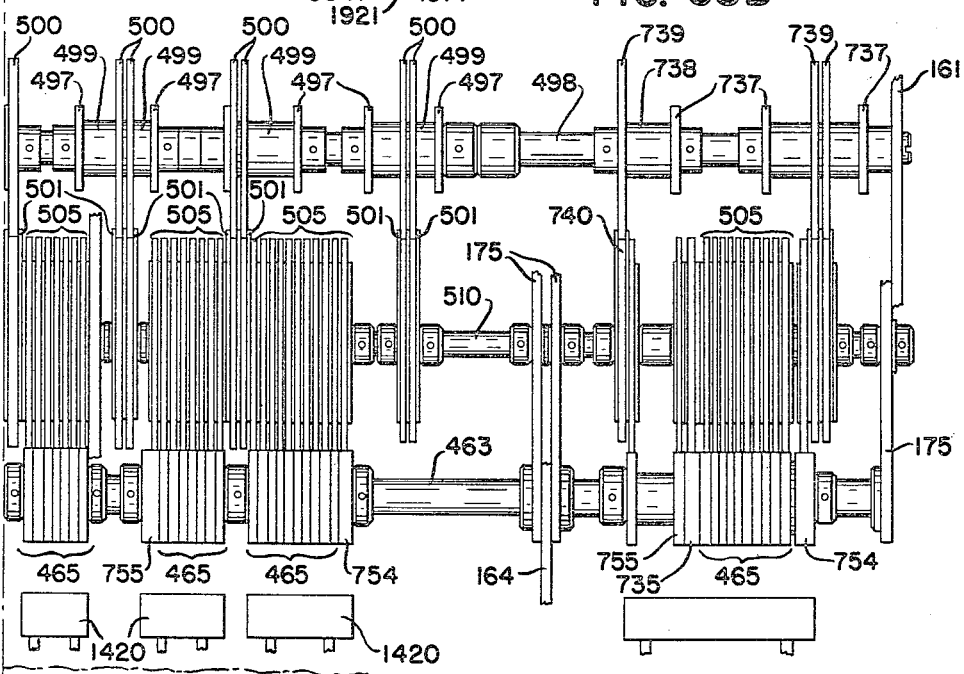
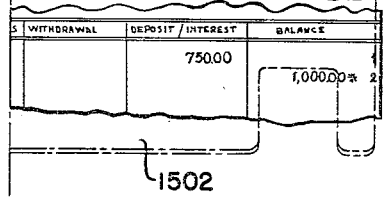
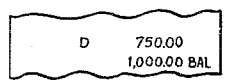

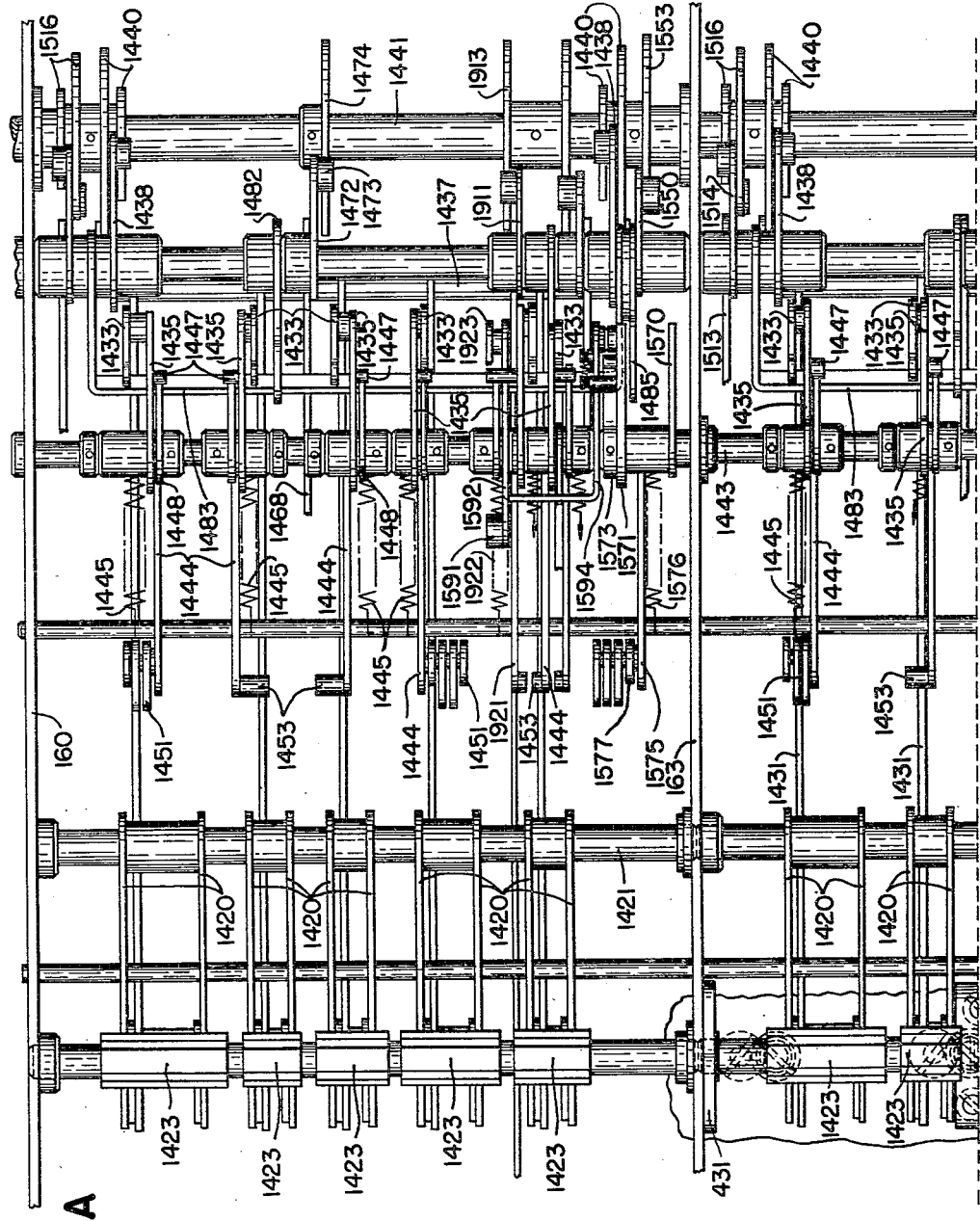

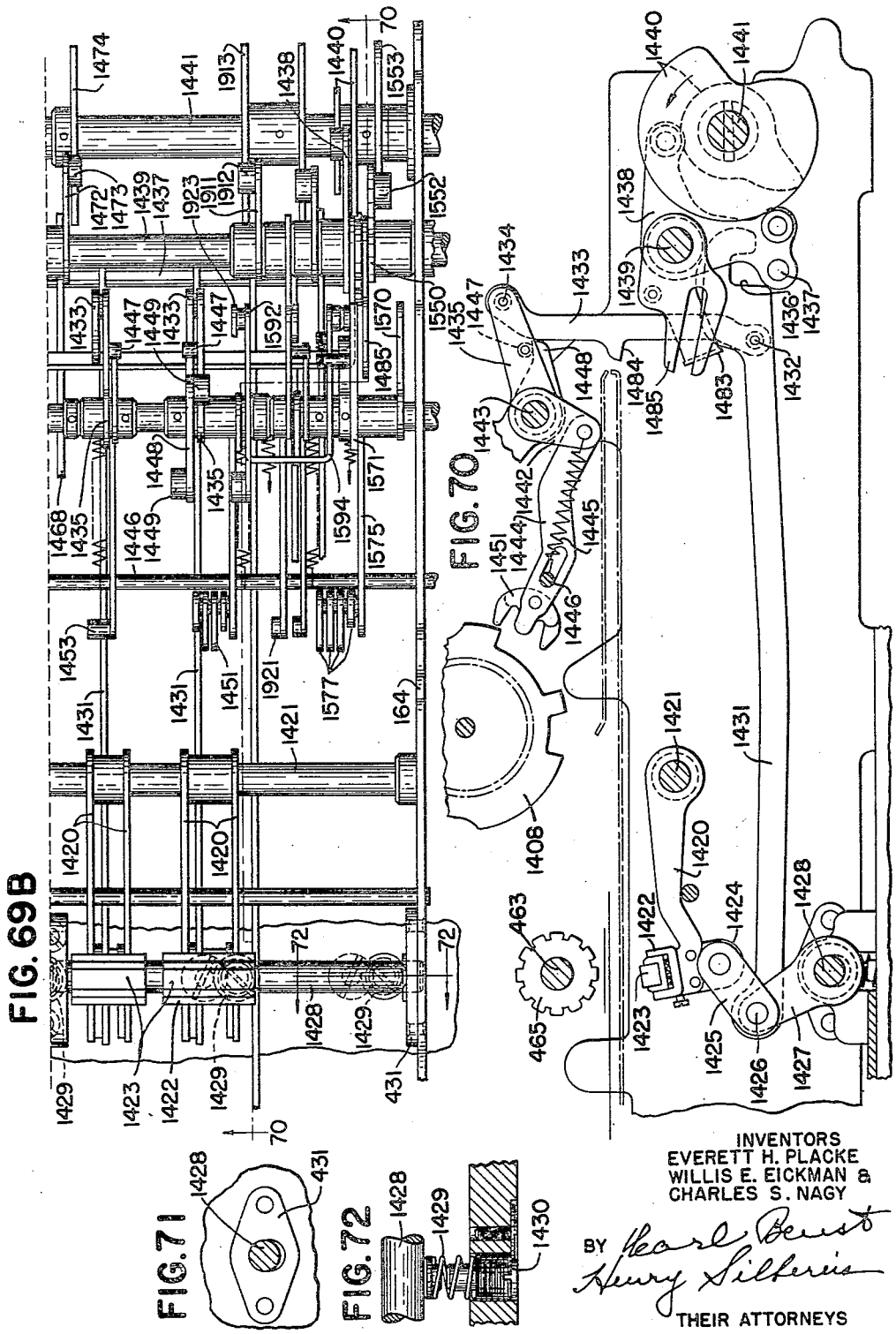

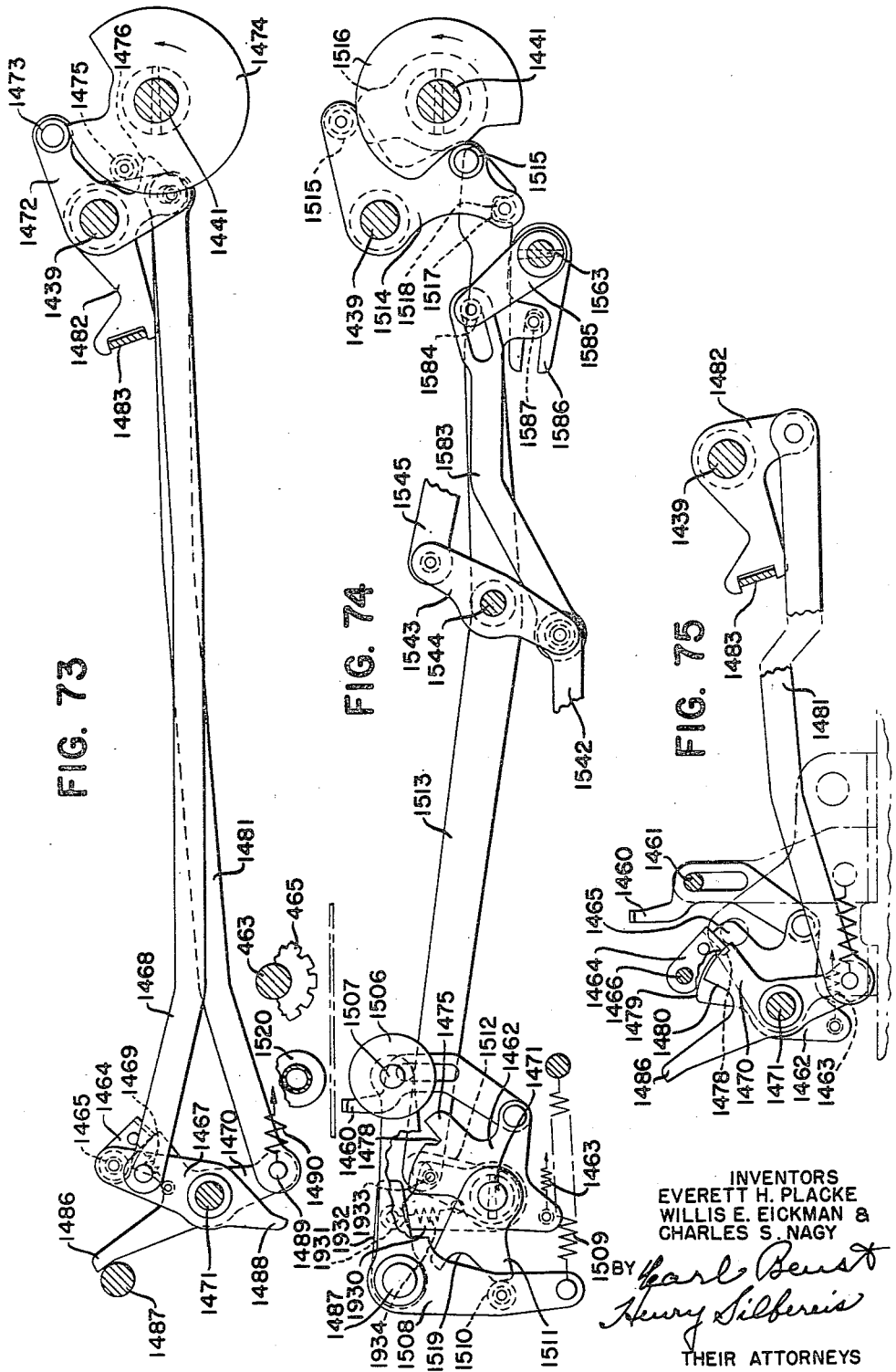

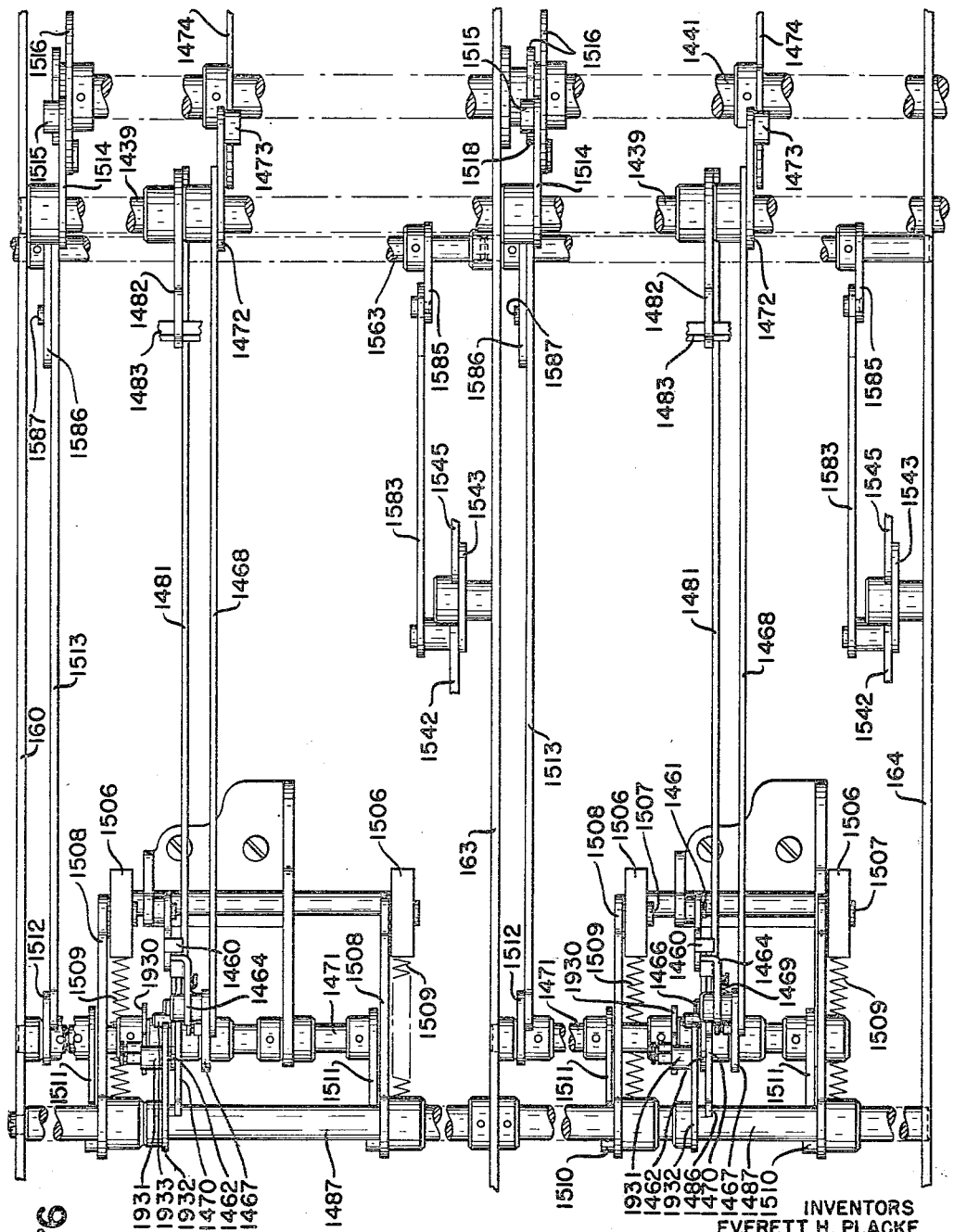

Dec. 18, 1956
E. H. PLACKE ET AL
2,774,298
SELECTIVE FEED AND PRINT CONTROL MEANS IN ACCOUNTING MACHINES
Filed Jan. 28, 1955
34 Sheets-Sheet 25
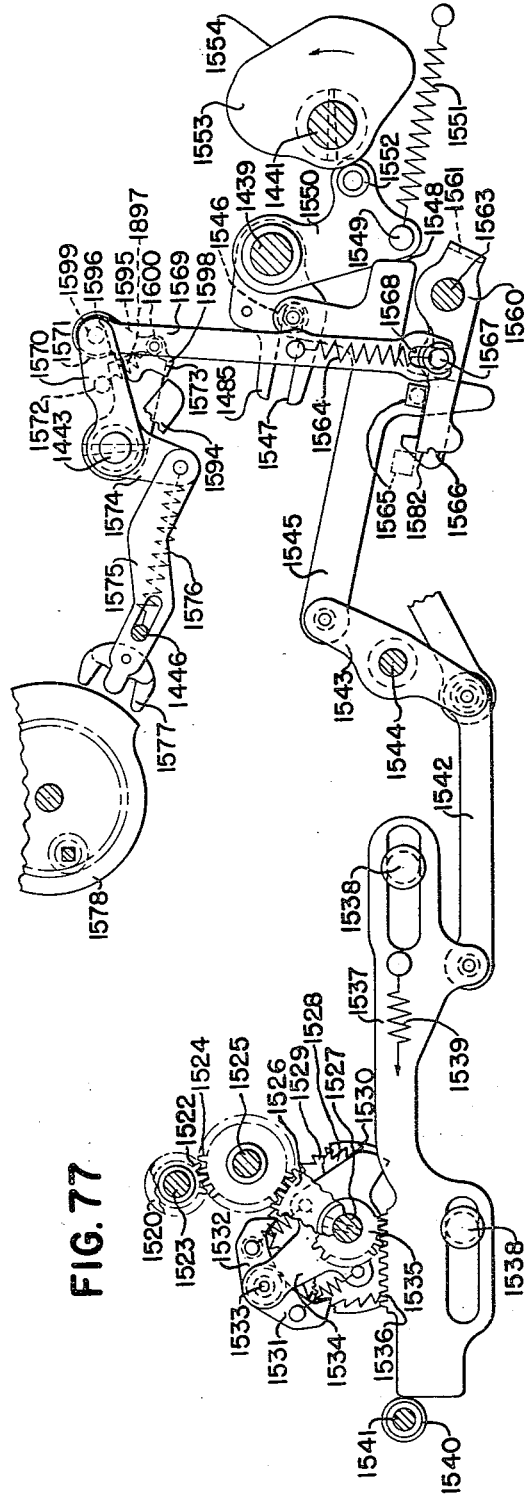
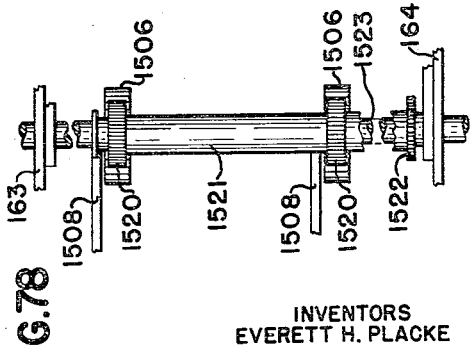
INVENTORS
EVERETT H. PLACKE
WILLIS E. EICKMAN &
CHARLES S. NAGY
BY *Earl Beust*
*Henry Silberis*
THEIR ATTORNEYS Dec. 18, 1956    E. H. PLACKE ET AL    2,774,298
SELECTIVE FEED AND PRINT CONTROL
MEANS IN ACCOUNTING MACHINES
Filed Jan. 28, 1955    34 Sheets-Sheet 26

INVENTORS
EVERETT H. PLACKE
WILLIS E. EICKMAN &
CHARLES S. NAGY
BY
THEIR ATTORNEYS

Dec. 18, 1956 E. H. PLACKE ET AL 2,774,298
SELECTIVE FEED AND PRINT CONTROL
MEANS IN ACCOUNTING MACHINES
Filed Jan. 28, 1955 34 Sheets-Sheet 27

FIG. 85

INVENTORS
EVERETT H. PLACKE
WILLIS E. EICKMAN &
CHARLES S. NAGY

BY Carl Beust
Henry Silberis
THEIR ATTORNEYS

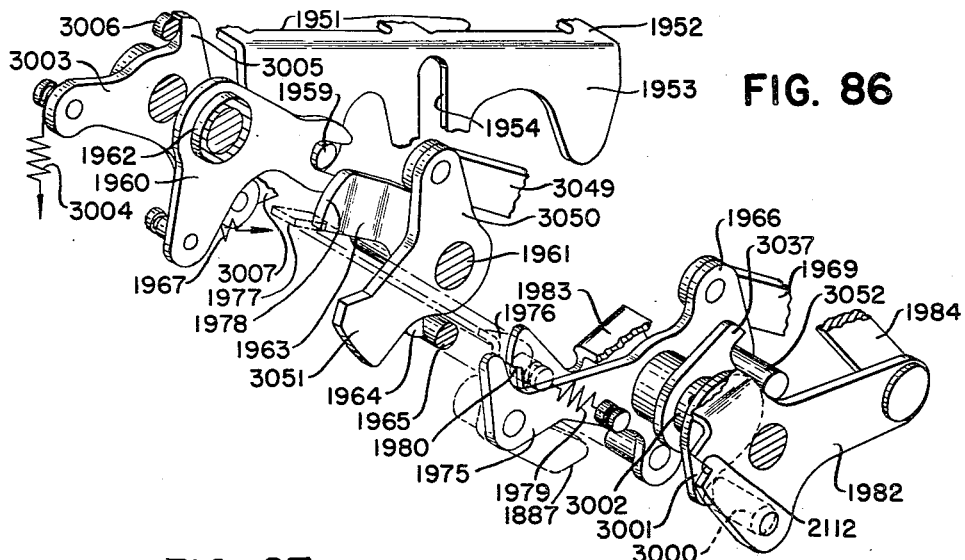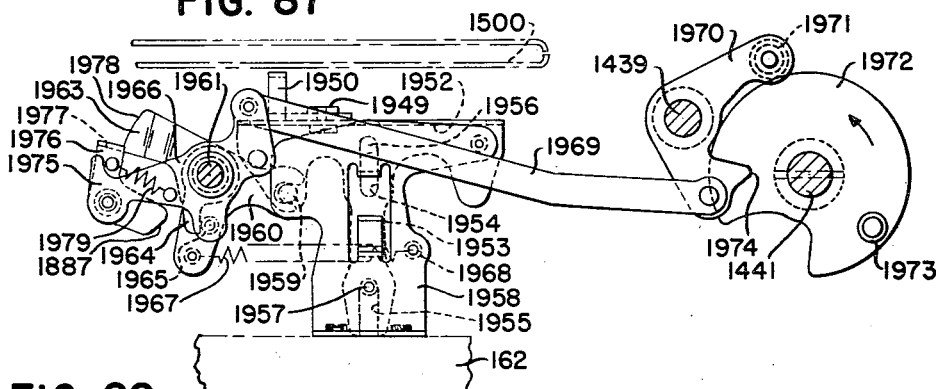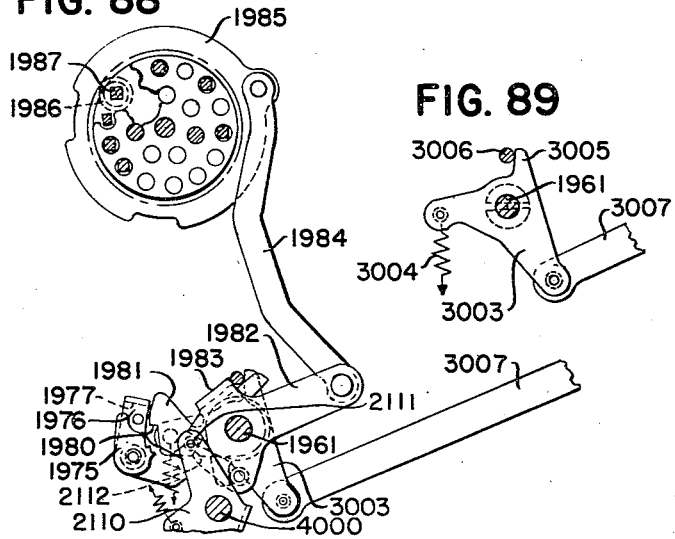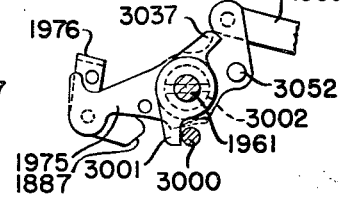

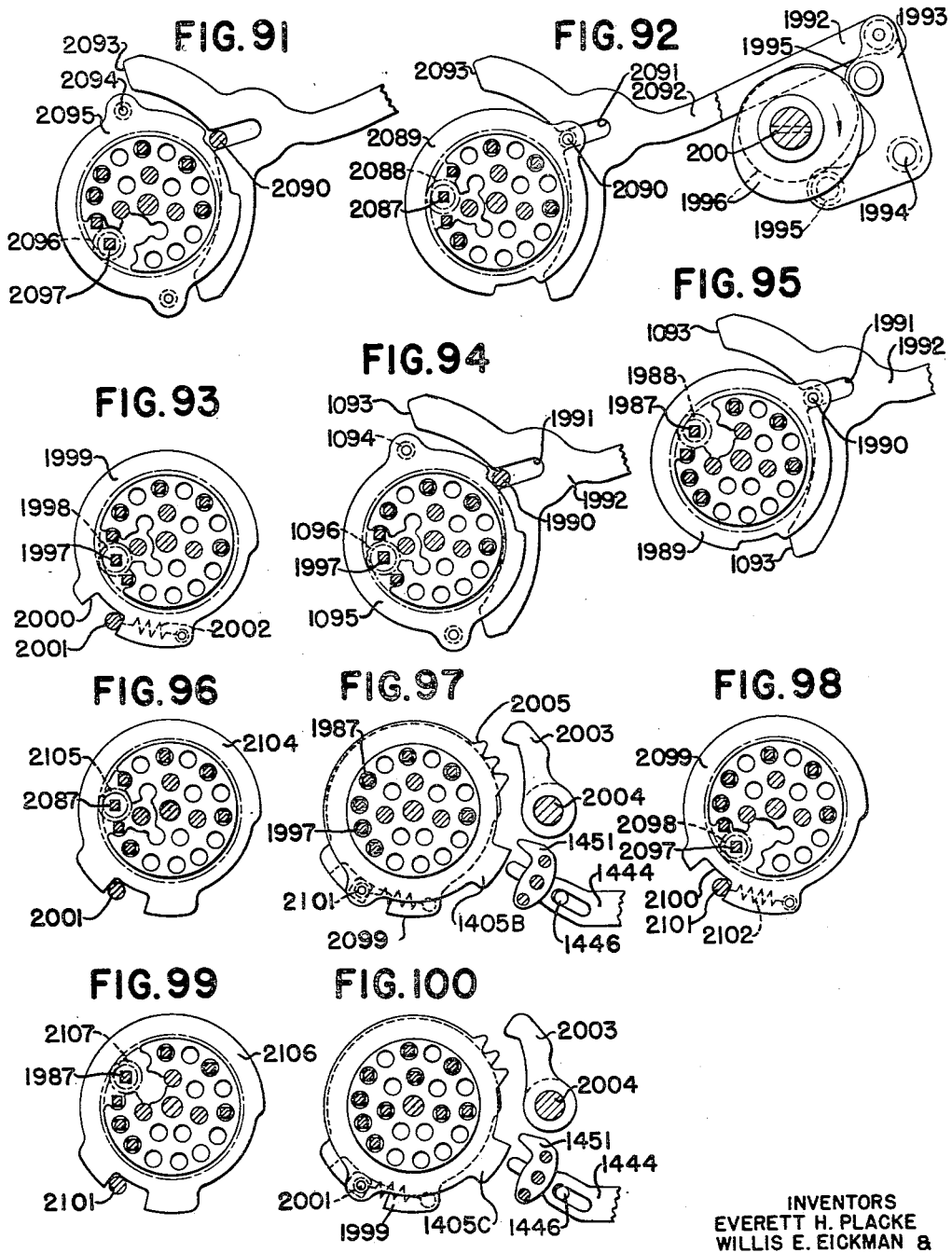

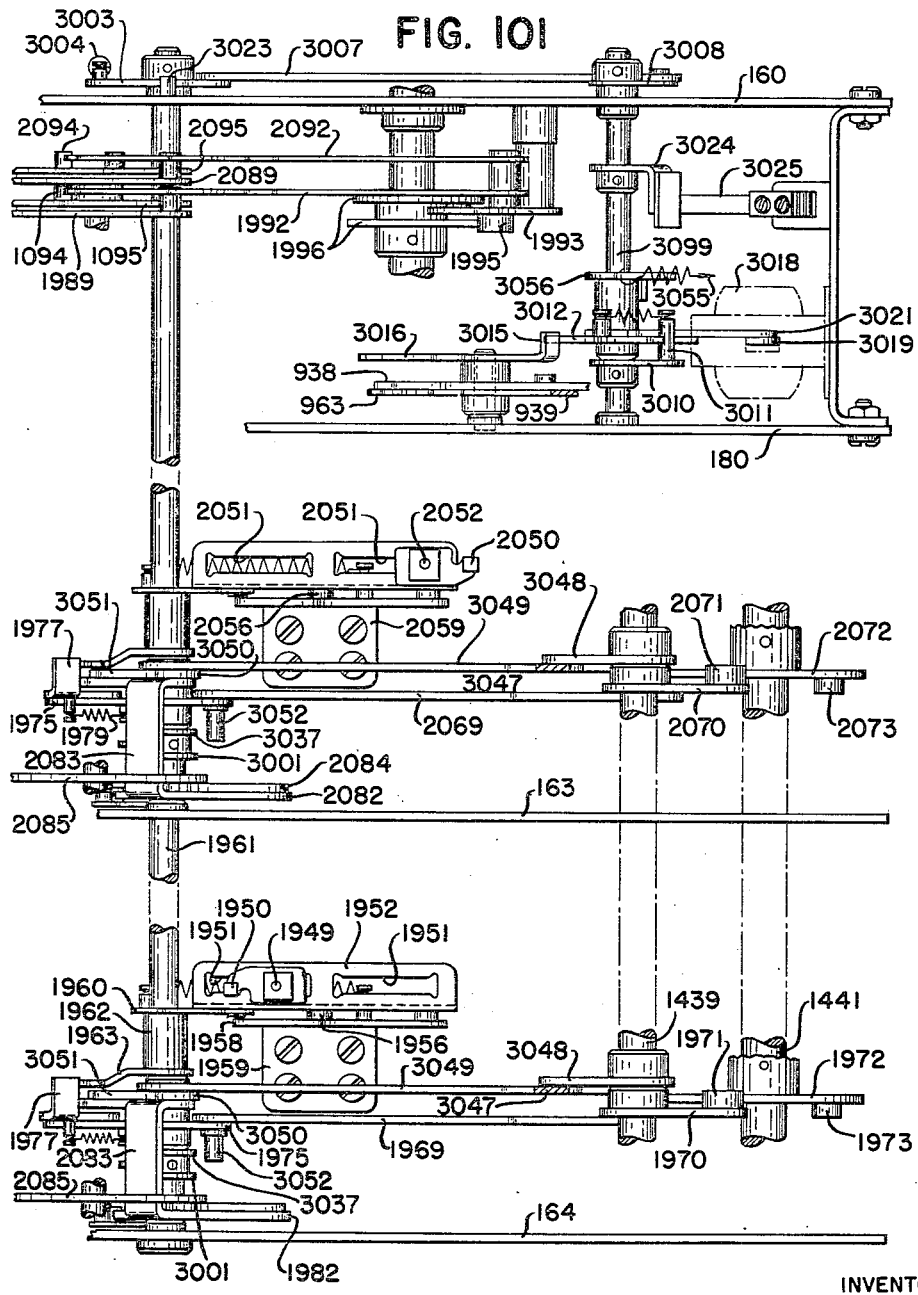

Dec. 18, 1956 E. H. PLACKE ET AL 2,774,298
SELECTIVE FEED AND PRINT CONTROL
MEANS IN ACCOUNTING MACHINES
Filed Jan. 28, 1955 34 Sheets-Sheet 31
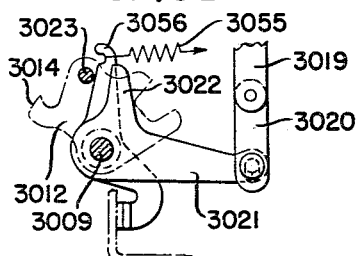
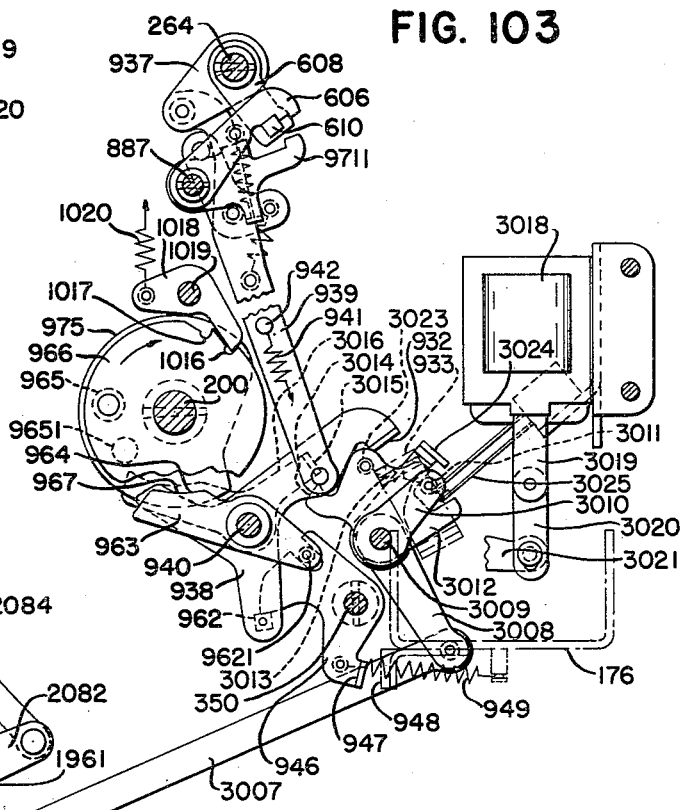
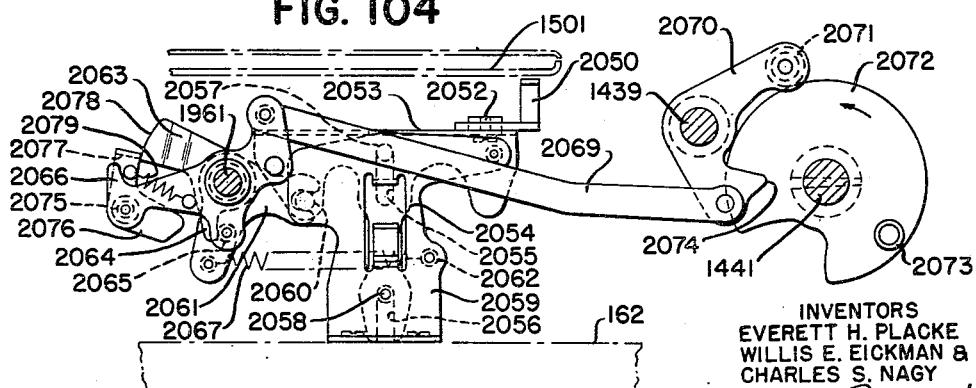
INVENTORS
EVERETT H. PLACKE
WILLIS E. EICKMAN &
CHARLES S. NAGY
BY
THEIR ATTORNEYS

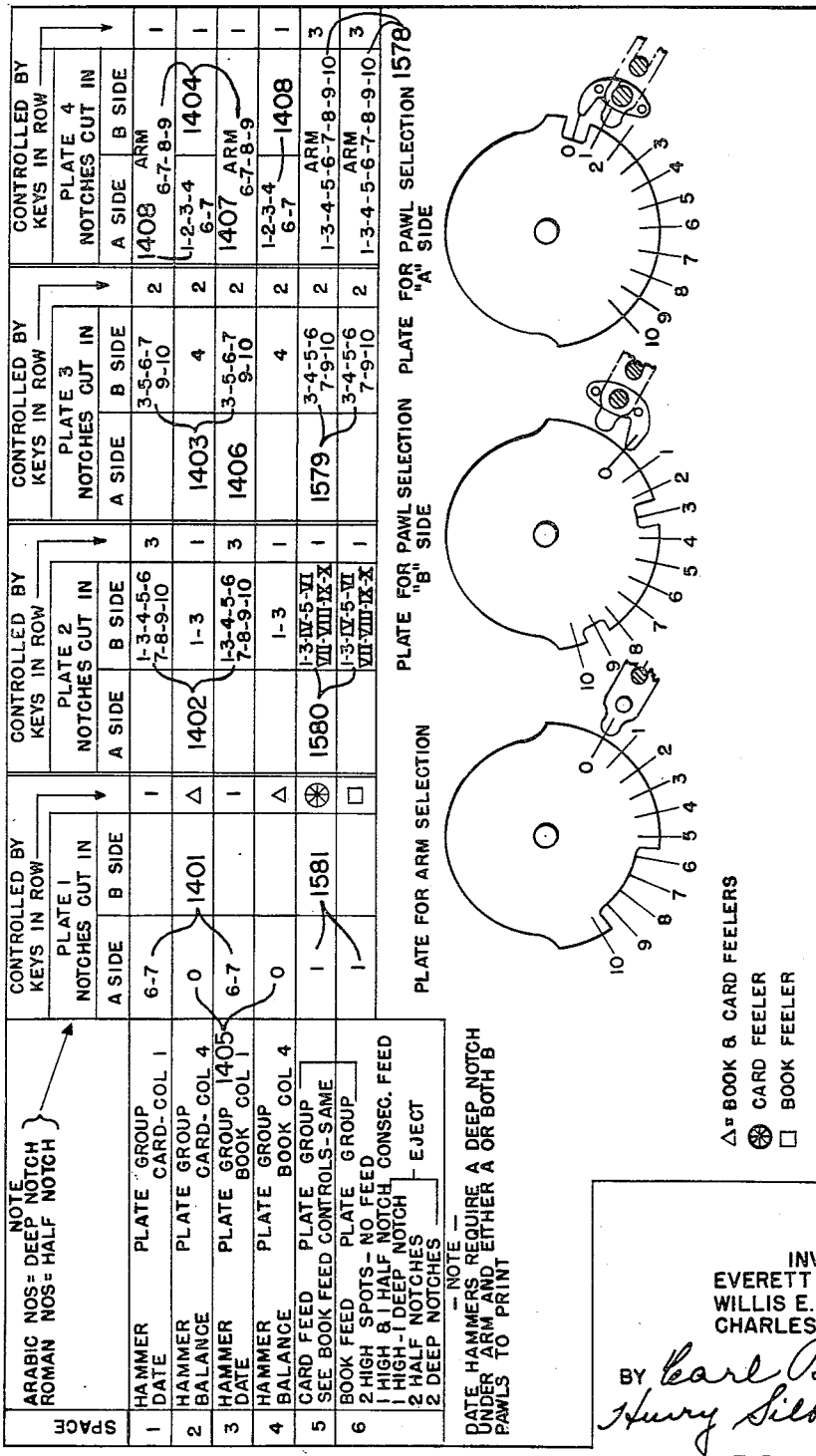

FIG. 106

| | 0 | 40 | 80 | 120 | 160 | 200 | 240 | 280 | 320 | 360 |
|---|---|---|---|---|---|---|---|---|---|---|
| KEY LOCK LINE STUD 965 FIG.103 | TRIP | | | | | | RELEASES KEYS | RETURN HOME 305 | | |
| CLUTCH RELEASE LINE STUD 965 FIG.103 | RELEASES CLUTCH START MOTOR | | | | | RESTORES 225 | RETURNS 250 | TO HOME 305 | | |
| MOTOR SWITCH PLATE CAM 969 FIG.19 | | | RETAINS SWITCH 96 | | | 205 | | RELEASES SWITCH 357 | | 352 |
| AMOUNT TYPE SETTING COUPLING PAWL CAMS 483 FIG.8 | DISENGAGES 25 50 | | ENGAGES 110 135 | | | | | | | |
| ZERO STOP LEVERS 257 FIG.8 | ZERO STOP PAWL IS IN 10 45 | | | | | ZERO STOP PAWL IS OUT 235 | | | | |
| AMOUNT DIFFERENTIAL CAMS 283 FIG.10 | ACTUATORS POSITIONED- TYPE WHEELS TO ELIMINATED POS. 45 95 | | ADD- TYPE WHEELS SET 150 | | | | | | | |
| ZERO ELIMINATION SELECTION STUDS | STUD 55 68 STUD 45 60 85 | | | RETURNS ACTUATOR HOME | | | | | | |
| ZERO ELIMINATION CAMS | | | 95 85 TYPE WHEEL TO ELIMINATED POSITION | | | | | | | |
| TRANSACTION DIFFERENTIAL CAMS 204 FIG.13 | SHIFT TOTALIZER POSITION TYPE WHEEL 5 | | RETURNS 95 | | | | | | | |
| TRANSACTION DIFFERENTIAL LINER | | | IN 90 110 | | | | | | | OUT 335 355 |
| TOTALIZER SELECTION CAM 325 FIG.5 | SELECT TO READ OR RESET 5 20 | | SELECT TO ADD 100 125 | | | | | RETURN HOME 300 325 | | |
| TOTALIZER ENGAGING-ADD CAMS 820 FIG.53 | | | TOTALIZER IN | LINER OUT 125 145 | | LINER IN 255 | TOTALIZER OUT 270 290 | | | |
| TOTALIZER ENGAGING-READ CAMS 878 FIG.52 | TOTALIZER IN 20 | LINER OUT 55 | | | | LINER IN 220 235 | TOTALIZER OUT 255 | | | |
| TOTALIZER ENGAGING-RESET CAMS 855 FIG.51 | TOTALIZER IN 20 | LINER OUT 55 | LINER IN 125 140 | TOTALIZER OUT | | | | | | |
| TENS TRANSFER RESTORING CAM 456 FIG.9 | COMPLETES RETURN 17 | | | | | | | RESTORES TRANSFER 282 | STARTS RETURN 337 347 | |
| READ SELECTION CAM 836 FIG.46 | | | SELECTION FOR READ 95 110 | | | | | RETURN 270 | 330 | |
| SELECTION FOR RESET ON BACK TOTALIZER ROLL 906 ON DIFF.CAM FIG.54 | RELEASES RESET TOTALIZER YOKE MOVES PLATE | | | 147 | 178 RETURNS 168 | | | | | |
| SUBTRACT TOTALIZER SHIFT CAM 343 FIG.62 | SHIFT TO SUBTRACT 20 | | 95 | | | | | SHIFT TO PLUS SIDE 285 | 345 | |
| OVERDRAFT TRIP CAM 516 FIG.64 | | | | | TRIPS OVERDRAFT 230 | | RESTORES 255 285 | | | |

Dec. 18, 1956  E. H. PLACKE ET AL  2,774,298
SELECTIVE FEED AND PRINT CONTROL
MEANS IN ACCOUNTING MACHINES
Filed Jan. 28, 1955  34 Sheets-Sheet 34

FIG. 107

| | 0   40   80 | 120   160 | 200   240 | 280 | 320   360 |
|---|---|---|---|---|---|
| CARD & BOOK FEELER CAM 1474 FIG.73 | FEELS RETURNS 5 20   60 | | | | |
| FEED & IMPRESSION SELECTION CAM 1450 FIG.42 | | SELECTS 110   136 | | | RETURNS 330 356 |
| CONTROL PITMAN SELECTION CAM 1590 FIG.80 | | SELECTS 117   147 | RETURNS 239   258 | | |
| CONTROL FOR CONSEC. FEED, RETAINING & EJECTION PAWL CAM 1913 FIG.80 | | LOWERS RETAINING PAWL RAISES EJECT. PAWL 130 150 | 215 235 | LOWERS EJECTION PAWL RAISES RETAINING PAWL | |
| FEED IN - CONSEC. FEED & EJECTION CAM 1553 FIG.77 | | FEED IN 50   115 | BACK UP CONSEC.FEED 150 170 180 | EJECTS 255   310 | |
| CARD & BOOK IMPRESSION CAM 1440 FIG.70 | | | | PRINT 235 | |
| CARD & BOOK TENSION CAM 1516 FIG.74 | ON 20   55 | | | | OFF 315   350 |
| MACHINE LOCK FEELER CAM 1972 FIG.87 | | | FEELS RETURNS 215 235  255 | | |
| MACHINE LOCK CONTROL CAM 1996 FIG.92 | MOVES PLATES 5 | | RETURNS | | |
| TWO CYCLE CONTROL CAM 1021  FIG.17 | TRIP | RESTORES ARM 110   145 | 204   RETURNS 262 | | |

FIG. 108

ONLY CAMS LISTED BELOW MAKE 2 CYCLES
CAM LINE STOPS AT 20° FIRST CYCLE; COMPLETES MOVEMENT ON SECOND CYCLE.

| | 0   80 | 160 | 240   320 | 360 400 | 480 | 560 | 640   720 |
|---|---|---|---|---|---|---|---|
| TRANSACTION DIFFERENTIAL SHIFTING CAMS 204  FIG.13 | SHIFT TOT. SETS T.W. 5 | RETURN 95 120   200 | | 365 | 455 | | |
| SELECTION FOR RESET ON BACK TOTALIZER ROLL 906 ON DIFF.CAM  FIG.54 | MOVES PLATE SEL. TOTALIZER TO RESET | 178 147 168 200 | | | | 507 538 528 | |
| TRANSACTION DIFFERENTIAL LINER | IN 90 110 | | OUT 335 355 | IN 470 450 | | | OUT 715 695 |
| TWO CYCLE CONTROL CAM 1021  FIG.17 | TRIP RESTORES ARM RETAINED BY PAWL 110 145 | RETURN 204  262 | | | 470  505 | 564 622 | |

INVENTORS
EVERETT H. PLACKE
WILLIS E. EICKMAN &
CHARLES S. NAGY

BY *Carl Beust*
*Henry Silberis*
THEIR ATTORNEYS

United States Patent Office 2,774,298
Patented Dec. 18, 1956

2,774,298

SELECTIVE FEED AND PRINT CONTROL MEANS IN ACCOUNTING MACHINES

Everett H. Placke, Willis E. Eickman, and Charles S. Nagy, Dayton, Ohio, assignors to The National Cash Register Company, Dayton, Ohio, a corporation of Maryland Application January 28, 1955, Serial No. 484,709

53 Claims. (Cl. 101—93)

This invention relates to improvements in accounting machines, and particularly to a machine for posting accounts in a savings bank.

The invention is shown applied to a machine of the type disclosed in the United States patent issued to Mayo A. Goodbar, Everett H. Placke, and Carl G. Falkner, No. 2,616,623, on November 4, 1952.

The principal object of the invention is to provide a novel mechanism for correctly entering items on a pass book and ledger card.

Another object of the invention is to provide a novel column-printing mechanism.

A further object of the invention is to provide a means for printing on lines which may differ on the ledger card and on the book.

Another object of the invention is to provide a novel means for selecting the proper line on both the book and the ledger card for receiving entries on the next available line.

A specific object of the invention is to provide a means for preventing release of the machine for certain entries when the last line has been printed upon in either the book, the ledger card, or both.

Another object of the invention is to provide a novel add and subtract mechanism, so that the true negative total balances can be printed in the book or on the card.

A further object of the invention is to provide a novel means for locking the machine against further item entering operations after the last line has been printed upon and to provide a means for unlocking the locked machine to permit a balance to be printed in the proper column on the last printed line on which an item has been entered.

A specific object of the invention is to provide a feed means for feeding record material into printing position and automatic means to control the feed means to either line-space or eject the record material.

Another specific object of the invention is to provide a sensing mechanism for controlling the feed means for record material to eject the record material from the machine after the last line on the record material has been printed upon.

Another object of the invention is to provide a feed means for record material to feed the record material into printing position, and automatic means to control the feed means in such a manner that the record material is either ejected, line-spaced, or not fed at all, said automatic means being modified by a sensing means to always eject the record material after the last line of the record material has been printed upon.

Another object of the invention is to provide a printing means for entering records in a pass book, a second printing means to simultaneously enter records on a ledger card, feeding means for each, and sensing means to eject either the book or the card, or both, when the last line thereon has received entries.

With these and incidental objects in view, the invention includes certain novel features of construction and combinations of parts, a preferred form or embodiment of which will be described hereinafter with reference to the drawings which accompany and form a part of this specification.

Of said drawings:

Fig. 3 is a detail view showing the main framework of the machine.

Fig. 4 is a right side view of the machine and shows certain parts of the totalizer-engaging mechanism.

Fig. 5 is an elevational view showing the add-subtract totalizer shifting mechanism, together with certain elements of the amount and transaction differential mechanisms.

Fig. 6 is a detail view showing a cross section through one denominational order of the add-subtract totalizer.

Fig. 7 is a plan view showing parts of the two cam lines for the machine and the clutch for controlling the machine for one-cycle or two-cycle operations.

Fig. 8 is a cross-sectional view showing an amount key bank and an amount differential.

Fig. 9 is a detail view of the reset mechanism for the tens transfer mechanism of the machine.

Fig. 10 is a detail view of the cams for actuating an amount differential.

Fig. 11 is an enlarged detail view of an amount actuating mechanism.

Fig. 12 is a chart showing notching for control plates for the printing mechanism.

Fig. 13 is a cross-sectional view of the third transaction bank.

Fig. 14 is a detail view of a part of the transaction bank differential driving mechanism.

Fig. 15 is a detail view of a part of the mechanism for actuating the mechanism shown in Fig. 14.

Fig. 16 is a detail view of a part of the transaction differential driving mechanism.

Fig. 17 is a detail view of the cycle control mechanism.

Fig. 18 is a detail view of the clutch mechanism for starting a machine operation.

Fig. 19 is a detail view showing the mechanism for releasing the switch through the motor for driving the machine.

Fig. 20 is a circuit diagram for the motor and the electrical connections for unlocking the machine after an item has been entered on the last line of either the book or the card, or both.

Fig. 21 is a detail view of a detent for locking the keys of the first transaction differential bank in either undepressed or depressed positions.

Fig. 22 is a detail view of a release detent for partially releasing the machine by certain keys of the first transaction bank.

Fig. 23 is a detail view of a detent for releasing the machine upon depression of certain keys in the first transaction bank.

Fig. 24 is a detent for releasing the machine upon depression of certain keys in the second transaction bank.

Fig. 25 is a detent for releasing the machine upon depression of any key of the third transaction bank.

Fig. 26 is a top plan view of the detents and the releasing mechanism shown in Figs. 22 to 25 inclusive.

Fig. 27 is a detail view of a switch together with its operating arm for actuating the machine release means for unlocking the machine after a last line has been printed upon in either the book, the card, or both.

Fig. 28 is a detail view of a control bar actuated by a key of the third transaction bank for closing the switch shown in Fig. 27.

Fig. 29 is a detail view of a control bar actuated by certain keys of the first transaction bank for closing the switch shown in Fig. 27.

Fig. 30 is a detail view of a control bar in the third transaction bank to prevent accidental depression of two adjacent keys therein.

Fig. 31 is a detail view of the detent for maintaining a depressed key in the transaction banks depressed, and shows a special control plate located in the second transaction bank.

Fig. 32 is a detail view of a detent in the first transaction bank for controlling the old balance lock release mechanism.

Fig. 33 is a detail view of a control detent in the second transaction bank.

Fig. 34 is a detail view showing the connection for maintaining a yoke, illustrated in Fig. 40, in its normal position.

Fig. 35 is a detail view of an interlocking detent, located in the second transaction bank, which is operated under control of the detent in the first transaction bank, shown in Fig. 32.

Fig. 36 is a detail view of a part of the mechanism shown in Fig. 41.

Fig. 37 is a detail view of a detent located in the second transaction bank for locking the trial balance key either against depression or in its depressed position.

Fig. 38 is a detail view of a part of the mechanism for blocking movement of the zero stop pawls in the amount differential banks when the total key has been depressed.

Fig. 39 is a detail view of the flexible detent in the second transaction bank for holding certain transaction keys in their depressed positions.

Fig. 40 is a detail view of the control slide in the first transaction bank, forming a part of an interlock between the total-taking keys and the amount keys.

Fig. 41 is a detail view of the mechanism for preventing release of the machine by total keys with amount keys depressed, and for controlling the operation of the zero stop mechanism in the amount banks when a total-taking key has been depressed.

Fig. 42 is a detail view of the mechanism for preventing locking of the machine after the printing of an item on the last line of a book, a card, or both, to permit printing a balance or an overdraft in the same line on which the last item has been printed, or to permit ejection thereof.

Fig. 43 is a detail top plan view of a group of control plates for controlling the engagement of the rear totalizer line with the actuators.

Fig. 44 is a detail view of the totalizer-selecting plate adjusted under control of the third transaction bank.

Fig. 45 is a detail view of the totalizer-selecting plate adjusted under control of the second transaction bank.

Fig. 46 is a detail view of the rear totalizer engaging mechanism, and includes the totalizer-selecting plate adjusted under control of the first transaction bank.

Fig. 47 is a detail view of the mechanism for controlling the engagement of the upper, or add-and-subtract, totalizer.

Fig. 48 is a detail view of a control plate adjusted by the first transaction bank differential mechanism for controlling the mechanism of Fig. 47.

Fig. 49 is a detail view of a control plate adjusted by the third transaction bank differential mechanism for controlling the mechanism of Fig. 47.

Fig. 50 is a detail view of a control plate adjusted by the second transaction bank differential mechanism for controlling the mechanism shown in Fig. 47.

Fig. 51 is a detail view of the cams for rocking the total-taking engaging mechanism in reset timing.

Fig. 52 is a detail view of the mechanism for controlling the movement of the total-taking engaging spider, together with the driving connections from the main drive shaft to the printer cam shaft.

Fig. 53 is a detail view of the mechanism for operating the totalizer-engaging mechanism in add timing.

Fig. 54 is a detail view of the mechanism for controlling the time at which the engaging control feelers for the rear totalizer line are operated in total-taking operations.

Fig. 55 is a detail view of the control plate adjusted by the first transaction bank for controlling engagement of the rear totalizer line.

Fig. 56 is a detail view of a part of the totalizer-engaging mechanism for the rear totalizer line.

Fig. 57 is a detail view of the mechanism shown in Fig. 56, but shown in the moved, or totalizer-engaging, position.

Fig. 58 is a detail view of the add and total-taking engaging mechanism for the two totalizer lines.

Fig. 59 is a detail view of a control plate located in the first transaction bank for controlling the shifting of the add-and-subtract totalizer.

Fig. 60 is a detail view of a control plate located in the second transaction bank for controlling the shifting of the add-and-subtract totalizer.

Fig. 61 is a detail view of a control plate located in the third transaction bank for controlling the shifting of the add-and-subtract totalizer.

Fig. 62 is a detail view of the mechanism for controlling the shifting of the add-and-subtract totalizer.

Fig. 63 is a detail view showing the mechanism for entering a "fugitive 1" in the lowest denominational order of the add-and-subtract totalizer.

Fig. 64 is a detail view of the "fugitive 1" mechanism operated by the highest order denominational order of the add-and-subtract totalizer.

Fig. 65 is a detail view of a safety device for maintaining the add-and-subtract totalizer in proper engagement.

Fig. 66 is a detail view of an interlock set by the "fugitive 1" mechanism for enforcing the depression of the proper keys for Balance, Sub-Balance, and Overdraft operations as determined by the positive or negative condition of the add-and-subtract totalizer.

Figure 67A:
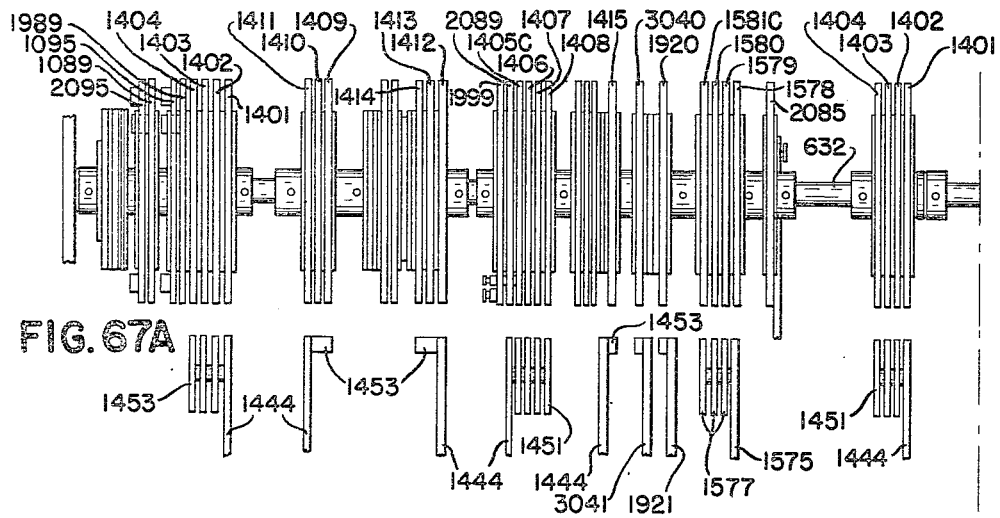

Figs. 67-A and 67-B together constitute a plan view of the various control plates for controlling the functions of the machine, showing the feelers which contact certain ones thereof in relative position thereto, in diagrammatic form.

Figure 68A:
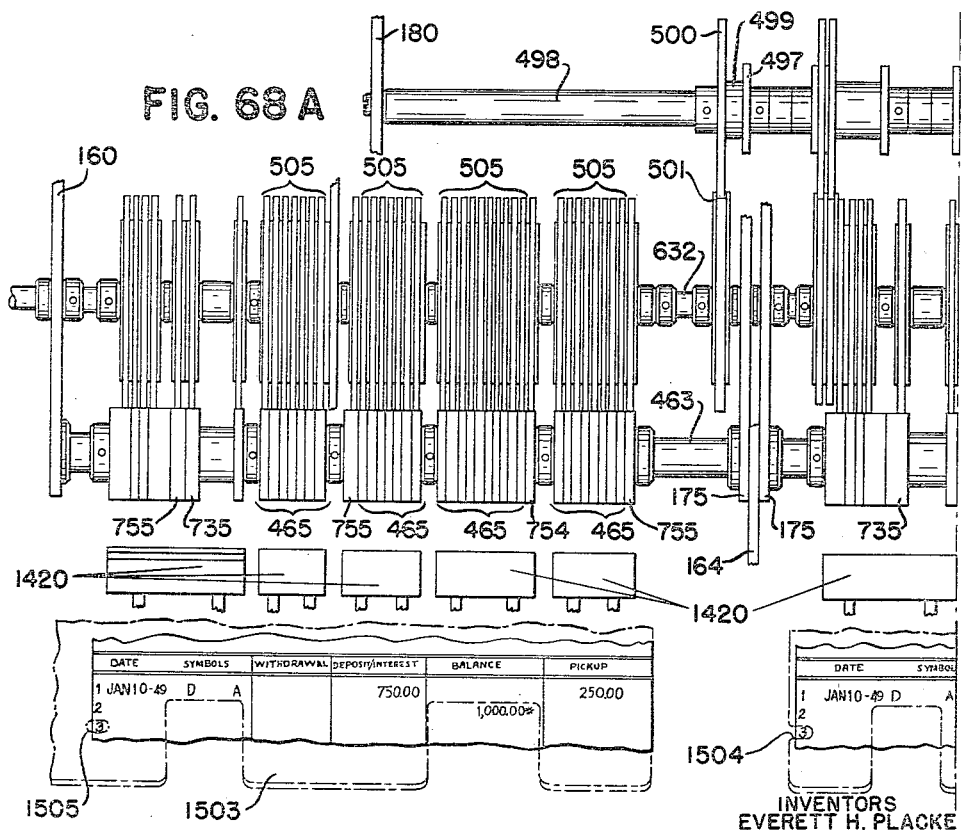

Figs. 68-A and 68-B, taken together, constitute a front elevation of the transmission gears from the amount and transaction differential mechanism, and show the transmission gears for setting up the type elements for printing in the various columns of the card and the book and on the detail strip, and fragmentary portions of each of the record means to indicate which hammer prints in the various columns on the record materials.

Figs. 69-A and 69-B together constitute a top plan view showing the various printing hammers, together with their operating mechanisms, and the mechanism for selecting the hammers for operation. The control plates therefor are omitted for the sake of clearness.

Fig. 70 is a cross-sectional view taken on line 70 of Fig. 69-B and shows one of the printing hammer operating and selecting mechanisms, which is typical of all of the printing hammer operating and selecting mechanisms for the book and the card.

Fig. 71 is a detail view of the bearings for the impression hammer toggle supporting shaft.

Fig. 72 is a detail view taken on line 72 of Fig. 69-B and shows the yieldable support for the printing hammer operating toggle shaft.

Fig. 73 is a detail view of one of the slip feeler operating mechanisms, together with a connection to control the operation of the printing hammer.

Fig. 74 is a detail view of the mechanism for operating and controlling the effectiveness of the tension feed roller.

Fig. 75 is a detail view of a part of the feeler mechanism for the book and card sections of the machine, one such mechanism being provided for each.

Fig. 76 is a top plan view showing the two tension roll control mechanisms, one for the book and the other for the card.

Fig. 77 is a detail view showing one of the mechanisms for feeding and ejecting the book and the card, together with a control plate to control the effectiveness thereof.

Fig. 78 is a top plan view showing the location of the feed and tension rollers, one such unit being provided in the book section and one in the card section.

Fig. 79 is a detail view of a part of the mechanism for controlling the effectiveness of the feed control link.

Figure 80:
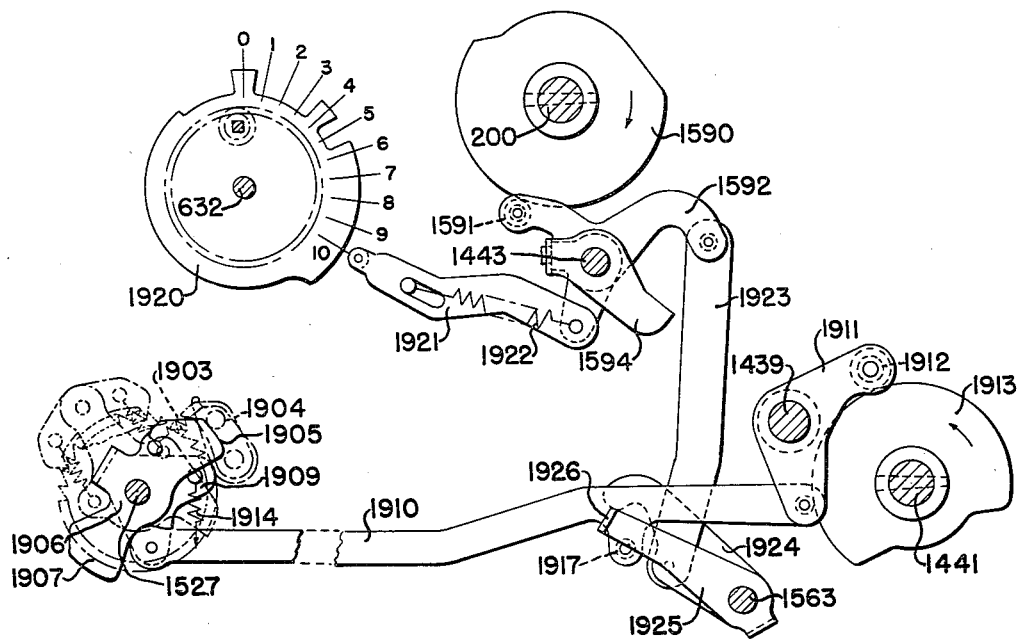

Fig. 80 is a detail view of the mechanism for controlling the effectiveness of the book and card feed pawls, together with the control disk for determining the effectiveness thereof.

Figure 81:
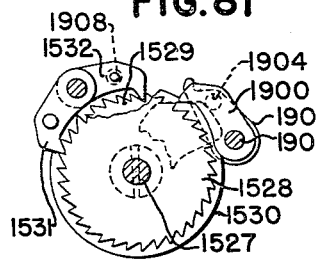

Fig. 81 is a detail view of a part of the mechanism shown in Fig. 80.

Figure 82:
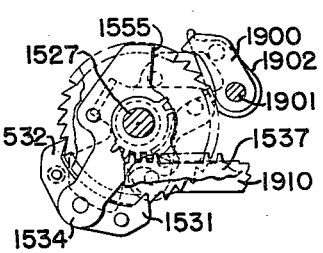

Fig. 82 is a detail view of a part of the mechanism shown in Fig. 80 and shows the parts in the position which they assume at the end of the "feed-in" operation.

Figure 83:
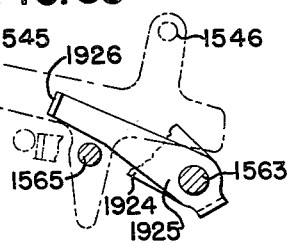

Fig. 83 is a detail view of a part of the mechanism for controlling the effectiveness of the feed mechanism shown in Fig. 77.

Figure 84:
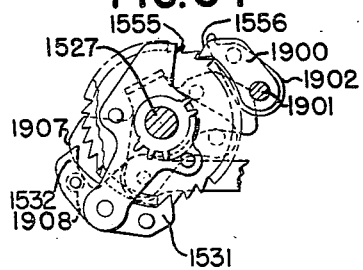

Fig. 84 is another detail view of the mechanism shown in Fig. 82 and shows the mechanism with the retaining pawl in its effective position.

Fig. 85 is a top plan view showing the book and card feeding mechanisms, together with the various controls for controlling their effectiveness.

Fig. 86 is an exploded view of the mechanism shown in Fig. 87.

Fig. 87 is a detail view of the feeler mechanism coacting with the book to lock up the machine release mechanism after the last line has been selected for receiving an item entry.

Fig. 88 is a part of the mechanism shown in Fig. 87 and shows a connection therefrom to a transmitting mechanism for controlling the printing and ejecting mechanism when the last line has been printed upon.

Fig. 89 is a detail view of part of the mechanism shown in Figs. 86 and 88.

Fig. 90 is a detail view of a part of the mechanism shown in Figs. 86 and 87.

Fig. 91 is a detail view of a part of the transmitting mechanism and a fragmentary portion of the operating means thereof, which is operated to position the transmitting mechanism when the last line on the card is printed upon.

Fig. 92 is a detail view of the operating mechanism for the transmitting line for operating the controls for the printing and ejecting mechanism when the last line of the card has been printed upon.

Fig. 93 is a detail view of another element in the transmission line for controlling the printing mechanism when the last line on the card has been printed upon.

Fig. 94 is a detail view of a part of the transmitting mechanism for controlling the printing and ejecting mechanisms when the last line of a book has been printed upon.

Fig. 95 is a detail view of another element of the transmitting line for controlling the printing and ejecting mechanisms when the last line on the book has been printed upon.

Fig. 96 is a detail view of another element in the transmitting mechanism for controlling the printing mechanism when the last line of a card has been printed upon.

Fig. 97 is a detail view of the control plate and the feeler coacting therewith for controlling the printing mechanism when the last line of a card has been printed upon.

Fig. 98 is a detail view of another element of the transmitting line for controlling the printing mechanism when the last line of a book has been printed upon.

Fig. 99 is a detail view of a part of the transmission mechanism for controlling the printing mechanism when the last line of the book has been printed upon.

Fig. 100 is a detail view of the control element, together with the feeler coacting therewith, for controlling the printing mechanism when the last line of the book has been printed upon.

Fig. 101 is a plan view of the mechanism for locking up the machine-releasing mechanism when the last line of either the book or the card has been printed upon, together with the mechanism for unlocking the machine-release mechanism to permit the printing of either a balance or an overdraft on the same line on which the last item entry has been made on either the book or the card.

Fig. 102 is a detail view of a part of the mechanism for restoring the machine-release mechanism after it has been locked upon printing on the last line on either the book or the card, and shows certain elements for unlocking the machine-release mechanism to permit printing of either the balance or an overdraft in the Balance column on the same line with the last item entered.

Fig. 103 is a detail view of the mechanism for locking up the machine-release mechanism after the last line of a book or card has been printed upon, together with the means for releasing the locked machine-release mechanism to permit the printing of a balance or an overdraft in the Balance column on the same line with the last-entered item.

Fig. 104 is a detail view of the feeler mechanism coacting with the ledger card to lock up the machine-release mechanism after the last line has been selected for receiving an item entry.

Fig. 105 is a chart for indicating how the control plates for the selection of the printing hammer and feed mechanisms for the system illustrated herein are notched.

Fig. 106 is a time chart showing the time of operation of the various mechanisms in the main part of the machine.

Fig. 107 is a time chart showing the time of operation of the mechanism in the printing sections of the machine.

Fig. 108 is a time chart showing the operation of certain mechanisms during a two-cycle operation.

*General description*

The invention disclosed herein is adapted to a machine of the type illustrated in the above-mentioned Goodbar et al. patent. The machine of said patent was provided for handling commercial bank tellers' accounts. The present invention is illustrated in a machine for use in a savings bank wherein the depositor is provided with a pass book which is presented to the teller at the time the deposit or withdrawal is made, and the bank has a ledger card bearing records corresponding to the records made in the pass book. The present machine has three printing sections. The left-hand section (Fig. 1) is provided with a table for receiving the ledger card. The center section is provided with a table for the pass book, and the right-hand section is provided with a printing mechanism for printing, on an audit strip which is retained in the machine, all of the data entered in the book and on the ledger card. The audit strip mechanism is the same as that shown in the above-mentioned Goodbar et al. patent and is therefore not illustrated herein.

The machine is provided with a line-finding mechanism, and the teller positions the book and the ledger card on the table in accordance with the last line upon which an item was printed. The lines upon which the last record was entered may not be the same on the book as on the card. However, the feed mechanism is so controlled that the individual lines on the card and on the book are selected irrespective of which line on the other record medium is selected. One of the features of the present invention is that, after the last line upon either the book or the card, or upon both the book and the card, has been printed upon, the machine-release mechanism is locked up to prevent any further deposits or withdrawals from being entered in the machine. However, the machine may be released by the Balance key, the Sub-Balance key, or the Overdraft key, so that a balance can be printed in the Balance column on the last line on the book or on the card.

In order to be able to print the proper balances, whether they are positive or negative, or whether a deposit amount or a withdrawal amount is being entered, a novel adding and subtracting totalizer is provided in the machine as illustrated. The selection mechanism for the positive or negative wheels of the adding and subtracting totalizer comprises a novel mechanism for directly shifting from one side to the other with a minimum amount of time consumed during the machine cycle.

The adding and subtracting totalizer is mounted on the upper totalizer line. The back totalizer line is provided with ten interspersed totalizers, nine of which are selected by the keys of the third transaction bank, indicated in Fig. 2 as row 3, and the key 3 in the second transaction bank controls the selection of the tenth totalizer on the back totalizer line.

As before mentioned, the pass-book-printing mechanism is located in the center of the machine and is adapted to print in four columns. The column to the left is adapted to receive the date on which the transaction is entered and characters indicating which keys in the third transaction bank and in the first transaction bank have been depressed. The second column is adapted to receive seven digit amounts. The third column is adapted to receive three identifying characters, representing the keys in the second transaction bank, and seven amount digits. The fourth column is adapted to receive ten digits of amounts and a symbol indicating which key in the first transaction bank has been depressed.

The ledger card is divided into five columns, in which records may be printed. Beginning at the left, the first column receives the date of the entry, characters or symbols indicating the key in the second transaction bank which has been depressed, and symbols indicating the keys of the third transaction bank and the first transaction bank. The second column will receive seven amount digits. The third column may receive two symbol characters, indicating the keys of the second transaction bank which have been depressed, and seven amount digits. The fourth column from the left is adapted to receive ten amount digits and a symbol set up by the first transaction bank. The fifth column is adapted to receive eight digits and a symbol set up by the second transaction bank.

Both the book-printing mechanism and the card-printing mechanism are provided with feelers to throw off the printing and feeding mechanisms in the event no book or card is placed on the table in position to receive an entry.

The automatic controls effected by each key of the three transaction banks are briefly tabulated below:

Balance key

When the Balance key is used alone or with the Trial Balance key of the second transaction bank, the plus side of the add-subtracting totalizer is cleared. If the add-subtracting totalizer has been overdrawn, the Balance key is automatically locked out. Depression of the Balance key also releases the keys A and B of the first transaction bank unless they are locked down by the key-operated locks. The Balance key controls the printing mechanism to print on the audit tape and in column 4 on the ledger card and on the book. The Balance key controls the ejecting mechanisms to eject the card and the book. The machine is controlled for a one-cycle operation. The Balance key cannot be depressed when either the Read key or the Reset key has been depressed. When the Balance key is depressed in combination with the Trial Balance key of the second transaction bank, the amount standing on the add-and-subtract totalizer is transferred to the "10" position on the back totalizer. Also, if the machine-release mechanism is locked against operation after the last line of the ledger card or of the book has been printed upon, depression of the Balance key will unlock the locked machine-release mechanism, so that a balance can be printed on the same line with the last printed amount on the book or on the card.

Sub-Balance key

This key may be used with keys A or B in the first transaction bank. The Sub-Balance key is locked against depression when an overdraft is standing on the add-subtract totalizer. When the amount on the add-subtract totalizer is positive, this key selects the adding side of the add-and-subtract totalizer, and the amount standing thereon is recorded in the book and/or on the card. The Sub-Balance key controls the printing in column 4 on the ledger card and in the book and causes both to be non-ejected. A sub-balance operation controls the machine for a one-cycle operation. This key can not be depressed when a Read key or a Reset key is depressed. When the machine release mechanism is locked after the last line of either the book or the card has been printed upon, the Sub-Balance key releases the machine, so that the balance can be printed on the same line as the last printed item. In the event the Sub-Balance key is depressed after the last line in the book has been printed upon, the Balance key disables the printing in column 4 of the ledger card and causes the book to be ejected. When used after the last line of the ledger card has been printed upon, the Sub-Balance key disables the printing mechanism in column 4 on the book and causes the ledger card to be ejected. When the Sub-Balance key is used after both the ledger card and the book have been printed on the last line, the sub-balance is printed in the fourth column on both the book and the card, and thereafter both are caused to be ejected from the machine.

Overdraft key

Depression of the Overdraft key controls the machine to go through a two-cycle total-taking operation. The Overdraft key is locked out when a positive amount is standing on the add-subtract totalizer and can clear only the negative side of the add-subtract totalizer. If the A and B keys are depressed and are not locked down, depression of the Overdraft key releases them. The Overdraft key causes an impression to be made in column 4 on the ledger card and in the book and ejects both the ledger card and the book after the impressions have been made. In the event the machine-release mechanism has been locked after printing has been effected on the last line, the overdraft mechanism will release the machine-release mechanism, so that the overdraft operation can be carried out.

Minus key

Depression of the Minus key controls the add-and-subtract totalizer to cause subtractions to be made therefrom and causes a record to be made in column 4 on both the ledger card and the book; or, if it is desired to use the machine as an adding-subtracting machine, a slip may be inserted either in the book printer or in the ledger card printer.

Eject key

The Eject key is used to eject the ledger card and the book when no prints are to be made thereon and the book and the card remain on the table. This key must be used to release and eject forms which are used for taking off totals after sub-total and total operations.

Total key

The Total key releases the machine for a two-cycle operation and is used for clearing totals from the totalizers on the rear line. This key is not a motorized key and must be used in connection with other keys, such as the Book Interest key in the second transaction bank or any of the keys in the third transaction bank. An auditor's lock is provided to lock this key against depression, so that the auditor may have full control over who takes off totals from the machine. The totals are printed in column 4 on the ledger card or book, or, in the event a take-off form is used, the totals are printed in column 4 in both the ledger card and book printers.

Sub-Total key

The Sub-Total key performs the same functions as those given for the Total key except that a sub-total is printed and the total remains in the variously selected totalizers.

"B" key

This key is a non-release key and will stay down until released by the "A" key, the Balance key, the Overdraft key, the Total key, the Sub-Total key, or a manually-operated lever. However, this key may be locked down or out by an individual auditor's lock, in which case the above-mentioned keys do not release it. This key must be depressed for a machine operation in connection with all keys except those mentioned above. The "B" key prints a symbol in column 1 on the ledger card and book but does not control any printing or feeding mechanism.

"A" key

The functions of the "A" key are the same as those of the "B" key, just mentioned above.

Book Interest key

The Book Interest key is used in connection with the Total, the Sub-Total, the "A," or the "B" keys. When the Book Interest key is depressed in combination with the "A" or "B" keys, the amounts entered are added into the tenth position on the back totalizer line and also on the adding and subtracting totalizer. The data is printed in columns 1 and 3 on the ledger card and in the book. The symbols "IN" and "INT." are printed preceding the amount in column 3 on the ledger card and in the book, respectively. When the Book Interest key is used in combination with the Total and Sub-Total keys, the functions of the latter supersede those of the Book Interest key. The Book Interest key is locked out when the Trial Balance key is depressed.

Balance Pickup key

The Balance Pickup key is used with the "A" and "B" keys and also causes the amounts to be entered in the adding and subtracting totalizer. The Balance Pickup key causes a record to be made in column 5 on the ledger card and is locked against further operation until after an operation with the Balance key or the Overdraft key has been performed. This key does not cause the ledger card or the book to be line-spaced.

Account Number key

This key is used to print account numbers on the audit tape only and throws off the totalizers, so that no add or subtract operation can be performed in the machine.

Plus key

Depression of the Plus key controls the add-and-subtract totalizer to cause additions to be made therein and causes a record to be made in column 4 on both the ledger card and the book; or, if it is desired to use the machine as an adding-subtracting machine, a slip may be inserted either in the book printer or in the ledger card printer.

Check No-Book key

The Check No-Book key is used in combination with the keys "A" and "B" when a check deposit is made by a customer and he does not present his book. This key has no control over the printing, but the machine will print a symbol on the audit tape and in column 1 on the ledger card, and will print the letters "CK" preceding the amount in column 3 on the ledger card and on a receipt placed in the book printer. A receipt is placed in the book printer in lieu of the pass book, so that the customer will have a receipt for the deposit made, which has not been entered in his pass book.

No Book key

When a cash deposit is made by a customer and he does not present his book, an entry is made by depression of the No Book key in combination with the "A" or "B" key and the Deposit key. This key will cause a symbol to be printed on the audit tape and in column 1 on the ledger card. A receipt is inserted in this printer in lieu of the pass book, so that the customer will have a receipt for the cash deposit made, which has not been entered in his pass book.

Check key

The Check key is used in combination with the "A," "B," and Deposit keys when a deposit is made by check. A symbol is printed on the audit tape, and the letters "CK" are printed preceding the amount in column 3 on the ledger card and the book.

Overdraft Pickup key

The overdraft Pickup key is used in combination with the "A" and "B" keys and causes a subtract operation from the add-subtract totalizer. The Overdraft Pickup key causes an impression to be made in column 5 on the ledger card. The key is locked out after one operation until the Balance key or the Overdraft key has been used. This key does not cause a line-spacing of the ledger card or the book.

Trial Balance key

This key does not release the machine for operation and may be locked in or out and is always used with the Balance, Overdraft, Balance Pickup, Overdraft Pickup, or Duplicate Deposit Savings Interest keys when interest is posted to the ledger card. Depression of the Trial Balance key locks out the Account Number, Book Interest, Plus, Check No-Book, No Book, and Check keys. A manual lever is provided to release the depressed key, which is not released automatically by the machine. When the Trial Balance key is used in connection with the Duplicate Deposit Savings Interest key, a symbol is printed in column 1, and the symbol "IN" is printed preceding the amount in column 3 on the ledger card. When the Trial Balance key is used in combination with the Balance key, the amount cleared from the add-and-subtract totalizer is transferred to the No. 10 totalizer in the rear totalizer line.

Duplicate Deposit-Savings Interest key

The Duplicate Deposit-Savings Interest key is used in combination with the "A," "B,", Sub-Total, or Total key of the first transaction bank, or in combination with the Trial Balance, "A," and "B" keys. When this key is used in combination with the "A" key or the "B" key, the amounts are added into its own totalizer and into the add-and-subtract totalizer. During this operation, the amount is printed on the audit tape and in column 3 on the ledger card and in the book, both of which are line-spaced. When this key is used with the Sub-Total key or the Total key, the controls of the latter supersede the controls of the Duplicate Deposit-Savings Interest key. When the Trial Balance key also is depressed, a symbol is printed for the trial balance on the audit tape and in column 1 on the ledger card, and the symbol "IN," in front of the amount in column 3 on the ledger card.

Loan Interest key

This key is used in combination with the "A," "B," Sub-Total, or Total key. When it is used with the "A" and "B" keys, the amount is added into the Loan Interest totalizer, and the data is printed on the audit tape and in column 2 on the ledger card and in the book. When the Loan Interest key is used in combination with the Sub-Total and Total keys, the functions of the latter supersede those of the Loan Interest key. Depression of the Loan Interest key must always follow an entry of a loan payment.

Other Loan Payment key

The Other Loan Payment key is used in combination with the "A," "B," Sub-Total, or Total keys, and, when it is used with the "A" and "B" keys, the data is entered into its own totalizer, and the amount is subtracted from the add-subtract totalizer. An entry is made on the audit tape, in columns 1 and 3 on the ledger card, and in the book. The ledger card and the book are line-spaced during this operation. When the Other Loan Payment key is used in combination with the Sub-Total and Total keys, the functions of the latter supersede those of the Other Loan Payment key.

Other Loan Charges key

This key is used in combination with the "A," "B," Sub-Total, and Total keys, and, when it is used with the "A" and "B" keys, the amounts are added into its own totalizer and into the add-subtract totalizer, and the data is entered on the audit tape and in columns 1 and 2 in the ledger card and in the book. The ledger card and the book are line-spaced. When this key is used with the Sub-Total and Total keys, the functions of the latter supersede those of the Other Loan Charges key.

Personal Loan Payment key

This key is used in combination with the "A," "B," Sub-Total, and Total keys. When it is used with the "A" and "B" keys, the amount is entered into its own totalizer and is subtracted from the add-subtract totalizer. Entries are made on the audit tape and in columns 1 and 3 on the ledger card and the book. The ledger card and the book are line-spaced. When the Personal Loan Payment key is used with the Sub-Total key or the Total key, the functions of the latter supersede those of this key.

Personal Loan Charge key

This key is used with the "A," "B," Sub-Total, and Total keys. When it is used with the "A" and "B" keys, the amount is added into its own totalizer and into the add-subtract totalizer. The data is printed on the audit tape and in columns 1 and 2 on the ledger card and in the book. The ledger card and the book are line-spaced. When this key is used with the Sub-Total and Total keys, the functions of the latter supersede those of the Personal Loan Charge key.

Christmas Club key

This key is used with the "A," "B," Sub-Total, and Total keys. When this key is used in combination with the "A" and "B" keys, the data is entered into its own totalizer and is added to the add-subtract totalizer. The data is printed on the audit tape and in columns 1 and 3 on the ledger card and in the book. The ledger card and the book are line-spaced. When this key is used with the Sub-Total key or the Total key, the functions of the latter supersede those of the Withdrawal key.

Withdrawal key

The Withdrawal key controls the add-subtract totalizer to subtract data therefrom, and it controls the entry of the data in columns 1 and 2.

Deposit key

This key is used with the "A," "B," Sub-Total, or Total keys. When it is used with the "A" and "B" keys, the data is entered into its own totalizer and into the add-subtract totalizer. The data is printed on the audit tape and in columns 1 and 3 on the ledger card and in the book. The card and the book are line-spaced. When used with the Sub-Total or Total keys, the functions of the latter supersede those of this key.

Detailed description

Figure 1:
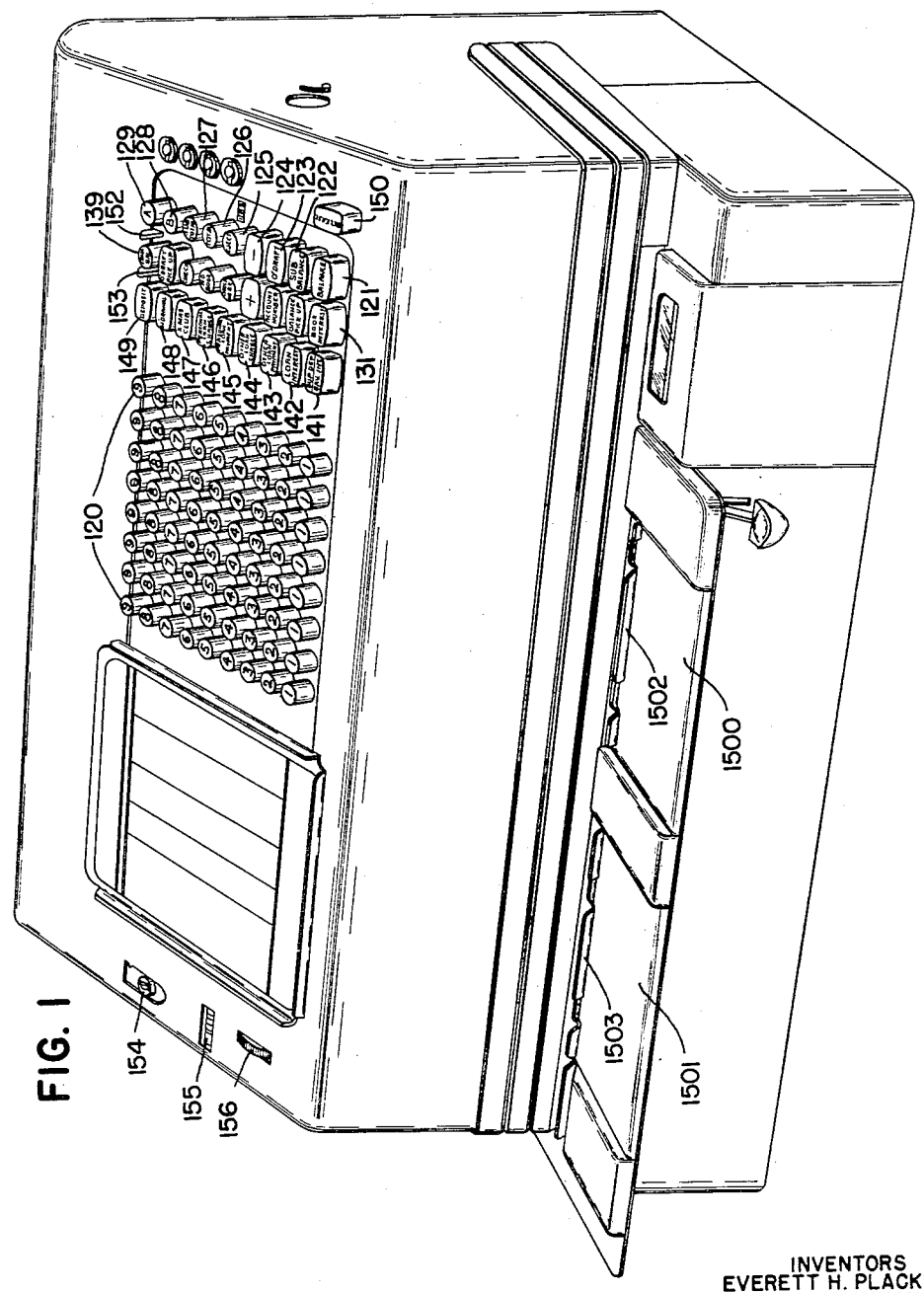
Fig. 1 is a perspective view of the machine, showing the keyboard and the printing tables.
Figure 2:
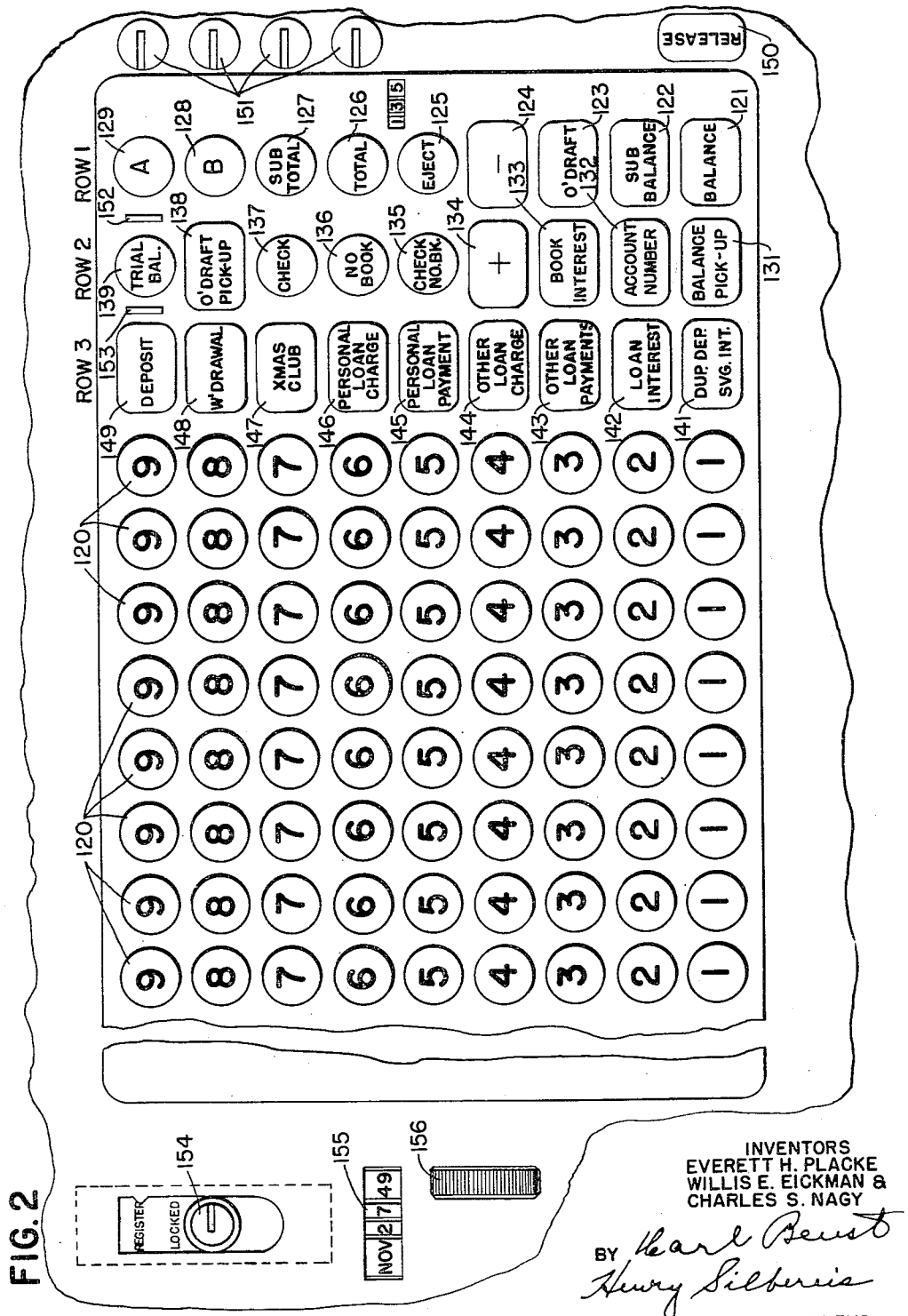
Fig. 2 is a diagrammatic view of the keyboard arrangement.

*Keyboard.*—As shown in Figs. 1 and 2, the keyboard of the machine, as illustrated herein, is provided with eight rows of amount keys 120 and three rows of transaction keys: row 1, or the first transaction row of keys 121 to 129; row 2, or the second transaction row of keys 131 to 139; and row 3, or the third row of transaction keys 141 to 149. The transaction keys are provided with legends to aid in their selection and for controlling the machine in its operations. In addition to the controls indicated by the legends thereon, keys 121 to 125, 131 to 134, 138, and 141 to 149, all inclusive, also release the machine for operation. Keys 126 to 129, 135 to 137, and 139 do not release the machine for operation and must be used in combination with other keys, as pointed out above. Near the lower right-hand corner of the keyboard is a Release key 150, which is used to release the keys on the keyboard if for any reason it is desired to release them after they have been depressed and before the machine has been released for operation. Keys 126 to 129 inclusive are provided with individual locks 151, whereby these keys may be locked against depression.

Keys 126 to 129 inclusive are stay-down keys and remain in their depressed position at the end of the operation of the machine. These keys may be released by the depression of another key in the same row or by a finger-piece 152 (Fig. 2) projecting through the keyboard at the top of the key bank.

The Trial Balance key 139 may be locked out or down. When in depressed position, the Trial Balance key can be released only by the manipulation of a lever 153, shown in Fig. 2 near the top of the keyboard.

A slide lock 154 is provided near the left-hand side of the keyboard for controlling the various functions of the machine, as described in detail in the above-mentioned Goodbar et al. Patent No. 2,616,623.

Date setting dials 155 are also provided and may be adjusted by a knurled knob 156 to set type characters at the printing line in the same manner as shown in the above-mentioned patent.

Main framework

Fig. 3 illustrates the main frames of the machine. The left frame 160 and the right frame 161 are mounted on a base plate 162. Located intermediate the frames 160 and 161 are the intermediate frames 163 and 164, which are supports for the mechanism of the book, card, and audit tape printing mechanisms. The frame plates 163 and 164 are also mounted on the base 162. Secured to the right side frame 161 is an auxiliary frame 165, provided with blocks 166. The blocks 166 are tapped to receive screws projecting through a back frame 167. Another auxiliary frame 168 is provided with blocks 169, threaded to receive screws fastened through the back frame 167. A third auxiliary frame 170 is provided with blocks 171, threaded to receive screws by means of which the auxiliary frame is secured to the back frame 167. A shouldered stud 172 (Fig. 8) is secured to each side of the printer frames 163 and 164, and on each of the left and right side frames 160 and 161, respectively. A series of six auxiliary plates 175 are provided near the front of the machine for supporting the type carrier and setting mechanism. Each auxiliary plate 175 has on its lower rear end a slot which is adapted to straddle the small diameter of the shouldered stud 172 when the type carrier unit, which unit is separately assembled, is inserted into the machine. A cross bar 176 (Figs. 8 and 13) is provided with a series of six notches, into which the upper edge of each of the plates 175 is inserted. After the type carrier unit has been separately assembled, the entire unit is placed in the machine by inserting the notches of the auxiliary plates 175 over the small diameter of the shouldered studs 172, sliding the upper edges of the plates 175 into the notches in the cross bar 176, and inserting a shaft 177 (Fig. 8) through the right side frame 161, through all of the auxiliary plates 175, through the printer frames 163 and 164, and finally through the left side frame 160. Near the rear of the machine, a cross bar in the shape of a formed channel 178 is mounted between the side frames 160 and 161, and another auxiliary frame, 179, is supported on the cross bar 178. A still further auxiliary frame, 180, is also supported on the cross bar 178, and both of the auxiliary frames 179 and 180 are secured to the cross bar 176 by means of screws 181. A shaft 182, described later, is supported between the auxiliary frame 180 and the left side frame 160. A second shaft, 183, is supported between the right side frame 161 and the auxiliary frame 179, which supports certain mechanism described later.

Machine-driving mechanism

The machine may be operated by an electric motor, or by a hand crank. The motor is supported on the auxiliary frame 179. The motor shaft 190 (Figs. 7, 13, 17, and 18) has secured thereon a gear 191, which meshes with a gear 192, loosely mounted on a cam shaft 193.

Secured to the gear 192 is a clutch member 194, with which a clutch pawl 195 engages when the machine is released for operation. The clutch pawl 195 is pivotally mounted on a disk 196, secured to the shaft 193. Also secured to the shaft 193 is a gear 197, meshing with a gear 198 secured to a sleeve 199, rotatably mounted on a main cam shaft 200. Also pinned to the shaft 193 is a gear 201, meshing with a gear 202, secured to a sleeve 203, rotatably mounted on the shaft 200. Secured to the sleeve 203 are two pairs of cams 204 for actuating the first and second transaction bank differentials, and secured to the sleeve 199 is a pair of cams 204 for actuating the transaction differential of the third transaction bank. The three pairs of cams 204 are actuated simultaneously when the shaft 193 is rotated by means of the gears 197 and 201 meshing with the gears 198 and 202, respectively. Thus, when the shaft 193 is rotated, the sleeves 199 and 203 can be rotated independently of the shaft 200. Also secured to the sleeve 199 is a clutch member 205, which normally couples the sleeve 199 to the shaft 200. Mechanism, described hereinafter, is provided for unclutching the sleeve 199 from the shaft 200 during what are known as two-cycle operations, so that the sleeves 199 and 203 can rotate independently of the shaft 200 during the first cycle of a two-cycle operation, and the clutch is so controlled that the sleeves 199 and 203 are coupled to the shaft 200 during the second cycle of a two-cycle operation, which control are described hereinafter in the consideration of the two-cycle operation of the machine.

The shaft 200 also has secured thereto a gear 206 (Figs. 7 and 52), which meshes with a gear 207 mounted on a sleeve 208, carrying cams for operating certain mechanism of the machine, which sleeve is mounted to rotate on a stud 209, carried by the right side frame 161.

If desired, the machine may be operated by a hand crank 210 (Fig. 4), which is slidably mounted on the stud 211 on the right side frame 161. When it is desired to operate the machine by the hand crank, the handle 210 is shifted endwise on the stud 211, to engage it with a hub 212 (Fig. 7) also rotatably mounted on the stud 211. Secured to the hub 212 is a pinion 213 (Figs. 4 and 7) meshing with a pinion 214, which in turn meshes with a pinion 215 and the latter with a pinion 216. The pinions 214 and 215 are rotatably mounted on studs carried by the right side frame 161. The pinion 216 is secured to a shaft 217 supported in a bearing on the right side frame 161, and said shaft has secured thereto a gear 218 meshing with the beforementioned gear 202 secured to the sleeve 203.

Rotation of the crank handle 210 will, through the train of gears just described, rotate the gears 201, 202, 197, and 198, thus rotating the sleeves 199 and 203 in the same manner as they are rotated by the motor through the gear 191. When the machine is operated by the handle, the clutch member 194 merely ratchets over the pawl 195.

Amount key banks

Each bank of amount keys includes a full complement of nine keys 120 (Figs. 1, 2, and 8). Coacting with each bank of amount keys are four control members, including a flexible detent 220, a zero stop actuating plate 221, a locking detent 222, and an interlocking plate 223, which constitute a means for preventing the release of the machine by the depression of certain control keys after an amount key has been depressed. The manner in which the four plates 220 to 223 inclusive operate is disclosed in the above-mentioned Goodbar et al. patent, and reference may be had thereto for a detailed description thereof.

Amount differential mechanism

Located beneath each bank of amount keys 120 (Fig. 8), in a position midway between the staggered keys and so as to be controlled thereby, is a differential actuator slide 250. Each actuator slide 250 is suitably mounted to be supported by, and slide on, two cross bars 251 and 252, supported in the machine framework. The slide 250 is provided on its top with eight projections having flanges 255 bent at right angles thereto, alternately to the right and left in alinement with the shanks of the keys 120. The flanges 255 are so located on the slide 250 that they are controlled by the digit keys 1 to 8, respectively. The slide 250 is provided near its front end with a stop surface 256, which engages the cross bar 251 to arrest the slide 250 in its "9" position. When no amount key is depressed, a flange 257 on a zero stop pawl 258 moves into the path of movement of a flange 259 on the slide 250 to arrest the slide 250 in zero position, which zero position is one step from the home position of the slide. Thus the flanges 255 and 257, together with the surface 256, provide means to selectively and differentially arrest the slide 250 in any one of the ten positions out of its home position, the position to which the slide 250 is moved depending upon whether or not the key has been depressed, or which key has been depressed. Thus it is clear that the differential slide 250 is capable of assuming any one of eleven positions; that is, the home position and the ten positions of adjustment.

The slide 250 (Fig. 11) is provided near its rear end with teeth meshing with a differential segment 266 rotatably mounted on a shaft 267 supported by the framework of the machine. Secured to the segment 266 is an actuator-supporting member 268. Slidably mounted on the actuator-supporting member 268 are two actuator ranks 269 and 270, each being so located as to be engaged by totalizer wheels to be described later.

Upon operation of the machine with an amount key 120 depressed, the actuator slide 250 moves a distance commensurate with the value of the depressed key and, through the teeth 265, rocks the segment 266, and the actuator-supporting member 268, a like distance. This sets the actuator racks 269 and 270 to a position representing the value of the depressed key. After the actuators have thus been set, one or both of the totalizers are engaged therewith, and the slide 250 is thereafter returned to its home position. In returning to home position, the segment 266 and the actuators 269 and 270 are rotated backwardly a number of steps corresponding to the value of the depressed key, thus entering said amount in whichever totalizer or totalizers have been engaged therewith. After the amount has been entered therein, the totalizers are disengaged from the actuators.

The timing of movement of the differential slide 250 is controlled by a leading frame, including a universal rod 275 (Fig. 8). A spring 276, secured at one end to the slide 250 and at its other end to a cross plate 277, supported by the machine framework, normally maintains a shoulder 278 of the differential slide 250 against the universal rod 275. The rod 275 is supported by a plurality of arms 279 secured to a shaft 280. Also secured to the shaft 280 are two cam follower arms 281 (Fig. 10), each having two rollers 282, coacting with a pair of cam plates 283 secured on the main cam shaft 200, one pair of cams being located adjacent the left side frame 160, and the other being located adjacent the frame 179.

During the operation of the machine, the cam plates 283 rotate clockwise (Fig. 10) to rock the arm 281 first clockwise and then counter-clockwise to move the universal rod 275 first to the right and then back to the left. When the universal rod 275 moves toward the right, the spring 276 moves the differential slide 250 toward the right until the slide is arrested by a flange 255 thereon coming into contact with a depressed key 1 to 8, or the surface 256 engages the cross bar 251 in the "9" position, or the zero stop pawl 258 arrests the slide 250 in zero position, whereupon the universal rod 275 completes its rearward movement. Near the end of machine operation, when the universal rod 275 is restored to its home position by the cams 283, the universal rod 275 picks up the differential slide 250 and restores it to its home position, which position is one step beyond the zero position. During this return or movement toward home position, the differential slide 250, through the connection described above, rocks the actuator racks 269 and 270 backwardly a number of steps commensurate with the value of the depressed key, thus entering the amounts in the totalizer wheel or wheels which were engaged therewith.

The object of mounting the actuators 269 and 270 on the actuator carrier 268 in the manner disclosed is to permit relative movement thereof for entering tens transfers, when needed, in the manner fully disclosed and described in the above-mentioned Goodbar et al. patent.

The zero stop mechanism for controlling the operation of the pawl 258 is like that shown in the above-mentioned patent and in the division thereof, United States Patent No. 2,628,780, issued on February 17, 1953. As pointed out in said Patent No. 2,628,780, the zero stop pawl is normally held out of effective position and is moved into effective position by power furnished by the main cam shaft only when the zero stop pawl is needed; that is, when the machine is operated without an amount key 120 depressed.

Totalizers

The machine as illustrated herein has eleven totalizers. The number of totalizers provided in the machine of the type disclosed depends upon the business system in which the machine is to be used. As disclosed herein, a totalizer is provided for each of the keys in the third, or row 3, bank of keys. A tenth totalizer is provided for obtaining a total of the "Book Interest" key of row 2. The ten classification totalizers are mounted on a single shaft and are of the type referred to in the art as "interspersed" totalizers. The construction and selection of the interspersed totalizer is like that shown and described in the above-mentioned Goodbar et al. Patent No. 2,616,623, and therefore no detailed description thereof is given herein. The add-subtract totalizer, or crossfooter, is mounted on the upper totalizer line and comprises a novel mechanism for selecting the add and subtract sides of the two-wheel totalizer, which are geared together in a manner well known in the art.

The interspersed totalizers on the rear totalizer line require shifting for selecting the proper totalizer into which amounts are to be added, or from which totals are to be taken. For this reason, the usual two-cycle operation is required for clearing the selected totalizer on the rear totalizer line. Mechanism, which is described hereinafter, is provided for automatically controlling the machine for either one-cycle or two-cycle total-taking operations.

As before mentioned, the transaction totalizer line comprises ten interspersed totalizers, consisting of totalizer elements 290 (Figs. 8, 11, 56, and 57). The totalizer elements 290 are rotatably mounted on a totalizer shaft 291. The shaft 291 is shiftably mounted in bearings carried by a pair of engaging arms 292, located adjacent the frames 168 and 170. The engaging arms 292 are freely mounted on a rock shaft 293, so as to be rocked thereon. Each arm 292 is provided with a cam slot 294. Engaging each cam slot 294 is a roller 295 carried by an arm 296 mounted on a stud 297, one carried on each of the above-mentioned side frames. Each arm 296 is also provided with a stud 298, projecting into an open slot in each one of a pair of arms 299 secured on the rock shaft 293. The rock shaft 293 is actuated during each machine operation in either add or total-taking timing in a manner described hereinafter.

The shaft 291 is shifted endwise to properly aline the selected totalizer with the actuators 270 before the shaft 293 is rocked. The manner in which the totalizer elements 290 are properly alined with the actuator rack 270 is described in the above-mentioned Goodbar et al. Patent No. 2,616,623.

When the totalizer wheels 290 are in their disengaged positions, as shown in Fig. 56, an aliner 300, engaging between the teeth of the wheels 290, maintains the totalizer wheels against rotation. The aliner 300 is long enough to span the entire totalizer line and extends from the frame 168 to the frame 170. This aliner is in the form of a yoke having a bail and two arms 301, each of the latter having a stud 302 projecting into a cam slot 303 of an engaging arm 299. Upon rocking of the shaft 293, the cam slots 303, engaging stud 302 on the aliner arms 301, disengage the aliner 300 from the totalizer elements 290 after the totalizer elements are properly engaged with the actuator racks 270.

Upper totalizer

The upper totalizer comprises an adding wheel 305 and a subtracting wheel 306 (Figs. 5, 6, 8, 11, 62, 63, and 64) for each denominational order. The wheels 305 and 306 are provided with teeth 308 (see Fig. 6), which mesh with a pinion 309 on a pin 310. The pin 310 projects through a supporting shaft 307, on which the wheels 305 and 306 are mounted to rotate. The wheels 305 and 306 are maintained in proper relation by two collars 311 and 312 pinned to the shaft 307 by pins 313. A sleeve 314, loosely mounted between the wheels 305 and 306, maintains the pinion 309 on the pin 310 and in proper meshing engagement with the teeth 308 of the totalizer wheels 305 and 306.

The add wheel 305 is normally in alinement with the actuators 269, and, when the totalizer wheels are moved into engagement therewith, an adding operation takes place. When a key on either of the three transaction banks, which control the machine for a subtract operation, is depressed, a control is set to cause the subtract wheel 306 to be shifted into alinement with the actuator 269, so that, upon operation of the machine, when the wheel 306 is rocked into engagement with the actuator 269 and the machine is operated, the add wheel 305 is rotated reversely through the teeth 308 on the subtract wheel and the pinion 309. The subtract wheel 306 is shifted into alinement with the actuator 269 by the following mechanism:

Secured to the support shaft 307 (Fig. 5) is a collar 320, which is threaded for adjusting the wheels 305 and 306 in proper alinement with the actuators 269. A yoke 321 straddles the collar 320. The yoke 321 is slidably mounted on two shafts 322 and 323 (see also Fig. 62), and the shafts are supported in the frames 161 and 168. Mounted on the yoke 321 is a roller 324, which projects into a cam slot 325 of a drum cam 326, rotatably mounted on a shaft 327, supported in the frames 161 and 168. A hub 328 connects the drum cam 326 to a gear 329. The gear 329 meshes with a segment 330, rotatably mounted on the shaft 267. The segment 330 is connected to a bell crank 331 by means of a toggle comprising two links 332 and 333. The links 332 and 333 are connected by a stud 334, which projects into a cam slot 335 in a lever 336 pivoted on a shaft 337. The lever 336 is connected to a cam arm 338 by a link 339. The cam arm 338 is pivoted on a shaft 340 and carries two rollers 341 and 342, which engage a pair of cams 343 secured to the beforementioned cam shaft 193 (see also Fig. 7).

A spring-urged retaining pawl 355 is provided with a stud 352 engaging a notch in the segment 330 to hold the segment against accidental movement.

When the cams 343 rock the arm 338 counter-clockwise (Fig. 62), the lever 336 is rocked clockwise to straighten the toggle 332—333. At this time, the segment 330 is held by the retaining pawl 355, and therefore the bell crank 331 is rocked idly in a counter-clockwise direction, with the result that the segment does not actuate the drum cam 326, and the totalizer is not shifted into subtract position.

Near the end of the machine operation, the cams 343, through the cam arm 338, the link 339, and the lever 336, again rock the toggle comprising the links 332 and 333 to its normal position, thus restoring the bell crank 331 to its normal position.

Mounted on the bell crank 331 (Fig. 62) is a roller 345, normally resting on the upper end of a bell crank 346, pivoted on a stud 347. The bell crank 346 is connected to an arm 348 by a link 349. The arm 348 is secured to a clutch release shaft 350, which is rocked counter-clockwise (Fig. 62) when the machine is released for operation in the manner described hereinafter. When the machine is released for operation and the shaft 350 is rocked counter-clockwise, the link 349 rocks the bell crank 346 clockwise (Fig. 62) to withdraw the upper end of the bell crank 346 from beneath the roller 345.

To shift the subtract totalizer wheel 306 (Fig. 62) into alinement with the actuator 269, a stop arm 351, pivoted on a shaft 398, is provided, which is rocked over the roller 345 on the bell crank 331 upon the depression of certain keys in the transaction banks. In the system illustrated herein, the stop arm 351 is rocked into its effective position upon depression of the keys 123 and 124 of the first transaction bank, the key 138 of the second transaction bank, or the keys 143, 145 and 148 of the third transaction bank. Mounted adjacent the first transaction bank keys, so as to be operated thereby, is a control plate 356 (Fig. 59). The control plate is slidably carried on four rollers 357. Adjacent the Overdraft key 123 and the Subtract key 124, the control plate 356 is provided with cam surfaces 358, so that, upon depression of either one of these two keys, studs 579, projecting laterally from the keys, engage the cam surfaces and shift the control plate 356 toward the left (Fig. 59). The right-hand end of the control plate 356 is provided with a stud 359, projecting into a notch of an arm 360, pivoted on a stud 361. The lower end of the arm 360 is bifurcated to engage the bail of a yoke 362, pivotally mounted on the stud 361. The yoke 362 is provided with an arm 363 (Fig. 62) having a stud 364 projecting into the bifurcated end of a bell crank 365. A link 366 connects the bell crank 365 with the control arm 351.

Upon depression of either key 123 or 124 and the shifting of the control plate 356 (Fig. 59) in the manner just described, the yoke 362 is rocked and, through the stud 364, rocks the bell crank 365, which, through the link 366, moves the control arm 351 over the roller 345 on the bell crank 331. Upon release of the machine for a subtract operation, with the control arm 351 over the roller 345, the withdrawal of the bell crank 346 in the manner described hereinbefore frees the bell crank 331 to move clockwise (Fig. 62) during the operation of the machine. This clockwise movement of the bell crank 331 is effected by the cams 343 through the connections including the cam arm 338, the link 339, and the lever 336, which, when engaging the stud 334 to straighten the toggle, comprising the links 332 and 333, cause the roller 345 to engage the lower end of the stop arm 351. When this occurs, the toggle rotates the segment 330 clockwise (Fig. 62) to rotate the drum cam 326 to shift the yoke 321 and the totalizer shaft 307 to bring the subtract wheels 306 into alinement with the actuators 269. Then, during the machine operation, the data set on the keyboard is entered into the subtract wheels 306, which, through the pinion 309, rotates the adding wheel 305 in a reverse direction.

The stop arm 351 is also moved over the roller 345 to cause a shifting of the add-subtract totalizer upon depression of the key 138. The key 138 is provided with a stud 579 (Fig. 60), which projects through a cam slot in the control plate 368 (Fig. 60) adjacent the keys of the second transaction bank. The control plate 368 is slidably mounted on four studs 369. A cam surface 370, formed in the control plate 368, is engaged by the stud 579 on the key 138, and the right-hand end of the slide is provided with a stud 371, engaging the bifurcated end of arm 372, also pivotally mounted on the stud 361. The arm 372 is bifurcated to engage the bail of the yoke 362 in the same manner as described for the arm 360. Therefore, upon depression of the key 138, the yoke 362 is rocked to shift the stop arm 351 over the roller 345 of the bell crank 331 to cause shifting of the totalizer shaft 307 to aline the subtract wheel with the actuators 269.

Adjacent the third transaction bank keys is a control plate 375 (Fig. 61) slidably mounted on studs 376. Cam surfaces 377 are provided adjacent the studs 579 of the keys 143, 145, and 148 of the third transaction bank, so that, upon depression of any one of these three keys, the control plate 375 is shifted to rock an arm 378 by the engagement of a stud 379 on the control plate 375 with the bifurcated upper end of the arm 378. The arm 378 is pivoted on the stud 361 and is bifurcated to engage the bail of the yoke 362.

Upon depression of any one of the keys 143, 145, or 148 and shifting of the plate 375, the arm 378 is rocked to rock the yoke 362 and the arms 363, to shift the control arm 351 over the roller 345. Thus, when the machine is operated with any one of these three keys depressed, the totalizer shaft 307 is shifted to aline the subtract wheel with the actuators 269.

Operation of the machine with the key 124, 138, 143, 145, or 148 depressed will cause a subtract operation. Operation of the machine with the key 123 depressed will initiate a total-taking operation comprising two cycles of operation. During the first cycle of a two-cycle operation, the arm 351, being over the roller 345, will cause the segment 330 to shift the add-subtract totalizer shaft 307 to aline the subtract wheels with the totalizer actuators. Near the end of the first cycle of a two-cycle operation, the bell crank 346 is not restored to its normal position, and therefore, near the end of the first cycle of operation, when the lever 336 is rocked to actuate the toggle links 332 and 333, the bell crank 331 is rocked idly down and up. However, near the end of the second cycle of operation, the clutch release shaft 350 is restored to its normal position, thus restoring the bell crank 346 beneath the roller 345. After the bell crank 346 is moved beneath the roller 345 during the second cycle of operation, the cam 343 rocks the lever 336 to restore the toggle to its normal position. At this time, the roller 345 is impinged between the upper end of the arm 346 and the lower end of the control arm 351, thus causing the segment 330 to be restored to its normal position, which, through the drum cam 326, restores the totalizer shaft 307 to its normal position, in which the add wheels are again in alinement with the actuators 269. The timing of the engagement of the totalizer wheel with the actuators 269 will be described hereinafter in connection both with the add or subtract operation and with a total-taking operation.

Tens transfer mechanism

Each of the two totalizer lines is provided with a tens transfer mechanism whereby "1" is carried into the next higher order wheel when the lower order wheel passes from 9 to 0. Inasmuch as the tens transfer mechanisms for both of the totalizer lines are identical, only the one associated with the rear totalizer line will be described herein. The tens transfer mechanism is identical with that disclosed in the above-mentioned Goodbar et al. Patent No. 2,616,623, and therefore only a brief description will be given herein.

In addition to the tens transfer mechanism, the add-subtract totalizer is provided with a "fugitive 1" mechanism for entering one unit in the lowest order totalizer when the highest order wheel passes from 9 to 0. The "fugitive 1" mechanism is described hereinafter.

The carry-over of one unit into the next higher order wheel is effected by permitting movement of the actuator rack 270 (Fig. 11), mounted on the differential plate 268, one step in addition to the extent of movement that this actuator moves under control of the amount keys. This extra step of movement is relative to the plate 268. The actuator rack 270 is provided with two studs 385 and 386, which project into slots 387 and 388, respectively, formed in the differential plate 268. A spring 389, connected to one end of the rack 270, tends to move the rack counter-clockwise as viewed in Fig. 11. When the differential plate 268 is in its normal position—that is, the position in which the plate 268 comes to rest after an operation of the machine—a stud 390 on the actuator 270 rests against the forward end of an arm 391. When in this position, the actuator rack 270 is in its home, or normal, position; that is to say, no transfer has been effected. When a tens transfer is to be effected, the arm 391 is rocked clockwise (Fig. 11) to withdraw its free end out of the path of the stud 390 to permit the actuator 270 to move one additional step, thus adding one unit in the totalizer element engaged therewith. This tripped condition is illustrated in Fig. 11 with reference to the rear totalizer rack 270, and the untripped condition is illustrated in relation to the actuator rack 269.

The arms 391 are mounted to pivot on a rod 392, carried by a plurality of frame members 393, one frame 393 being provided for each totalizer element. A spring 394, connected at one end to the free end of the arm 391 and at its other end to a rod 395, carried by all of the frame members 393, normally maintains a flange 396, forming a yoke between the arm 391 and an arm 397, in contact with a flange of a yoke 399. The yoke 399 is carried on a rod 400, also supported by the frame members 393. The free end of the arm 391 is in the path of movement of the stud 390 on the actuator 269 when the flange 396 contacts the yoke 399. One arm of the yoke is provided with a flange 421, projecting into the path of a long tooth of the totalizer wheel 290. The yoke 399 is spring-urged clockwise by a spring 422, stretched between one arm of the yoke and the rod 395, to maintain a tail 423, on one arm of the yoke 399, against the rod 392. When the totalizer wheel 290 is engaged with the actuator 270, and the actuator 270, traveling counterclockwise (Fig. 11), rotates the totalizer wheel 290 from its 9 position to its 0 position, the long tooth on the totalizer wheel 290 strikes the flange 421 and rocks the yoke 399 counter-clockwise against the action of the spring 422. This counter-clockwise movement withdraws it from contact with the flange 396 and permits the spring 394 to rock the arm 391 clockwise out of the path of movement of the stud 390 on the actuator 270 for the next higher order. Thereupon, when the actuator plate 268 in the next higher order moves its associated actuator 270 to its home position, the actuator 270 moves one extra step to enter "1" in said next higher order.

Immediately after the amounts, including the tens transfers, have been entered into the totalizer, the totalizer wheels are disengaged from the actuators, and thereafter all of the tripped tens transfer arms 391 and actuators 269 and 270 are restored to their normal positions.

The normal position of the restoring mechanism is shown in Fig. 9, and the position which it assumes at the time the tens transfers are entered is shown in Fig. 11.

The means for restoring the tens transfer mechanism and the actuators comprises a multi-armed plate 450 (Fig. 9) secured to the shaft 267, one plate 450 being provided for each denominational order. All of the plates 450 are pinned to the shaft 267, together with an arm 451, which has pivoted thereto the upper end of a link 452. The lower end of the link 452 is pivoted to an arm 453, pivotally mounted on a stud 454, carried by the left side frame 160. The arm 453 is provided with two rollers 455, coacting with a pair of cams 456.

At the beginning of a machine operation, the cams 456 rock the arm 453 slightly counter-clockwise (Fig. 9), thus raising the link 452 and rocking the multi-armed plates 450 counter-clockwise to the position shown in Fig. 11. When the plates 450 are in this position, the tens transfers may be freely entered into the totalizer wheels. After the amounts have been entered into the totalizer wheels and the appropriate tens transfers have been entered, the totalizer is disengaged from the actuators. Immediately thereafter, the cams 456 rock the arm 453 clockwise (Figs. 9 and 11). This imparts a clockwise movement to the shaft 267 to rock the multi-armed plates 450 clockwise to cause an arm 457, on each one of the plates 450, to engage the studs 390 of the actuators 269 and 270, respectively, to restore them to untripped position. A second arm 458 of each multi-armed member 450 engages a stud 459 on the transfer arms 391 and restores them to their normal positions, whereupon the yokes 399 are restored to their normal positions by the springs 422, to maintain the transfer arm in its normal position. After all of the tripped transfer pawls have been restored, and near the very end of the machine operation, the cams 456 again rock the arm 453 counter-clockwise (Fig. 9), thus rocking the shaft 267 to position the multi-armed plates 450 into the position shown in Fig. 9.

For further details showing and describing the tens transfer mechanism and the resetting mechanism therefor, reference may be had to the above-mentioned Goodbar et al. Patent No. 2,616,623.

*"Fugitive 1" mechanism.*—A "fugitive 1" mechanism is provided for the crossfooter, or add-and-subtract totalizer, so that true negative totals may be printed. This mechanism comprises a means for entering "1" in the units order denomination of the totalizer when the highest order wheel passes through zero in either subtracting or adding direction.

The highest order denomination of the totalizer is provided with a transfer tripping mechanism similar to that provided between the lower denominational orders. The long tooth of either the totalizer wheel 305 or 306 trips the transfer tripping yoke 399, which releases the arm 397 to release the stop arm 391 in the exact manner described above for the lower denominational orders. When the stop arm 391 is rocked clockwise (Fig. 64), it is moved out of the path of movement of a stud 510 on an arm 511, pivoted on the before-mentioned shaft 267. The arm 511 is connected to an arm 512 by a link 513. The arm 512 is pivoted on the beforementioned stud 454, and its lower extension 514 is provided with a roller 515, normally held in engagement with a cam 516 on the main cam shaft 200.

A spring 522, connected to the arm 514, maintains the roller 515 in engagement with the cam 516, and also the link 513 and the arm 511 in the position shown in Fig. 64.

An arm 519, pivoted on a shaft 398, is bifurcated to engage a stud 520 on an operating lever 521. The operating lever 521 is provided with two working surfaces, 523 and 524. When the balance in the crossfooter is positive, the operating surface 523 is in line with a stud 525 on a setting arm 526. When the balance on the crossfooter is negative, the working surface 524 is brought into alinement with a stud 527 on the setting member 526.

The setting member 526 is shown in the positive position, and, if the arm 511 is operated at this time, the operating surface 523 simply moves idly back and forth. If the setting member 526 is in negative position, the stud 525 is in contact with the working surface 523, and therefore counter-clockwise movement of the operating arm 521 shifts the setting member 526 from its negative position into its positive position.

The operating lever 521 is shifted into its moved position, wherein the working surface 524 is in line with the stud 527 on the setting member 526 when the crossfooter is engaged for subtract operations.

Secured to the shaft 307 (see also Fig. 5) is a block 528. The position of the block 528 in relation to the totalizer wheels 305 and 306 is such that the block 528 is out of the path of movement of the arm 519 when the totalizer is in adding position. However, when the totalizer is shifted to the left (Fig. 5) to position the subtracting wheels 306 in line with the actuator 269, the block 528 is moved over the surface 529 on the arm 519. When in this position, and the totalizer is rocked into engagement with the actuators 269, the block 528, engaging the surface 529, rocks the arm 519 counter-clockwise (Fig. 64).

Counter-clockwise movement of the arm 519, through its bifurcated end engaging the stud 520, raises the operating lever 521 to position the working surface 524 into operating position with respect to the stud 527. Thereafter, when the long tooth on the wheel 306 passes through zero, and the stop arm 391 is lowered to release the stud 510, the arm 511 is released for operation during the machine operation.

The cam 516 is provided with a block 530 for releasing the cam arm 512 when a surface 509 thereon drops off of the block 530, which releases the arm 514 to the action of the spring 522 to raise the link 513 and rock the arm 511 counter-clockwise (Fig. 64). Counter-clockwise movement of the arm 511, through the stud 520, rocks the operating lever 521 counter-clockwise (Fig. 64) around the shaft 267, to engage the stud 527 and rock the setting member 526 clockwise.

The setting member 526 is secured to a shaft 531, to which is attached an arm 532 (Fig. 63) adjacent the units order amount bank. The arm 532 is bifurcated to engage a stud 533 on a trip arm 534. The trip arm 534 is provided with a double cam projection 535, which is engaged by a stud 536 on a trip arm 537, pivoted on the rod 392. The trip arm 537 is provided with a stud 538, engaging a finger 539 on a transfer trip arm 540, in the units order transfer mechanism. The trip arm 540 is similar to the trip yoke 399 and is provided with a flange engaged by the flange 396 on the tripping member 397, the same as in the higher order amount transfer mechanisms.

When the shaft 531 is rocked by reason of the highest order totalizer element moving from "9" to "0," the arm 532 rocks the trip arm 534 counter-clockwise (Fig. 63), which, through the double cam projection 535, cams the stud 536 upwardly to rock the trip arm 537 counter-clockwise. Counter-clockwise movement of the trip arm 537, through the stud 538, rocks the trip arm 540 to release the stop arm 391 and free the stud 390 in the units order differential mechanism, to enter "1" in the units order totalizer.

If the totalizer should again pass through zero in the negative direction, when the stop arm 391 is rocked to release the arm 511 to the action of the cam block 530, and the operating lever 521 is rocked, no additional "1" is tripped into the units order, inasmuch as the setting member 526 is already in its moved, or negative, position. However, if the totalizer wheel should pass from a negative condition to a positive condition, which will result from the highest order wheel's passing through zero in an adding direction, with the totalizer in the positive position, the block 528 will not be over the surface 529 of the arm 519, and therefore, when the totalizer is engaged with the actuator while the totalizer is in its positive shifted position, the arm 519 is not rocked; therefore the working surface 523 remains in the position shown in Fig. 64. If the totalizer is in its negative position, the stud 525 will be in engagement with the working surface 523 at this time, and therefore, when the block 530 releases the arm 514 to rock the link 513 and the arm 511 counter-clockwise, the working surface 523, engaging the stud 525, rocks the arm 526 from its negative position into its positive position, shown in Fig. 64. After the arm 511 has been operated by the spring 522, the cam 516 restores the parts to their normal position by engagement with the roller 515, which rocks the arm 514 against the action of the spring 522 to lower the link 513 and restore the arm 511 and the operating arm 521 into their normal positions.

An interlock is provided in the first transaction bank to prevent depression of the Overdraft key 123 when the crossfooter is in positive condition, and to prevent depression of the Balance and Sub-Balance keys 121 and 122, respectively, when the crossfooter is in negative condition.

The shaft 531 (Figs. 5 and 66) has secured thereto an arm 541, connected to a bell crank 543 by a link 542. The bell crank 543 is pivoted on the beforementioned shaft 327 and is bifurcated to engage a stud on a bell crank 544. The bell crank 544 is pivoted on a stud 545, and a link 546 connects the bell crank 544 to a slide 547. The slide 547 is slotted to slide on a pair of studs 548 on the key frame bottom plate 549. The slide 547 is provided with notches 550 for coacting with the studs 579 on the keys 121, 122, and 123.

When the shaft 531 assumes its positive position, the notches 550, coacting with the studs 579 on the Balance and Sub-Balance keys 121 and 122, respectively, are so positioned as to permit the depression thereof. When in this position, the notch 550, coacting with the stud 579 on the Overdraft key 123, is positioned to prevent depression of the Overdraft key. However, when the shaft 531 is rocked clockwise (Fig. 66), by virtue of the totalizer's passing from a positive condition to a negative condition, the link 542, the bell cranks 543 and 544, and the link 546 shift the slide 547 rightwardly (Fig. 66) to lock out the Balance key 121 and the Sub-Balance key 122, and to present the notch 550 beneath the stud 579 of the Overdraft key 123. Therefore, when the crossfooter is in a negative condition, the Balance and Sub-Balance keys are locked against depression, and the Overdraft key is free to be depressed.

*Totalizer frame bracing device.*—It has been found that under certain conditions, when amounts are added to the crossfooter, the crossfooter, by reason of its long span, has a tendency to buckle. To prevent this, a stiffening arm 555 is mounted on a rod 556, and its upper end is provided with a cam edge 557, coacting with a roller 558 on an arm 559, forming a part of the totalizer frame. The cam surface 557 is so shaped that, when the totalizer is rocked into engagement with the actuators, as shown in Fig. 65, a bifurcated arm 560, secured to the rock shaft 398, engaging a stud 561 on the arm 555, rocks the surface 557 into engagement with the roller 558, thus bracing the entire totalizer frame.

23

*Amount type setting mechanism.*—To provide for printing the amounts entered into the totalizer on a ledger card, a book, and an audit strip, a plurality of groups of amount type wheels 465 (Figs. 8, 68–A, and 68–B) are mounted on shafts 463, supported between the pairs of plates 175.

As illustrated herein, the ledger card is adapted to receive amounts in four separate columns, and therefore four sets of type wheels 465 are provided in the ledger card printer. The four columns are illustrated in Fig. 68–A, with the headings "Withdrawal," "Deposit Interest," "Balance," and "Pickup." A fifth column is provided to receive the dates and the symbols.

The book is arranged to receive amounts in three columns, and therefore three groups of type wheels 465 are provided in the book-printing section. These columns are like the columns of the ledger card, except that the "Pickup" column is omitted from the book.

Only one column of amount data is printed on the audit tape, and therefore only one set of amount type wheels 465 is provided in the audit strip printer. The lateral arrangement of the various groups of type wheels 465 is illustrated in Figs. 68–A and 68–B.

Each amount type wheel 465 is adjusted in accordance with the amount entered into the totalizer by the amount differential mechanism. The amount differential mechanism controls the setting of a slide 466 (Fig. 8). The slide 466 is slotted to be supported by the cross bars 251 and 252. The slide 466 is adjusted during each operation to represent the item entered into the totalizer and remains in set position until readjusted during the next succeeding operation. During each operation, when the universal rod 275 is rocked clockwise (Fig. 8) around the shaft 280 to release the differential members 250, the universal rod 275 strikes a surface 467 on the slide 466 and moves it to the right into a position which is hereinafter referred to as the "eliminated" position. The term "eliminated position" is applied to the position that the slide 466 occupies when the type wheel 465 is in the zero eliminated position; that is, in a position in which a blank is on the type wheel at the printing line. After the differential slide 250 has been adjusted differentially under control of the amount keys 120 or the zero stop pawl 258, as hereinbefore described, and after the slide 466 has moved to its "eliminated" position, the two slides are coupled together by a coupling arm 468. Pivoted to the slide 466 by a stud 469, the coupling arm 468 is provided with two coupling teeth 470, which teeth engage with teeth on the lower edges of the differential slide 250. Normally the teeth 470 are in engagement with the teeth on the slide 250, but, before the universal rod 275 moves, the teeth 470 are withdrawn from engagement with the teeth on the differential slides 250, so that the slides may be adjusted independently of each other. After the slides 466 and 250 assume their new positions, the coupling arm 468 is rocked counter-clockwise to again couple the two slides together. After the slides have been coupled together, the universal rod 275 is rocked counter-clockwise (Fig. 8), whereupon the rod 275 picks up the differential slide 250 from the position into which it was adjusted and returns it to its normal position in the manner described hereinbefore. During this movement, the type-adjusting slide 466, being coupled to the slide 250, is moved from its "eliminated" position into a position corresponding to the amount entered into the totalizer by the differential slide 250.

The disengagement and reengagement of the coupling arm 468 are effected by a cam arm 471, mounted on a shaft 461. The cam arm 471 is provided with a cam slot 472, into which projects a universal rod 473 extending across the machine so as to project into the cam slot 472 of the arm 471 for each amount differential mechanism. The universal rod 473 is carried by a plurality of arms 474 pivotally mounted on a shaft 462. Near the center of the machine, and adjacent to one of the arms 474, is

24 an arm 475, bifurcated at its upper end to engage the universal rod 473. A coupling pawl 476 is pivoted on the arm 475 by a stud 477. The coupling pawl 476 is provided with a nose lying in the path of a shoulder 479 of an arm 480, sleeved to a bell crank 481, pivoted on the shaft 462. The bell crank 481 is provided with two rollers 482, which are held in contact with a pair of cams 483, securely mounted on the main cam shaft 200.

When the main cam shaft 200 is rotated during the operation of the machine, the cams 483, coacting with the rollers 482, rock the bell crank 481 first counterclockwise (Fig. 8) and then clockwise. During the counter-clockwise movement of the bell crank 481 and the arm 480 sleeved thereto, the shoulder 479 on the latter engages the nose of the pawl 476 and rocks the arm 475, the shaft 462, and the universal rod 473 counterclockwise, which action, through the cam slot 472, rocks the arm 471 clockwise. Clockwise movement of the arm 471 brings a finger 484 thereon into contact with a stud 485 on the coupling arm 468 and rocks the coupling arm 468 clockwise to disengage its teeth 470 from engagement with the corresponding teeth on the differential slide 250. After the differential slide 250 has been adjusted under control of the amount keys or the zero stop pawl, and the type setting slide has been moved to its "eliminated" position, the cams 483 rock the bell crank 481 and the arm 480 clockwise and, acting through a finger 486 on the arm 480, engage the universal rod 473 and restore it clockwise. This movement of the universal rod 473, acting on the cam slot 472, raises the arm 471 and, through the stud 485, reengages the teeth 470 with the teeth on the under side of the differential slide 250.

After the coupling arm 468 is reengaged with the teeth on the slide 250, the universal rod 275 restores the differential slide 250 to its home position. Inasmuch as the two slides are coupled together by the coupling arm 468 at the time the slide 250 is restored to its home position, the amount type setting slide 466 is moved into a position represented by the amount entered into the totalizer.

The amount type wheels 465 (Fig. 8) for the eight groups of type wheels shown in Figs. 68–A and 68–B are adjusted by the type setting slides 466 in the manner herein described for one of the amount banks. The amount setting slide 466 (Fig. 8) is provided with teeth 496, which engage a pinion 497, rotatably mounted on a shaft 498, one of which is provided for each amount bank of the machine. Connected to the pinion 497 by a hub 499 is a segment 500 (see also Figs. 68–A and 68–B). The segment 500 meshes with a ring gear 501, similar to that shown in United States patent to Walter J. Kreider, No. 1,693,279, issued November 27, 1928. The ring gear 501 is provided with internal teeth 502, meshing with a pinion 503 on a square shaft 504. A separate shaft 504 is provided for each amount bank, as fully disclosed in the above-mentioned Goodbar et al. Patent No. 2,616,623. The square shafts 504 extend through all the ring gears, as disclosed in the last-mentioned patent. Located in a line with each type wheel 465 for the eight groups of type wheels (Figs. 68–A and 68–B) are ring gears 505, one located in each group of type wheels 465 for each amount bank. Mounted on the square shaft 504, in alinement with each of the ring gears 505, is a pinion similar to the pinion 503 (Fig. 8), which meshes with internal teeth of the ring gears 505. Each ring gear 505 is provided with teeth 508, which mesh with tooth-like notches in the type wheels 465 whereby the type wheels are adjusted to an extent equal to the adjustment of their corresponding ring gears.

From the above it is apparent that adjustment of the type setting slide 466 by its teeth 496, the pinion 497, the segment 500, the ring gear 501, the pinion 503, the square shaft 504, and the ring gears 505 adjusts the type wheel 465 in each group of type wheels in accordance with the amount entered into the totalizer.

The type setting slides 466 are controlled in their movements, so that zeroes are not printed above the highest significant order, in the manner fully described and pointed out in the above-mentioned Goodbar Patent No. 2,616,623.

*Transaction bank differential mechanisms.*—The keys 121 to 129 inclusive of row 1, also known herein as the "first transaction" bank; the keys 131 to 139 inclusive of row 2, also known herein as the "second transaction" bank; and the keys 141 to 149 inclusive of row 3, also known herein as the "third transaction" bank, control the operation of a differential mechanism associated with each bank of keys. The differential mechanisms are differentially adjusted for controlling the machine operations, for controlling the engagement and disengagement of the proper totalizers with the amount actuators for both adding and subtracting operations, and for controlling total-taking operations. The third transaction bank keys also select one of the totalizers on the interspersed line for engagement with the actuators. The differential mechanisms for each of the three rows of transaction keys are identical; therefore only one will be described herein, and, for convenience, row 3, or the third transaction bank, has been selected for description.

Each transaction key is provided at its lower end with a square stud 597. Coacting with the studs 597 is a differentially-settable slide 689 (Figs. 13 and 16). The studs 597 of the transaction keys project alternately to the right and to the left into the paths of alternatingly-arranged ears 690, formed on the slide 689. The relationship between the studs 597 and the ears 690 is such that, on operation of the machine with a key depressed, the slide 689 is arrested in a position commensurate with the position of the depressed key. The slide 689 is slotted at its front and rear ends to be supported and slide on collars 691 and 692, carried by studs 693 and 694, respectively.

The slide 689 is provided with teeth 696, meshing with a segment 697 (Fig. 16) of an arm 698, having a slot 699, into which projects a stud 700 of a latch 701 (Figs. 14, 15, and 16). The arm 698 is rotatably mounted on a stud 702, carried by the framework of the machine. The latch 701 is pivotally mounted on a stud 703, carried by an arm 704, also pivotally supported on the stud 702. A beam 705 is pivotally mounted on the arm 704 by a stud 706. The free end of the beam 705 is provided with a stud 707, which projects into a slot 708 of an arm 709, also pivoted on the stud 702. The arm 709 is provided with a segment 710, meshing with teeth 711 (Fig. 13) of a control slide 712. The control slide is slidably mounted on the aforesaid collars 691 and 692, and at its upper end by a stud 688, mounted between the frames 163 and 165.

The latch 701 (Figs. 14 and 15) is provided with a toe 713, normally engaging a notch 715 of a differential driver 716. The differential driver 716 is pivoted on the stud 702 and is provided with a notch 717, into which projects a stud 718 on the free end of a lever 719, pivoted on a stud 720, carried by the frames 161 and 179. The lever 719 is secured to an arm 733 (Fig. 13) by a hub 721. The arm 733 is provided with a pair of rollers 722, which coact with a pair of cam plates 204, secured to, so as to be rotated by, the beforementioned sleeve 199 (see also Fig. 7). The lever 719 is provided with a roller 724, which is movable into engagement with a surface 725 of the beam 705 in the manner to be described presently.

The cams 204 for actuating the differential mechanisms for the first and second transaction banks are secured to the sleeve 203 (Fig. 7).

When the cam plates 204 are rotated, upon rotation of the sleeve 199 or 203, the arm 733 is rocked to rock the lever 719. Rocking movement of the lever 719, through the stud 718 and the notch 717, rocks the differential driver 716 in a like direction. This rocking movement of the driver 716 carries with it the latch 701 and, through the stud 700, rocks the arm 698 clockwise (Fig. 16). Clockwise movement of the arm 698 by the segment 697 moves the slide 689 to the right (Fig. 13) until the ear 690 thereon comes into contact with the stud 579 of a depressed key. This arrests the slide 689 in a position commensurate with the depressed key and at the same time positions the arm 698 in a corresponding position. Arresting of the arm 698, through its cam slot 699 coacting with the stud 700, cams the latch 701 counter-clockwise around its stud 703, thus withdrawing the toe 713 from the notch 715, to arrest further movement of the arm 704. Counter-clockwise movement (Fig. 14) of the latch 701 cams an ear 726 thereon into a corresponding notch 727 (Fig. 13) of a locking plate 728, supported by the studs 720 and 693. Continued movement of the driver 716 after the latch 701 has been disengaged therefrom moves a concentric surface 729 (Fig. 15) thereof beneath the toe 713 and positively locks the latch 701 and the arm 704 in adjusted position, with the result that the stud 706 for the beam 705 is also locked in an adjusted position corresponding to the depressed key.

During the clockwise locking movement of the lever 719 (Figs. 14 and 15), the roller 724 thereon comes into engagement with the surface 725 of the beam 705 and rocks the beam 705 around the stud 706 as a center. The movement of the beam 705 around the stud 706 cams the stud 707 on its lower end into the slot 708 and rocks the arm 709 and the segment 710 into a position corresponding to the position in which the arm 704 has been adjusted and locked by the latch 701. This adjustment of the segment 710, through the teeth 711 on the slide 712, positions the slide 712 corresponding to the adjusted position of the differential slide 689.

After the control slide 712 has been positioned by the beam 705 in the manner just described, the cams 204 return the lever 719 counter-clockwise (Fig. 13) to restore the differential driver 716 to its home position. During this counter-clockwise movement of the driver 716, when the notch 715 again comes beneath the toe 713, the toe 713 drops behind the notch 715, and then, upon continued clockwise movement, the driver 716, acting through a roller 714 thereon, engages the arm 704 and restores the arm 704 and the latch 701 to their home positions. During this movement, the segment 710 and the control slides 712 are held in their adjusted positions by means described in said Goodbar et al. Patent No. 2,616,623, and therefore the beam 705 pivots around the stud 707. The segment 710 remains in the adjusted position until readjusted during the next succeeding cycle of operation.

Three type setting wheels are adjusted under control of the third transaction bank for printing a symbol in the first column of the ledger card, in the first column of the book, and on the audit tape. The type wheels 735 are indicated in Figs. 68–A and 68–B.

The second transaction bank positions five type wheels 755 for printing symbols in the first, third, and fifth columns on the ledger card; in the fourth column of the book; and also on the audit tape.

The first transaction bank sets a symbol-printing type wheel 754 for printing a symbol in the fourth column of both the book and the ledger card, and also on the audit tape.

The setting of the type wheel 735 under control of the third transaction bank differential is described herein, and it is understood that the symbol wheels 754 and 755 are similarly adjusted under control of the differential of the first and second transaction banks, respectively.

Formed on the under side of the control slide 712 are teeth 736 (Fig. 13), which mesh with a segment 737, rotatable on the shaft 498 (see also Fig. 68–B). Connected to the segment 737 by a hub 738 is a segment 739, which meshes with a ring gear 740 on a disk 741, carried by a shaft 510. A pinion 742 meshes with the inner teeth of the ring gear 740 and is mounted on a square shaft 743, extending between the side frames 160 and 161. Lying within a ring gear similar to the ring gear 740, adjacent each of the type wheels 755, and mounted on the square shaft 743, is a pinion, similar to the pinion 742, by means of which the ring gears for the various type wheels are rotated to adjust the type wheels for each of the positions in which a symbol is printed.

The symbol wheels for the first and second transaction banks are adjusted by similar mechanisms. For a more complete description of the manner in which the symbol type wheels are adjusted, reference may be had to the above-mentioned Goodbar et al. Patent No. 2,616,623.

*Totalizer engaging mechanism.*—As described hereinbefore, the selected totalizer on the rear totalizer line is rocked into engagement with the actuator 270 by rocking the shaft 293. A similar rocking shaft 398 is provided for the add-subtract totalizer, and a description of the rocking mechanism for the rear totalizer line will be sufficient to describe the upper totalizer engaging mechanism.

The shaft 293 may be rocked in adding or total-taking timing, and the shaft 398 may likewise be rocked for add, subtract, and total-taking operations. The total-taking timing may be in either read or reset timing. The rocking movement of the shaft 293 for engaging the totalizer with the actuator is under control of a series of notched disks, adjusted by the three transaction bank differential mechanisms. The setting of these disks determines which totalizer line is to be engaged with the actuators, and also whether the engagement movement is to be in add, subtract, read, or reset timing. The control is effected by a series of feelers, which engage the peripheries of the notched disks to determine the proper connections to obtain the various engaging and timing movements. A control plate is also provided for timing the engaging movement of the control feelers during the machine operation. The notched disk assembly for controlling the various engaging movements of the totalizers consists of the disks 801, 802, 803, 804, 805, and 806 (Fig. 43), where the disks are shown in top plan view. The disks 801 to 806 inclusive are located just outside the right side frame 161, as shown in Fig. 67–B. The disks 801, 804, and 806 (Figs. 43, 46, 48, 52, and 55) are set under control of the first transaction bank when the control slide 712 is adjusted under control of the keys 121 to 129, as fully described in the above-mentioned Goodbar et al. Patent No. 2,616,623. Briefly described, each segment 739 meshes with a ring gear 760, rotated on a disk 761, supported on a shaft 632. A square shaft 763 for each bank connects the gear 760 with each disk.

The disk 802 (Figs. 43, 45, and 50) is adjusted under control of the second transaction bank. The disk 803 (Figs. 43, 44, and 49) is adjusted under control of the keys in the third transaction bank. The disk 805 normally maintains feelers, described later, out of engagement with the control disk until the proper time during the machine operation, when the disk 805 is rocked to release the feelers.

When a totalizer on the rear totalizer line, or the add-subtract totalizer, is to be engaged with the actuator racks 270 or 269, respectively, for an add operation, the selected totalizer rock shaft 293 or 398 is coupled to an add-engaging spider 810 (Figs. 53 and 58), rotatably mounted on a shaft 809, which spider is actuated to rock in add timing. If it is desired to engage the selected totalizer with the respective actuators in total-taking timing, the shafts are coupled with a total-taking spider 811 (Figs. 52 and 58), which spider is actuated to rock in total-taking timing for either read or reset operations.

The coupling connections between the spiders 810 and 811 and the totalizer-engaging rock shaft 293 (Fig. 58) for the rear totalizer line include a stud 813, carried by a link 814, pivotally mounted on an arm 815, secured to the engaging shaft 293. The stud 813 normally lies in an intermediate position, in which it is disengaged from both spiders 810 and 811. When the link 814 is rocked clockwise (Fig. 58) about its pivot on the arm 815, the stud 813 is seated into a notch 816 of the add spider 810; then, upon rocking of the add spider 810, the rear totalizer is engaged with and disengaged from the actuator racks 270 in add timing. If the link 814 is rocked counter-clockwise (Fig. 58), the stud 813 is seated into a notch 817 of the total-taking spider. Thereupon, during the machine operation, the totalizer-engaging shaft 293 is rocked in either read or reset timing, depending upon the time movement received by the total-taking spider 811.

The add-engaging spider 810 (Fig. 53) is rocked in add timing by a pair of cams 820, secured to the beforementioned cam shaft 200. Coacting with the cam plates 820 are rollers 821, carried by a bell crank 822, pivoted on a stud 823 in the right side frame. A link 824 connects the bell crank 822 to the add-engaging spider 810.

When the stud 813 for the rear totalizer is in engagement with the notch 816, the cam plates 820, acting through the rollers 821, rock the bell crank 822 first clockwise (Fig. 53) and then counter-clockwise, thereby rocking the spider 810 first counter-clockwise and then clockwise. Counter-clockwise movement of the spider 810, through the stud 813, the link 814, and the arm 815, rocks the shaft 293 counter-clockwise and then back clockwise. The counter-clockwise movement of the shaft 293 (Fig. 57), through the arm 299, the stud 298, the roller 295, and the cam slot 294 in the arm 292, rocks the totalizer wheels 290 into engagement with the actuators 270. The timing of the cam plates 820 is such that they will rock the spider 810 in its initial, or counter-clockwise, direction, after the actuators 270 have been adjusted under control of the amount keys. After the totalizer has been engaged with the adjusted actuators 270, the actuators are returned to their normal positions, which movement enters the amount standing thereon into the selected totalizer elements. Then, after the actuators 270 have entered the amounts set up thereon into the totalizer elements, the cam plates 820 rock the spider 810 clockwise, which, through the stud 813 of the connection just described, disengages the totalizer elements from the actuators 270.

The movement of the stud 813 into the notch 816 of the add spider 810 is under control of the disks 801, 802, and 803. In addition to projecting into the plane of the notch 816 of the spider 810, the stud 813 projects into an opening 825 (Fig. 46) of a bell crank 826, pivoted on a stud 827, carried by the framework of the machine. The bell crank 826 is provided with a stud 828, which is normally embraced by two spring-urged pawls 829 and 830. A spring 831, stretched between an ear of the pawl 829 and an ear on the pawl 830, normally holds the two pawls against opposite sides of the stud 828. The pawls 829 and 830 also embrace a stud 832 on a three-armed member 833, pivoted on the shaft 809. The three-armed member 833 is connected to a bell crank 834 by a link 835. The bell crank 834 is mounted on the beforementioned stud 823 and is provided with a pair of rollers 837, coacting with a pair of cams 836 on the main cam shaft 200.

The cams 836, through the bell crank 834, the link 835, and the three-armed member 833, determine the position of the stud 832. When in the normal, or home, position, the stud 832 controls the positioning of the pawls 829 and 830 (Fig. 46), so as to maintain the bell crank 826 and, through the opening 825 therein, maintain the stud 813 in its normal or ineffective position; that is, in a position in which it does not engage either the add spider 810 or the total-taking spider 811.

The timing of the cams 836 is such that they rock the three-armed member 833 clockwise (Fig. 46) at the beginning of the machine operation, and then, after the actuators 270 have been positioned, the cams 836 rock the three-armed member 833 counter-clockwise to and beyond its home position. Near the end of the machine operation, the cams 836 again restore the three-armed member 833 clockwise back to normal position. If the bell crank 826 is free to operate during the counter-clockwise movement of the three-armed member 833 and the stud 832, the stud 832 rocks the pawl 830 clockwise and, through the spring 831, rocks the pawl 829 likewise, thus carrying with it the stud 828 and the bell crank 826 to move the stud 813 into the notch of the add spider.

Whether or not the bell crank 826 is permitted to move clockwise to engage the stud 813 with the notch 816 is under control of the notched disks 801, 802, and 803. The mechanism for controlling the movement of the bell crank 826 includes a link 840 (Fig. 46), one end of which is pivotally connected to the bell crank 826 and the other end of which is carried between a pair of feeler members 841 and 842. The feeler members 841 and 842 are connected to move as a unit and are pivoted on a stud 843. The free end of the feeling member 841 is provided with a stud 844, which projects over, so as to coact with, the control disks 804 and 805 (see also Figs. 54 and 55).

Connected to the lower end of the feeler 842 is a pivoted pawl having a finger 894, coacting with the control disk 803 (Fig. 44), and a finger 895, coacting with the control disk 802 (Fig. 45). The fingers 894 and 895 are connected to form a pawl 893 by a stud 853, projecting between a pair of spring-urged pawls 897, pivotally mounted on an extension of the feeler arm 842. The spring-urged pawl 897 maintains the pawl 893 in its central position. A third finger, 896 (Fig. 46), is formed on the feeler arm 842 and coacts with the control disk 801.

When the member 833 is rocked counter-clockwise from its clockwise position past its normal position, the stud 832 rocks the spring-urged pawl 830 clockwise (Fig. 46), thus causing the spring 831 to pull on the pawl 829 and tend to move the stud 828 and the bell crank 826 clockwise. If the bell crank 826 is free to move clockwise under action of the spring 831 by reason of a notch or notches being opposite the fingers 894, 895, and 896, the pawl 829, through the stud 828 and the bell crank 826, moves the stud 813 into the notch 816 of the add spider 810. If the finger 896 or the two fingers 894 or 895 engage a high spot on their respective control disks 801, 802, or 803, the link 840 is arrested, and the stud 813 is prevented from engaging the add spider 810.

The notching of the disks 801, 802, and 803 is illustrated herein for the particular system described herein. It is to be understood that the notching may be varied in accordance with any desired system to which the machine may be adapted.

The time of operation of the feeler arm 841 is controlled by the disk 805 (Fig. 54). A link 900 connects the disk 805 with a bell crank 901, having a cam surface 902. A spring 903 maintains a lower arm of the bell crank 901 normally against a stud 908, carried by the machine side frame. The spring 903 normally tends to rock the disk 805 clockwise, thus tending to rock the bell crank 901 likewise around the stud 905. A stud 906, mounted on one plate of the pair of cam plates 204 of one of the transaction bank differential mechanisms, is provided to actuate the bell crank 901. The stud 906 is so located on the cam plate 204 that, after the control disks 801, 802, 803, and 804 have been adjusted, the stud 906 engages the cam surface 902 and rocks the bell crank 901 counter-clockwise (Fig. 54), and this movement, through the link 900, rocks the control disk 805 counter-clockwise, thus releasing the feeler 841 to the action of its spring.

*Totalizer engaging mechanism—read and reset operations.*—The total-taking engaging spider 811 is actuated in reset timing by a pair of cams 855 (Fig. 51). The cams 855 are mounted on, so as to rotate with, the beforementioned sleeve 208. Coacting with the cams 855 are a pair of rollers 856, mounted on a bell crank 854, connected to an arm 857, mounted on a stud 853. The arm 857 is provided with a notch 858, normally engaging a roller 859. The roller 859 is mounted on a stud 861, carried by a link 860, described hereinafter, to which stud 861 is also connected a link 862, the upper end of which is pivoted to the total-taking-engaging spider 811.

When the cams 855 are rotated, the arm 857 is rocked counter-clockwise (Fig. 51) to raise the link 862 and thereby rock the total-taking-engaging spider 811 counter-clockwise (Fig. 52). If at this time the stud 813 is in the notch 817 of the spider 811, the selected totalizer line is rocked into engagement with the actuators 270 before the actuators 270 are operated to reset the totalizer wheels to zero. After the totalizer wheels have been reset to zero, the spider 811 is returned clockwise (Fig. 52) to its home position by the cams 855 (Fig. 51), thus disengaging the totalizer wheels from the actuators 270. After the totalizer elements have been disengaged from the actuators 270, the actuator racks are restored to their normal positions. At the end of this operation, the totalizer elements are standing at zero.

The roller 859 is normally maintained in the notch 858 of the cam arm 857 by a linkage actuated by a cam 863 (Fig. 52). Coacting with the cam 863 is a roller 864, carried by a bell crank 865, pivoted on a stud 866. The bell crank 865 is connected to a lever 867 by a link 868. A spring 869, one end of which is attached to a stud on the side frame of the machine and the other end to a stud 871 on the link 868, normally maintains the roller 864 against the periphery of the cam 863. The lever 867 is pivoted on a stud 872, and the upper end of the lever 867 has pivoted thereto the beforementioned link 860.

During the operation of the machine, when the cam 863 rotates (Fig. 52), the spring 869 moves the bell crank 865 clockwise, thus moving the link 868 to the left (Fig. 52) to cause the feeling finger 873 on the arm 867 to feel the periphery of the notched control disk 806. If the feeling finger 873 of the lever 867 engages a high point of the notched disk 806, the roller 859 remains in the notch 858 of the cam arm 857, and therefore the spider is rocked in reset timing during the machine operation. The notched disk 806 is adjusted under control of the first transaction bank, and therefore, when the machine is operated with the Sub-Balance key 122 or the Sub-Total key 127 depressed, a notched portion of the disk 806 comes into alinement with the feeler 873. Any other key in the first transaction bank which may be depressed positions a high point in front of the feeler to cause the roller 859 to remain in the notch 858 of the arm 857, and the spider 811 is rocked in reset timing. During this operation, the selected totalizer line is reset to zero.

The total-taking engaging spider 811 is rocked in read timing by the cams 855 in combination with a pair of cams comprising the cam 863 and a cam 878 (Fig. 52). During read operations, the spider 811 is rocked counter-clockwise (Fig. 52) by the cams 855 and clockwise by the cams 878. The control for obtaining this result is as follows:

As above mentioned, when the Sub-Balance key 122 or the Sub-Total key 127 is depressed and the machine operated, the first transaction bank differential mechanism adjusts the disk 806 to present a notch into the patch of the feeler 873. During such a machine operation, after the totalizer has been engaged with the actuators and the totalizer has been reset to zero, the cam 863 releases the bell crank 865, the link 868, and the lever 867 to permit the feeler 873 to enter the notch in the notched disk 806. When the feeler finger 873 enters said notch in the disk 806, the spring 869 rocks the lever 867 clockwise from the position shown in Fig. 52 and moves the link 860 to the right to withdraw the roller 859 from the notch 858 and move it into a notch 874 in an arm 875 pivoted on the stud 853. The arm 875 is provided with a pair of cam rollers 877, engaging the cam plates 863 and 878, which cam plates are secured to the beforementioned gear 207.

The relative timing of the cams 855 and 863—878 is such that the first movement of the cams 855 and 863—878 rocks the respective arms 857 and 875 counter-clockwise (Fig. 52) in unison. If, after the arms 857 and 875 have been rocked counter-clockwise, the cam 863 releases the feeler 873 and the feeler engages a high part of the control disk 806, the roller 859 remains in the notch 858 of the arm 857. The cam 855 then rocks the arm 857 clockwise to its normal, or home, position and carries the link 862 therewith to disengage the totalizer from the actuators in reset timing. Inasmuch as the cam arm 857 is moved prior to the movement of the arm 875, the arm 875 is provided with a clearance slot for the roller 859 during this restoring movement of the link 862.

If, during the operation of the machine, the feeler 873 engages a notch in the disk 806 after the arms 857 and 875 have been moved to a counter-clockwise position, the roller 859 is moved into the notch 874 in the arm 875. Thereafter, the arm 857 is restored to its lower position, and, since the roller 859 has been withdrawn from the notch 858, the link 862 remains in its upper position. Later during the machine operation, when the arm 875 is restored to its home position, the notch 874 carries the link 862 downwardly to move the reset spider 811 to disengage the totalizer from the actuators after the amount has been restored into the totalizers.

From the above it is seen that the arms 857 and 875 are moved in their counter-clockwise directions simultaneously, during which time the arm 857 engages the totalizers with the actuators. If, after the arms are set in such counter-clockwise position, the feeler 873 is moved to withdraw the roller 859 out of the notch 858 and into the notch 874, the arm 857 thereafter is restored idly, and the arm 875 restores the spider 811 to disengage the totalizer in read timing.

At the end of each operation, the cam 863 restores the bell crank 865, and therefore the feeler 873, to their home positions, shown in Fig. 52. At this time, the roller 859 is again moved into engagement with the notch 858 in the arm 857. Thus the roller 859 is restored into the notch 858 of the arm 857 at the end of each machine operation.

*Totalizer-engaging mechanism—add-and-subtract totalizer.*—The add-subtract totalizer engaging mechanism for adding, subtracting, or total-taking operations is under control of the mechanism shown in Fig. 47.

The multiple-armed member 833 is provided with a stud 911 (Fig. 47) for controlling the movement of a stud 912 for engagement with the add spider 810 or the reset spider 811. The stud 911 is engaged at opposite sides by spring-actuated pawls 913 and 914. A spring 915 rocks the pawls 913 and 914 toward each other until they are arrested by the stud 911. Mounted on an arm 916, pivoted on a stud 917, is a stud 918, which also projects between the spring-urged pawls 913 and 914. The stud 912 is mounted on a link 919 (see also Fig. 58), pivotally connected to the engaging arm 920 for rocking the upper totalizer shaft 398. The arm 920 is rocked in either add-subtract timing or reset timing, depending on whether the stud 912 is engaged with a notch 923 of the add spider 810 or with a notch 924 of the reset spider 811.

Clockwise movement of the multi-armed member 833 rocks the spring-urged pawl 913 counter-clockwise, thus stretching the spring 915 and tending to move the spring-urged pawl 914 counter-clockwise. The spring-urged pawl 914 may be moved counter-clockwise if the arm 916, carrying the stud 918, is permitted to move counter-clockwise. This counter-clockwise movement is controlled by a finger 925, which is pinned to a shaft 926 and which normally lies in the path of movement of a stud 9201 on a feeler arm 921.

The upper totalizer is controlled for read or reset operations by the Balance, Sub-Balance, and Overdraft keys 121, 122, and 123, respectively. In order to engage the add-subtract totalizer with the reset spider 811, it is necessary for the feeler arm 921 to rock counter-clockwise (Fig. 47). Counter-clockwise movement of the arm 921 is normally prevented by the finger 925 overlying the stud 9201. The finger 925 is pinned to a shaft 926, to which is also pinned a bell crank 927, which projects beneath the studs 579 of the Balance key 121 and the Sub-Balance key 122. Also pinned to the shaft 926 is an arm 9271, which underlies the stud 579 on the Overdraft key 123. The bell crank 927 is provided with a finger which is normally held in engagement with a collar 930 by a spring 928 to properly position the finger 925 in the path of the stud 9201. Depression of either the Balance key 121, the Sub-Balance key 122, or the Overdraft key 123 engages through their respective studs 579 either with the bell crank 927 or with the arm 9271 and rocks the finger 925 against the action of the spring 928 to remove the finger 925 from the path of the stud 9201. Thereafter, during the operation of the machine, when the multi-armed member 833 is rocked clockwise (Fig. 47), a link 922, connecting the feeler arm 921 with the arm 916, is free to move downwardly to rock the feeler arm 921 counter-clockwise. Counter-clockwise movement (Fig. 47) of the feeler arm 921, through the link 922, rocks the arm 916 counter-clockwise, to move the stud 912 into the notch 924 of the reset spider 811.

Depression of either the Balance key 121 or the Overdraft key 123 controls the positioning of the notched disk 806 (Fig. 52) through the differential mechanism of the first transaction bank to position an unnotched section thereof into the path of the finger 873 (Fig. 52) to control the position of the roller 859 for reset operations in the manner described hereinbefore.

Depression of the Sub-Balance key 121 controls the positioning of the notched disk 806 to present a notch in the path of the finger 873 (Fig. 52) to control the positioning of the roller 859 for read operations in the manner described hereinbefore.

Also, depression of the Balance key 121, the Sub-Balance key 122, or the Overdraft key 123 controls the positioning of the disk 806 to present high spots to the stud 9201, so that during balance read or balance reset operations the feeler arm 921 is held against clockwise movement (Fig. 47), and therefore the stud 912 cannot be engaged with the add spider 810 during the balance read or balance reset operations.

Connected to the feeler arm 921 is a companion feeler arm 9211 (Figs. 48, 49, and 50), pivoted on the stud 843, and the two feeler arms 921 and 9211 are connected to move as a unit by the stud 9212, by means of which the link 922 is connected to the feeler arm 921. The feeler arm 9211 is provided with a stud 9202, which overlies the notched disks 801, 802, and 803. When the multi-armed member 833 (Fig. 47) is moved counter-clockwise beyond its normal, or home, position, the spring 915, acting through the spring-urged pawl 913, tends to move the arm 916 clockwise. This clockwise movement of the arm 916 is controlled by the control disks 801, 802, and 803, with which the stud 9202 on the feeler arm 9211 coacts. If, when the multi-armed member 833 rocks counter-clockwise, a notch in each of the control disks 801, 802, and 803 is opposite the stud 9202, and a notch in the control disk 806 is opposite the stud 9201, the spring 915 can rock the arm 921 clockwise, thus raising the link 922 and rocking the arm 916 clockwise to position the stud 912 into engagement with the notch 923 in the add spider 810.

When the Minus key 124 is depressed and the machine operated, the disk 801, which is adjusted by the first transaction differential bank, presents a notch into the path of the stud 9202. When the machine is operated with the Plus key 134 of the second transaction bank depressed, a notch is also presented to the stud 9202. During this operation, either the "A" key or the "B" key is depressed also, and therefore a notch will be presented to the stud 9202 by the disk 801, which is set under control of the first transaction row of keys. The disks 801, 802, and 803 are shown notched in various positions to control the engagement of the adding-subtracting totalizer wherever required in the system used to illustrate the invention herein. The notching of the control disk can be varied in accordance with any desired system to which the machine is to be applied.

*Machine release mechanism and cycling control.—* When the machine is released for operation, it performs either a one-cycle operation or a two-cycle operation, depending upon which keys in the first transaction bank are depressed. When the machine is released for an add operation or for a subtract operation, the machine performs a one-cycle operation. When the machine is released for taking a total from the add-subtract totalizer, upon depression of the Balance or Sub-Balance keys 121 or 122, respectively, the machine performs one cycle of operation. When the machine is released for operation upon depression of the Overdraft key 123, the Total key 126, or the Sub-Total key 127, the machine performs two cycles of operation. During the first of two cycles of operation, the subtract side of the add-subtract totalizer is selected; or, if a total is taken from the rear totalizer line, the interspersed totalizer line is shifted to select the proper totalizer. During the first of the two cycles of operation, the main cam shaft 200 is arrested shortly after it starts its rotation, and the cams 204 receive two complete rotations. The term "cycle," as used herein, means a complete rotation of the cams 204.

During the first rotation of the cams 204, the selected interspersed totalizer is shifted to select the proper totalizer from which a total is to be taken. During the second rotation of the cams 204, the main shaft 200 is rotated therewith to complete the rotation of the shaft. The novel cycle control mechanism is provided to simplify total-taking operations when only one cycle is necessary, as when a total is taken from the add-subtract totalizer and no overdraft is contained therein. A two-cycle total-taking operation is performed only in those operations where it is necessary to select a totalizer from the interspersed totalizers during the first cycle of operation, or when an overdraft is present in the add-subtract totalizer.

To release the machine for operation, a slide 881, 882, or 883 (Figs. 23 to 25), one located in each of the first, second, and third transaction banks, respectively, is shifted leftwardly on depression of certain keys in the three transaction banks. The slides 881, 882, and 883 are mounted on rollers 884, carried by the key frames. The slide 881 is provided with a stud 885, engaged by a toe on the upper end of an arm 886, secured to a shaft 887. Depression of the Balance key 121, the Sub-Balance key 122, the Overdraft key 123, the Minus key 124, or the Eject key 125 causes the stud 579 on either of these keys to wipe against a cam edge 888 of the slide 881 to shift the slide 881 leftwardly, whereupon the stud 885 rocks the arm 886 and the shaft 887 counter-clockwise (Fig. 23). Also pinned to the shaft 887 is a release pawl 606, normally engaging over a square stud 610 on an arm 608 on the release shaft 264. A spring, described hereinafter, normally tensions the shaft 264 to rock counter-clockwise. Therefore, upon lifting the pawl 606 off of the stud 610 by shifting of the slide 881, the arm 608 and the shaft 264 are released for movement in its releasing direction.

The slide 882 in row 2 is also shifted by the keys 131, 132, 133, 134, or 138 in the same manner as the slide 881 is shifted. The slide 882 has a stud 1888, engaged by an arm 889, also pinned on the shaft 887. Thus, when one of the above-mentioned keys is depressed, the slide 882 is shifted leftwardly (Fig. 24) to lift the pawl 606 from the square stud 610.

Likewise, the slide 883 is provided with a stud 890, engaging a bifurcated end of an arm 891, also pinned on the shaft 887. As will be seen by referring to Fig. 25, each one of the keys 141 to 149 of the third transaction bank is opposite a cam edge, by means of which the slide 883 is moved leftwardly (Fig. 25) upon depression of each key in this bank. Depression of any key in this bank will rock the arm 891 and the shaft 887 to lift the pawl 606 off of the square stud 610.

The first transaction bank is provided with a second control slide 892 (Fig. 22), which is also slidable on the four rollers 884. This slide is provided with a stud 1893, engaging a bifurcation on an arm 1894, loose on the shaft 887. The arm 1894 has a shoulder overlying a square stud 1895, secured to an arm 1896, also secured to the release shaft 264. Thus, before the machine can be released by operating either one of the slides 881, 882, or 883, it is necessary to actuate the slide 892. The slide 892 is actuated by operation of the keys 121, 123, and 126 to 129 inclusive. The keys 126 to 129 inclusive are stay-down keys and are held in their depressed position by shoulders 1897, which are moved over the stud 579 of the depressed key. These keys remain in their depressed position until the slide is returned by means of the fingerpiece 152. Depression of one of the six keys just mentioned in the first transaction bank rocks the arm 1894 to withdraw it from engagement with the stud 1895 to permit the release shaft 264 to be rocked counter-clockwise upon rocking arm 606.

Secured to the shaft 264 (Fig. 103) is an arm 937, connected to an arm 938 by means of a link 939. A spring 941, connected to a stud 942 on the link 939 and to a stud in the framework of the machine, is tensioned to lower the link 939, thus normally tending to rock the arm 938 clockwise and the arm 937 counter-clockwise, to rock the release shaft 264 counter-clockwise. Counter-clockwise movement of the shaft 264 is normally arrested by the studs 610 and 1895 (Figs. 22 to 25) engaging the shoulders of the arms 606 and 1894.

When a release key is depressed in the manner described hereinbefore, and the arms 606 and 1894 are rocked counter-clockwise to withdraw their shoulders from contact with the square studs 610 and 1895, the spring 941 (Fig. 103) lowers the link 939 and, through the link, rocks the arm 938 clockwise until a stud 962 on the arm 938 is withdrawn from beneath a shoulder on a bell crank 946. A flange 932 on the arm 938 engages a stop 933, carried by the machine framework, to limit the movement of the arm 938. Similarly, a flange 947 engages a stop 948, when it is moved by a spring 949, to limit the movement of the bell crank 946.

When the arm 938 is rocked clockwise (Fig. 103), it withdraws the stud 962 from beneath the bell crank 946 to permit the spring 949 to rock the bell crank 946 counter-clockwise. The bell crank 946 is secured to the shaft 350 (see also Fig. 19), where an arm 950 is also shown pinned to the shaft 350. Rocking movement of the shaft 350, therefore, rocks the arm 950 counter-clockwise. A spring 951 is connected to a stud 952, on the upper end of the arm 950, and the other end of the spring is connected to a stud 953 on a switch-operating arm 954, pivoted on the beforementioned stud 454. The spring 951 normally holds a surface 955 on the arm 954 in engagement with the stud 952, and, when the arm 950 is rocked counter-clockwise, it rocks the switch-operating arm 954 clockwise. A link 956 connects the upper end of the switch-operating arm 954 with a bell crank 957, pivoted on a stud 935 and having an insulating block 958 normally holding a switch blade 959 in open position. The switch blade 959 is pivoted on the stud 934. Clockwise rotation of the switch-operating arm 954, through the link 956, rocks the bell crank 957 clockwise to permit a switch spring 960, connected to the switch blade 959, to rock the blade 959 clockwise to contact a switch blade 961, to thereby close an electric circuit through a motor 1216 (Fig. 20) to operate the machine in the manner heretofore described.

The bell crank 946 (Fig. 103) is bifurcated to receive a stud 9621 of an arm 963, mounted on the beforementioned shaft 940. When the arm 938 is rocked clockwise upon depression of a release key to withdraw the stud 962 from beneath the arm on the bell crank 946, the arm 963 is rocked clockwise to position a surface 964 of the arm 963 into the path of movement of a roller 965, carried between a disk 966 and a cam 975, on the main cam shaft 200. Also, clockwise movement of the arm 938 moves a surface 967 thereof into the path of movement of a stud 9651.

At about two thirds of the rotation of the main cam shaft 200, as shown in the time chart (Fig. 106), the roller 965 engages the surface 964 and rocks the arm 963 counter-clockwise (Fig. 103) to rock the bell crank 946 clockwise to withdraw its free end from the path of the stud 962. Clockwise movement of the bell crank 946 rocks the shaft 350 (see also Fig. 19) to stretch the spring 951. At this time, the switch arm 954 cannot follow the arm 950, since a roller 968 thereon is in contact with the outer periphery of a cam 969 on the main cam shaft 200. Continued rotation of the disk 966 and the cam 975 brings the roller 965 into engagement with the surface 967 of the arm 938 and rocks the arm 938 counter-clockwise back to its normal position. Counter-clockwise movement of the arm 938, through the link 939 and the arm 937, moves the release shaft 264 beyond its normal position, wherein the arms 606 and 1894 (Figs. 22 and 25) again move into the path of the square studs 610 and 1895, respectively. The spring-actuated slide 883 thereafter rocks the shaft 887 to restore the arm 606 over the stud 610.

A stud 9651 in the disk 966 engages a tail on an arm 3016, hubbed to the arm 938, to hold the arm 938, after the arm roller 965 moves out of contact with the surface 967, to prevent a subsequent release of the machine until the end of the machine cycle.

When the arm 950 is rocked counter-clockwise upon depression of a release key, and the switch arm 954 (Fig. 19) is rocked clockwise to close the switch 961, the roller 968 is lifted out of the range of the cam 969. During the greater part of the rotation of the cam 969, its outer periphery comes into contact with the roller 968 and maintains the switch arm and therefore the switch 959—961 in closed position. Near the end of the machine operation, the outer periphery of the cam 969 passes from beneath the roller 968. At this time, the arm 954 is under tension of the spring 951. Therefore, when the periphery of the cam 969 moves from the path of movement of the roller 968, the spring 951 snaps the switch arm 954 counter-clockwise to open the switch 961 and interrupt the electrical circuit through the motor 1216.

When the electrical circuit through the motor 1216 is interrupted, the machine is arrested in home position by a shoulder 970 (Fig. 18) on the pawl 195 being wedged between a stud 971, on the disk 196, and the upper end of a stop arm 972, secured to the beforementioned shaft 350. When the shaft 350 is rocked counter-clockwise upon depression of a release key in the manner described above, the stop arm 972 is withdrawn from engagement with the shoulder 970 of the pawl 195, and thereafter a spring 973, connected to the free end of the clutch pawl 195 and on a stud on the disk 196, rocks the pawl 195 counter-clockwise to be engaged with the clutch member 194 to drive the cam shaft 200 in the manner described hereinbefore.

When the arm 950 (Fig. 19) is restored to its home position by the roller 965 (see Fig. 103), the arm 963, the bell crank 946, and the shaft 350, the upper end of the stop arm 972 is moved into the path of movement of the shoulder 970, and therefore, when the shoulder 970 comes into contact with the stop arms 972, the pawl 195 is withdrawn from engagement with the clutch member 194. Thus, when the shoulder 970 engages the stop arm 972, the pawl 195 is withdrawn to interrupt the driving action of the motor, and, at the same time, the stop arm 972, the shoulder 970, and the stud 971 act as a positive stop to arrest the shaft 200 in its home position.

The usual spring-actuated non-repeat pawl 9711 (Figs. 27 and 103) is provided to prevent release of the machine in the event a release key is held depressed until after the machine has completed its operation.

*One-cycle add operation*

As described hereinbefore, the clutch member 205 (Figs. 17 and 18) and the transaction bank differential driving cams 204 (Fig. 13) are mounted to rotate independently of the main cam shaft 200. The clutch member 205 and the cams 204 for the third differential bank are mounted on a sleeve 199 (Fig. 7) and are geared to a sleeve 203 by the gears 198, 197, 201, and 202, so that the cams 204 for the first and second differential banks are driven simultaneously with the clutch member 205 and the cams 204 for the third differential bank. Normally the sleeves 199 and 203 are connected to the main shaft 200 by a clutch mechanism now to be described. The clutch mechanism forms a connection whereby the main cam shaft 200 is driven through the sleeve 199.

Secured on the main shaft 200 (Figs. 7 and 17) is a disk 981. Pivoted on the disk 981 is a clutch pawl 982, normally held in operating connection with the clutch member 205 by a spring 983. The spring 983 connects the clutch pawl 982 with a retaining pawl 984, also normally in engagement with the clutch member 205. When the motor drives the shaft 200 clockwise (Fig. 17), with the pawl 982 in engagement with the clutch member 205, the clutch member 205 carries the pawl 982 therewith to rotate the disk 981 and the main shaft 200 clockwise. During the one-cycle add operation, the clutch pawl 982 remains in engagement with the clutch member 205 throughout the entire operation, and therefore the cams 204 rotate with the shaft 200. At the end of the operation, when the shoulder 970 on the pawl 195 engages the end of the stop arm 972, the machine is arrested in the manner described above. During this one-cycle operation of the main shaft 200, the amount differentials are operated, and the engaging mechanisms for the totalizers are controlled to engage the totalizers with the actuators in add timing, as controlled by the transaction key in the manner described above.

*Two-cycle total-taking operation*

As mentioned hereinbefore, the rear totalizer line consists of interspersed totalizers, and therefore it is necessary to make a preliminary operation to provide time to shift the selected totalizer line for selecting the proper one of the interspersed totalizers and alining it with the differential actuators before totals can be taken therefrom. However, it is neither necessary nor desirable to operate the amount actuators during the first cycle of a two-cycle operation. To prevent operation of the amount actuators on the first cycle of a two-cycle total-taking operation, the cam shaft 200 is unclutched from the sleeve 199 to permit the transaction differential cams 204 to operate independently of the cam shaft 200 during the first cycle of a two-cycle total-taking operation. The unclutching of the main cam shaft 200 from the sleeve 199 is accomplished by rocking the clutch pawl 982 (Fig. 17) out of engagement with the clutch member 205 at the beginning of the machine operation. The unclutching of the clutch pawl 982 is under control of the Overdraft key 123, the Total key 126, and the Sub-Total key 127.

Depression of the key 123, 126, or 127 will shift a control slide 634 (Fig. 17) upwardly by the key stud 579 of either one of these three keys wiping against a cam surface 991 formed in the slide 634 in line with the travel of the key as it is being depressed. The slide 634 is slidably mounted on four rollers carried by the key bank. The right-hand end of the control slide 634 is rounded at 992, and an arm 993 is normally spring-urged into engagement therewith. Hubbed to the arm 993, so as to move therewith, is an arm 994, normally overlying a stud 995, mounted on the upper end of a link 996. The link 996 is provided with a notch engaging the stud 693 for guiding the link 996 in its up-and-down movement. The lower end of the link 996 is pivoted to one arm 998 of a yoke, pivoted on a stud 997, carried by the framework of the machine. A second arm 999 of the yoke is provided with a spring 1000, which normally urges the yoke 998—999 clockwise, thus maintaining the link 996 in its upward position and the stud 995 against the arm 994 to maintain the arm 993 in engagement with the rounded end 992 of the control slide 634. The yoke 998—999 is provided with a bail 1001, which normally engages a finger 1002 of a cycle control arm 1003 loose on a stud 1004. A spring 1005, stretched between a stud 1006 and a finger on a pawl 1007, normally holds a flange 1010 on the lower end of the arm 1003 against the end of an arm 1009. The spring 1005 maintains a stud 1008 of the pawl 1007 in engagement with a finger on the stop arm 1009.

Depression of any key 123, 126, or 127, acting through the control slide 634, lowers the link 996 to move the yoke 998—999 to position the bail 1001 thereon out of the path of the upper end of the cycle control arm 1003, and positions the bail 1001 opposite a cut-away portion of the cycle control arm 1003, so as to permit free movement of the latter when released. After the link 996 has been lowered by depression of a key 123, 126, or 127, a motorized key is depressed, and the shaft 350 is rocked counter-clockwise in the manner described hereinbefore. The stop arm 1009 is thereby moved out of the path of movement of the flange 1010, thus permitting the spring 1005 to rock the arm 1003 counter-clockwise (Fig. 17). Counter-clockwise movement of the arm 1003 is arrested when a stud 1011 comes into contact with a wall 1012, formed in the machine side frame. When the arm 1003 is arrested, a surface 1013 thereon is positioned into the path of an extension 1014 on the clutch pawl 982. When the machine begins to operate with the surface 1013 in the path of the extension 1014, the extension comes into engagement with the surface 1013 shortly after the machine begins to operate. Continued rotation of the disk 981, carrying the pawl 982, causes the pawl 982 to be rocked counter-clockwise to disengage the clutch pawl 982 from the clutch member 205. Since the clutch pawl 982 is disengaged from the clutch member 205, the disk 981 on the main cam shaft 200 remains stationary. The partial rotation of the main cam shaft 200 is not sufficient to set the amount differential mechanism in operation. The transaction differential cams 204 continue to rotate and, through the third transaction bank differential, actuate the totalizer-shifting cams to properly select a totalizer by alining the selected totalizer elements with the amount actuators in the manner described hereinbefore. After the clutch pawl 982 has been rocked from engagement with the shoulder of the clutch member 205, the pawl rides on the outer periphery of the clutch member 205. During the first cycle of operation, a cam 1021, secured to the shaft 193, contacts a roller 1015, mounted on the cycle control arm 1003, and rocks the cycle control arm 1003 clockwise past its home position.

When the stop arm 1009 is rocked counter-clockwise upon release of the machine, the flange 1010 moves between the stop arm 1009 and the pawl 1007. When the arm 1003 is restored past its home position by the cam 1021, the stop arm 1009 remains in its moved position, and therefore, when the flange 1010 is moved from between the stop arm 1009 and the pawl 1007, the spring 1005 moves the pawl into engagement with the edge of the flange 1010 to hold the arm 1003 in position slightly out of home position to maintain the surface 1013 out of the path of the extension 1014 of the clutch pawl 982. During the beginning of the second cycle of operation, when the clutch member 205 passes beneath the clutch pawl 982, the spring 983 is free to rock the pawl 982 into engagement therewith, and therefore, during the second cycle of a two-cycle total-taking operation, the main cam shaft 200 is rotated with the transaction differential cams. Near the end of the second cycle of operation, the shaft 350 is given a restoring movement in the manner described hereinbefore, thus positioning the stop arm 1009 into the path of movement of the flange 1010 and, through the stud 1008, removes the pawl 1007 from engagement with the flange 1010. When the depressed key 123, 126, or 127 is released to return to its normal, undepressed, position, the spring 1000 raises the yoke 998—999 to again position the bail 1001 thereof into the path of movement of the finger 1002 on the cycle control arm 1003.

From the above it is seen that the cycle control mechanism controls the operation of the main cam shaft 200 so that it will operate only when needed during total-taking operations. In those operations in which no shifting of the totalizer is required for selection, a total-taking operation is performed in one cycle of operation. In those operations where a totalizer must first be selected from a line of interspersed totalizers, the main cam shaft 200 is arrested, so as to prevent the idle operation of the amount differential mechanisms. During the first cycle of a two-cycle operation, only the cams for operating the totalizer-selecting mechanism are operated.

The roller 965 (Fig. 103) is carried between the disk 966 and the cam 975 secured to the main cam shaft 200, and, since the main shaft 200 does not rotate during the entire first cycle of operation, the shaft 350 is rocked to restore the release shaft 264 only near the end of the second cycle of a two-cycle total-taking operation.

The disks 966 are provided with two ratchet teeth, 1016 and 1017 (Fig. 103). When the tooth 1016 is in the home position, a pawl 1018, pivoted on a stud 1019, engages it. Upon initial movement of the shaft 200 in the first cycle of a two-cycle operation, the pawl 1018 drops into the tooth 1017, which is spaced from the tooth 1016 an extent equal to the movement of the shaft 200 required for disengaging the clutch pawl 982 from the clutch member 205. A spring 1020 maintains the pawl 1018 in constant contact with the disk 966 to properly aline the disk 966 in whichever one of the two positions it is arrested by the pawl 1018.

*Transaction bank control slides*

Figs. 31 to 41 inclusive illustrate a number of control slides located in the first, second, and third transaction banks, for controlling the various functions of the machine. Each transaction bank is provided with a control slide 612 (Fig. 31), which is bifurcated to engage a stud 611 on an arm 615, pinned to the release shaft 264. When the machine is released for operation and the release shaft 264 is rocked counter-clockwise (Fig. 31), the arm 615 shifts the control slide 612 rightwardly to lock out all undepressed keys and lock the depressed keys in depressed position in the manner well known in the art. At the end of machine operation, when the release shaft 264 is restored to its home position, the slide 612 is shifted leftwardly to release the depressed keys and to permit depression of another key for the next operation of the machine.

The system to which the present machine is shown applied contemplates that, after a "Balance Pickup" operation or an "Overdraft Pickup" operation, the keys 131 or 138 cannot be depressed again until after either a "Balance" operation, initiated by the key 121, or the "Over- "draft" operation, initiated by the key 123, is performed. To provide for such a control, the keys 121 and 123 of the first transaction bank of keys actuate a control slide 620 (Fig. 32), and the keys 131 and 138 of the second transaction bank actuate a control plate 621. The control plate 621 is mounted on the four rollers 884 and is biased in the right-hand direction by a spring 623. A detent 622 is also slidably mounted on the rollers 884, and a spring 624 tends to shift the detent 622 leftwardly. Depression of either the Pickup key 131 or the Overdraft Pickup key 138, through the key stud 579 on either key engaging a cam edge 625 on the control plate 621, shifts the control plate 621 leftwardly against the action of the spring 623.

Leftward movement of the control plate 621, through a cam edge 626 thereon, lifts a retaining pawl 627 out of a notch in the left end of the plate 621. Lifting the pawl 627 withdraws the pawl from the left edge of the plate 622, permitting the spring 624 to shift the plate 622 leftwardly until it is arrested by the stud 633. When the control plate 622 is in its left-hand position, as determined by the stud 633, the horizontal parts of the openings in the plate 622 engage under the stud 597 of the key 131 or 138, after the key returns to its undepressed position, thus preventing a subsequent depression of these two keys until the control plate 622 is restored to its normal position.

Restoration of the control plate 622 to its normal position is effected by either the "Balance" key 121 or the "Overdraft" key 123 of the first transaction bank, which keys are provided with studs 579 wiping against cam edges 629 on the control plate 620. The plate 620 is provided with a stud 630 engaging a bifurcated end of an arm 631 of a yoke pivoted on a shaft 632. A second arm of the yoke 631 is provided with a stud 633 in the path of movement of the control plate 622 (Fig. 35). When the control plate 622 is in its leftward position, wherein the keys 131 and 138 are locked against depression, the left end of the plate engages the stud 633. Upon depression of the key 121 or 123, the stud 579 of the particular keys being depressed cams against the cam edges 629 to shift the control plate 620 rightwardly, rocking the yoke 631 counter-clockwise, thus forcing the stud 633 against the end of the plate 622 and restoring said plate to its home position, where it is held by the pawl 627.

Control key detents

Each of the banks of control keys is provided with a detent for holding the non-motorized keys in depressed position until a motorized key can be depressed. Fig. 39 illustrates the detent in the second transaction row. The keys 135, 136, and 137 of the second row are non-motorized keys.

Associated with the keys 135, 136, and 137 of row 2 is a detent 595, supported on the beforementioned rollers 884. A spring 596, attached to an ear on the upper edge of the detent 595, normally maintains cam edges 598 of the slide against studs 579, one stud 579 being mounted on each key, as before mentioned. Depression of key 135, 136, or 137 wipes its respective stud 579 on its associated cam edge 598 to cam the detent leftwardly (Fig. 39) until the stud 579 passes beyond the cam edge 598, whereupon the spring 596 snaps the detent 595 to the right and over the stud 579 to maintain the key in depressed position. Near the end of machine operation, the detent 595 is moved leftwardly, by means described hereinafter, to release the depressed key.

An interlocking detent 5102 (Fig. 30) is provided in the transaction key banks to prevent accidental depression of two adjacent keys. The key studs 579 are engaged by cam edges 5111 and with L-shaped openings 5121. A spring 5131 normally maintains the detent 5102 in the position shown. Movement of a stud 579 into an L-shaped opening 5121 prevents depression of the adjacent key, and depression of a key having the stud 579 in engagement with a cam edge 5111 moves the horizontal section of the L-shaped opening over the respective key studs 579.

Locking control slides

Associated with each one of the three control banks is the control slide 612 (Fig. 31), which is moved to engage over the stud 579 of the depressed key of the respective bank to lock the key in depressed position or to lock the keys in the respective banks in undepressed position. The control slide 612 is bifurcated to engage the stud 611 on the arm 615, pinned to the shaft 264. One arm 615 is provided for each of the control banks.

When the release shaft 264 is rocked counter-clockwise (Fig. 31) in the manner described hereinbefore, the control slide 612 is moved rightwardly to engage the studs 579 of the respective keys to lock the undepressed keys in their undepressed position, and the depressed keys in their operated positions.

Near the end of the machine operation, when the release shaft is restored clockwise to its home position, the control slide 612 engages a stud 614 on the beforementioned detent 595 (Fig. 39) to move the detent 595 leftwardly against the action of the spring 596 to release the depressed key 136, 135, or 137.

Interlocking slide between the total-taking keys and the amount keys

An interlock is provided between the total-taking keys of row 1 and the amount keys 120 to prevent release of the machine if an amount key is depressed before a total key is depressed. This interlock is provided to prevent misoperation when totals are taken, since, during total-taking operations, the amount actuator racks must be free to be set under control of the totalizer wheels.

When an amount key 120 is depressed, a projection 635 thereon (Fig. 40) is positioned into the path of movement of the beforementioned plate 223, which is connected by an arm 2661 to move with a yoke 2671. One arm 636 (Fig. 36) of the yoke 2671 has pivoted thereon a link 637, the free end of which supports a stud 638. The stud 638 projects through a bayonet slot 639 (Fig. 41) in an arm 640, secured to the machine release shaft 264. The stud 638 also projects into the open slot 641 of a bell crank 642 pivoted on a stud 643 carried by the keyboard frame. The bell crank 642 is connected to an arm 644 by a link 645. The arm 644 is secured to a short shaft 1630, carried by the right keyboard end plate and an ear on the keyboard front plate. Also secured to the shaft 1630 is an arm 1629, having a stud 646, held in engagement with the end of a control slide 647 by a spring 648, stretched between the arm 644 and a stud on the keyboard frame. The spring 648, acting through the arm 644, the shaft 1630, the arm 1629, and the stud 646, normally maintains cam edges 649 of the control slide 647 in engagement with the studs 579 of the total-taking keys.

When a total-taking key is depressed, the respective stud 579 of the depressed key wipes along the cam edge 649, coacting therewith, and thereby shifts the control slide 647 leftwardly (Fig. 40). The end of the control slide 647, acting on the stud 646, rocks the arm 1629, the shaft 1630, and the arm 644 clockwise (Figs. 40 and 41), thus shifting the link 645 leftwardly to rock the bell crank 642 clockwise to shift the stud 638 into the lower vertical section of the bayonet slot 639 of the arm 640, secured to the release shaft 264. When the release shaft 264 is thereafter rocked by the depression of a machine release key, the arm 640, acting through the slot 639, carries the stud 638, the link 637, the arm 636, and the yoke 2671 counter-clockwise. However, if, at the time the release shaft 264 is released, an amount key 120 is in depressed position, the yoke 2671, the arm 2661, and the plate 223 are held against movement by the projection 635 on the amount key 120 being in engagement with the plate 223. If no amount key 120 is depressed, the plate 223 is free to move, and therefore the release shaft 264 can rock to release the machine for operation.

The yoke 2671 is held in its normal position by a spring 1267 (Fig. 34) connected to an arm 1268, which arm is provided with a shoulder engaging the lower side of the yoke 2671. The arm 1268 is limited in its movement under action of the spring 1267 by the engagement of a toe thereof with a stud 1269.

*Zero stop pawl controls for total-taking operations.*—It is necessary to hold the zero stop pawls 258 out of effective position during total-taking operations. This is accomplished by a stop arm 650 (Fig. 38) secured to the shaft 1630. When the shaft 1630 is rocked by depression of a total-taking key, by the slide 647, the stud 646 (Fig. 40), the arm 1629, and the shaft 1630, the stop arm 650 is moved into the path of a flange 651 (Fig. 38) on a pitman 652. The pitman 652 is bifurcated at its upper end to engage and slide on the shaft 1630, and its lower end is pivoted to an arm 653, secured to the hub of a yoke 272.

If, when the yoke 272 is released in the manner described in the above-mentioned Goodbar et al. patent, the total key has been depressed and the arm 650 overlies the flange 651, the yoke 272 cannot follow, since it is arrested by the stop arm 650, acting through the flange 651, the pitman 652, and the arm 653. Therefore, the zero stop pawls cannot rock into the effective position even though no amount key 120 has been depressed, and, therefore, the amount actuators are free to move so as to be set under control of the wheels of the selected totalizer.

Trial balance locking detent

The Trial Balance key 139 is normally locked against depression and, when released to permit depression thereof, is locked in its depressed position until manually released by the beforementioned lever 153 (Fig. 37), which lever is formed on a detent 680. The stud 579 for the Trial Balance key normally lies in a recess 681 of the detent 680, and a spring 682 normally maintains the left wall of the recess 681 in engagement with the stud 579. When it is desired to depress the Trial Balance key, the lever 153 is grasped by the operator and pulled leftwardly (Fig. 37) until the passage 683 in the detent 680 is in the path of the stud 579, whereupon the Trial Balance key can be depressed. After the Trial Balance key is depressed, the lever 153 is released, and the spring 682 moves the detent 680 rightwardly (Fig. 37) to cause a recess 684, in the detent 680, to move over the stud 579. The recess 684 is more shallow than the recess 681, and therefore the detent is held in a leftward position from that illustrated in Fig. 37. When in this position, with the Trial Balance key held depressed, horizontal notches 685 of the detent 680 lie beneath the key studs 579 of the keys 133, 134, 135, 136, and 137, thus preventing depression of these keys, as long as the Trial Balance key 139 is held in its depressed position by the detent 680.

Printing mechanism

As mentioned above, the machine is provided with three printing sections; namely, an audit strip printing mechanism like that disclosed in the Goodbar et al. Patent No. 2,616,623, but not described herein; a book printing mechanism; and a ledger card printing mechanism. The book printing mechanism is adapted to print in four columns, and the ledger card printing mechanism is adapted to print in five columns. A separate printing hammer is provided for each column of the book and for each column of the ledger card printing mechanism. Thus a total of nine printing hammers are provided, which are selected for operation by notched control disks, set under control of the three transaction differential mechanisms. In addition to the notched control disks set under control of the transaction differential mechanisms, certain other notched disks are set under control of the card and book feelers to disable the selected hammers when no book or card is inserted in the machine, and an additional control is provided for disabling the machine release mechanism after the last line of either the card or the book, or both, has been printed upon.

The notching for the various control disks depends upon the system in which the machine is employed and the use to which it is put. In the system using the keyboard illustrated herein, the notching of the disks set up under the control of the transaction bank differential is indicated in the charts (Figs. 12 and 105).

*Date hammer control disks.*—Each of the date hammers for both the book and the card is controlled by four disks 1401, 1402, 1403, and 1404 (Fig. 67–A), and the notching for these four plates in each group is shown in the spaces 1 and 3 (Fig. 105). The notching is identical for both groups, so that a date is printed in the book and on the card during a single operation.

The four disks 1401, 1402, 1403, and 1404 are provided with internal teeth and are rotatably mounted on disks similar to the disks 761. The internal teeth mesh with pinions, similar to the pinions 742, mounted on square shafts. The latter are differentially actuated by the transaction differential mechanisms in the manner described in said Goodbar et al. Patent No. 2,616,623.

The disks 1401 and 1404 are adjusted by the first transaction bank differential; the disk 1402 is adjusted by the third transaction bank differential mechanism; and the disks 1403 are adjusted by the second transaction bank differential mechanism.

In the chart, two columns are designated "A-side" and "B-side." These legends refer to the sides of the pivoted feeler pawls which contact the disks. Legend "A-side" refers to the upper feeler finger, and "B-side" refers to the lower feeler finger. The legend "Arm" refers to the end of the feeler arms on which the feeler pawls are mounted, which arms also coact with a disk, as indicated in Fig. 67–A. It is further noted that the notches are of two depths, as indicated in the chart, Fig. 105. To cause the date hammer to print, a deep notch is required for the "Arm" and either for the "A-side" of the feeler pawl, or for both the "B-sides" of the feeler pawl, the feeler pawls having two "B-side" fingers and one "A-side" finger, as indicated by the chart.

The manner in which the disks control the date printer hammer will be described in connection with the description of the hammer-operating mechanism in general.

*Balance hammer control disks.*—The "Balance" hammers for the book and the card are each controlled by four control disks 1405, 1406, 1407, and 1408 (Figs. 67–A and 67–B), and the notching for these four disks is shown in spaces 2 and 4, Fig. 105. The notching is identical for both groups, so that the "Balance" can be printed on the hook and the card during a single operation of the machine.

The disks 1405, 1406, 1407, and 1408 are mounted on disks in the same manner as the disks 1401, 1402, 1403, and 1404. The disks 1406 and 1408 are adjusted by the transaction differential of the first bank of keys, and the disks 1407 are adjusted by the transaction differential of the second transaction bank of keys. The disks 1405 are adjusted by mechanism under control of the book and card feelers in the manner described hereinafter.

*Withdrawal hammer control disks.*—The "Withdrawal" hammers for the book and the card are each controlled by three control disks 1409, 1410, and 1411 (Figs. 67–A and 67–B), and the notchings for these three disks are shown in spaces 1 and 4 in the chart, Fig. 12. The notching is identical for both groups, so that the "Withdrawals" are printed in the book and on the card during a single operation of the machine.

The disks 1409, 1410, and 1411 are mounted in the same manner as the disks 1401, 1402, 1403, and 1404. The disks 1409 are adjusted by the transaction differential of the first transaction bank, the disks 1410 are adjusted by the differential of the second transaction bank, and the disks 1411 are adjusted by the transaction differential of the third transaction bank.

*Deposit-interest hammer control disks.*—The "Deposit-Interest" hammers for the book and the card are each controlled by three control disks 1412, 1413, and 1414 (Figs. 67-A and 67-B), and the notchings for these disks are shown in spaces 2 and 5 in the chart, Fig. 12. The notching is identical in both groups of disks, so that the deposits or the interest are printed in the book and on the card during a single operation of the machine.

The disks 1412, 1413, and 1414 are mounted in the same manner as the disks 1401, 1402, 1403, and 1404. The disks 1412 are adjusted by the transaction differential of the first transaction bank, the disks 1413 are adjusted by the transaction differential of the second transaction bank, and the disks 1414 are adjusted by the transaction differential of the third transaction bank.

*Balance pickup hammer control disk.*—The "Balance Pickup" is printed only on the card and not in the book. Only one disk, 1415 (Fig. 67-A), is provided to control the operations of this hammer, and its notching is shown in space 3 of the chart, Fig. 12. The disk 1415 is adjusted under control of the transaction differential of the second transaction bank.

*Printing hammer operating mechanism.*—The nine printing hammers for the card and the book are selectively operated under control of the disks 1401 to 1415 inclusive. Since the operating mechanism is the same for each hammer, only one is shown in elevational view herein. The hammer-operating mechanism for the "Balance" column of the book has been illustrated in Fig. 70. The same reference numerals are applied to corresponding parts for each of the nine hammer mechanisms which are illustrated in plan view in Figs. 69-A and 69-B. Each hammer 1420 comprises two arms connected by a hub pivotally mounted on a shaft 1421. Spanning the two arms 1420 is a U-shaped member 1422, in which is mounted a platen 1423. The member 1422 is provided with a downwardly-extending ear 1424, which is pivoted between a pair of links 1425 of a toggle. The opposite end of the link 1425 is pivoted on a stud 1426, carried by an arm 1427, mounted on a shaft 1428 (see also Fig. 61 and 72). The shaft 1428 is resiliently supported on springs 1429, three of which are provided, one at each end of the shaft and one in its center, to form a flexible support for the shaft. The spring 1429 is seated in an opening in the base of the machine and is adjustable therein by a set screw 1430. Each end of the shaft 1428 is mounted on a bearing 431, which has an elongated opening to permit up-and-down play of the shaft 1428.

The flexible mounting comprising the springs 1429 is provided to give the platen 1423 flexibility in its operation, so that uniform prints may be made on the book, no matter how many pages may be between the hammer and the type wheels. If the hammer would ordinarily be adjusted for making a good impression when only one page is under the hammer, then the impression would be too heavy when printing on the last page of the book. To allow for this variation in thickness, the springs 1429 permit a certain amount of adjustability and flexibility to cause all of the impressions in the book to be uniform.

Pivoted to the stud 1426 of the toggle comprising the links 1425 and 1427 is a link 1431, the right-hand end of which is supported on a stud 1432, carried by the lower end of a link 1433, pivoted on a stud 1434 of an arm 1435, pivoted on a shaft 1443. The right-hand end of the link 1431 (Fig. 70) is provided with a notch 1436, which may be lowered to engage a rod 1437, carried by a pair of cam follower arms 1438, pivotally mounted on a shaft 1439. The rod 1437 is long enough to span the distance between the four links 1431 in the book-printing section, so that any one of the four links 1431 in the book-printing section may be lowered to hook over the rod 1437. Each of the cam follower arms 1438 is provided with a pair of rollers engaged with a pair of cam plates 1440, secured to the printer cam shaft 1441.

The printer cam shaft 1441 is actuated from the main cam shaft 200 by an intermediate gear 5151 (Fig. 52) meshing with the beforementioned gear 207. The intermediate gear 5151 is mounted on a stud 5161, carried by the side frame 161. The gear 5151 meshes with a gear 517, secured to the printer cam shaft 1441. The ratio of the train of gears 207, 5151, and 517 is such that, for each clockwise rotation of the main cam shaft 200, the printer cam shaft 1441 is given a counter-clockwise rotation.

If, during the operation of the machine, the link 1433 (Fig. 70) is lowered under control of the notched disks in the manner described hereinafter, and the link 1431 is hooked over the rod 1437, and the cam shaft 1441 is given a counter-clockwise rotation, the cams 1440 rock the arms 1438 and the rod 1437 counter-clockwise, thus shifting the link 1431 to the right (Fig. 70) to straighten the toggle comprising the links 1425 and the arm 1427 to raise the hammer 1420 to rock around its shaft 1421 and cause an impression to be made upon the book.

Whether the link 1433 is lowered to hook the right end of the link 1431 over the rod 1437 depends upon the notching in the notched control disks 1405 to 1408, described above. The arm 1435 is hubbed to an arm 1442, pivotally mounted on the shaft 1443. The free end of the arm 1442 has pivoted thereto a feeler arm 1444, which is urged in a leftward direction (Fig. 70) by a spring 1445, one end of which is connected to a rod 1446 supported in the frames 160, 163, and 164. The other end of the spring 1445 is connected to a stud which forms the pivot connection between the arm 1444 and the arm 1442. The leftward movement (Fig. 70) of the arm 1444, under action of the spring 1445, is limited by a stud 1447 on the arm 1435, which rests upon an arm 1448, secured to the shaft 1443 (see also Fig. 42). The arm 1448 is provided with two rollers 1449, coacting with a pair of cams 1450 on the main cam shaft 200.

The cam plates 1450 are timed to rock the arm 1448 after the control plates have been adjusted under control of the transaction bank differentials. Rotation of the cams 1450 rocks the arm 1448 clockwise to permit the spring 1445 (Fig. 70) to rock the arm 1435 clockwise to lower the link 1433 when the notching of the plates is such that feeler pawls 1451, pivoted on the arm 1444, are permitted to move leftwardly in the manner described before. This condition exists when the deep notch is in the path of the arm 1444 and a deep notch is in the path of the finger A or finger B, as indicated in the chart (Fig. 105).

The feeler pawls 1451 comprise a pivot pawl having two fingers A and two fingers B for printing in the Balance column of the book.

The feeler arm 1444 for the Deposit-Interest column and the Withdrawal columns are not provided with pivoted feeler pawls 1451, and in these particular columns the feeler arm 1444 is provided with rollers 1453 for engaging the control plates. The date-printing column feeler arm 1444 is provided with a feeler pawl 1451 having two B fingers and one A finger for engaging the control plates for controlling the printing of the date in the first column.

The arm 1448 for the Balance column has the rollers 1449 for coacting with the cam plates 1450 in the manner described. This arm 1448 is secured to the shaft 1443, to which shaft is also pinned an arm 1448 for each of the printing hammer mechanisms. Therefore, when the cams 1450 rock the shaft 1443, all the arms 1448 are rocked to release all the links 1433 to be lowered under control of the respective control plates.

*Book and card feeler mechanism.*—Each printing section—that is to say, the section for printing in the book and the section for printing on the card—is provided with a feeler mechanism for feeling for the book or for the card. If a book or a card is present in the respective printing sections, the selected printing hammers are permitted to operate. If no book or card is in the respective printing sections, the hammer selected for the particular section is disabled by the feeler mechanism, so that the printing hammer will not be operated when no record material is present in the machine.

Each printing section is provided with a feeler 1460 (Figs. 75 and 76), slidably mounted on a stud 1461. The lower end of the feeler 1460 is pivotally connected to an arm 1462, which is biased in a counter-clockwise direction (Fig. 75) by a spring 1463, so that the feeler 1460 normally tends to rise to engage with the book or the card. The arm 1462 is normally restrained in the position shown in Fig. 75 by a pawl 1464 engaging a finger 1465 of the arm 1462. The pawl 1464 is pivotally mounted on a stud 1466, carried by an arm 1467 (Fig. 73), to which is pivoted the left-hand end of a link 1468. A spring 1469 normally holds the pawl 1464 in engagement with the outer surface of a lever 1470, pivotally mounted on a shaft 1471, on which shaft the arm 1467 is also pivoted. The right-hand end (Fig. 73) of the link 1468 is pivoted to a cam follower arm 1472 (see also Figs. 69–A, 69–B, and 76). The cam follower arm 1472 is provided with a roller 1473, in engagement with a cam 1474, on the cam shaft 1441. The cam 1474 is provided with a roller 1475, which engages a cam edge 1476 of the arm 1472 when the cam 1474 begins to rotate counter-clockwise (Fig. 73) at the beginning of machine operation. Engagement of the roller 1475 with the cam edge 1476 rotates the cam arms 1472 quickly clockwise to shift the link 1468 leftwardly (Fig. 73) to rock the arm 1467 counter-clockwise to withdraw the pawl 1464 from engagement with the finger 1465, thus permitting the spring 1463 to rock the arm 1462 counter-clockwise to permit the feeler 1460 to rise.

If the feeler 1460 is arrested by the presence of a book or a card, the arm 1462 is limited in the extent of its rotation, and therefore the arm 1462 will be arrested before the pawl 1464 moves its fullest extent. In this event, the pawl 1464 is cammed out of a notch 1478 in the arm 1462, whereupon the pawl 1464 rides over the outer periphery 1479 of the arm 1462.

If the feeler 1460 is permitted to rise its fullest extent due to the absence of a record in the printing section, the arm 1462 follows the pawl 1464 its fullest extent. When this occurs, the pawl 1464 drops behind the surface 1480 of the lever 1470. Thereafter, when the pawl 1464 is returned toward its normal position, by the cam 1474, the lever 1470 is rocked clockwise (Fig. 75). Clockwise movement of the lever 1470 shifts a link 1481, connected to the lower end of the lever 1470, leftwardly (Fig. 75), and the link 1481 thereby rocks an arm 1482 clockwise on the shaft 1439. The arm 1482 is provided with a notch engaging a bail 1483, also pivoted on the shaft 1439 (see also Figs. 69–A, 69–B, 70, and 75), which bail extends across the fronts of all of the links 1433. Each link is provided with a shoulder 1484, lying in the path of movement of the bail 1483. Therefore, when the bail 1483 is rocked clockwise (Fig. 70), the bail is moved into engagement with the shoulders 1484 of all of the links 1433, therefore preventing the links 1433 from being lowered to engage the selected links 1431 with the rod 1437. Therefore, even though the printing hammer has been selected by the control disks, the links 1433 can nevertheless not be lowered, inasmuch as they are arrested by the bail 1483.

A spring 1490, connected to a stud 1489, maintains a finger 1486, formed on the lever 1470, in engagement with a shaft 1487 to maintain the lever 1470, the link 1481, the arm 1482, and the bail 1483 in normal position.

At the end of the machine operation, the bail 1483 remains in its upper position, in which the links 1433 are held disabled. At the beginning of the next operation, when the roller 1475 (Fig. 73) engages the surface 1473 to shift the link 1468 leftwardly, and the arm 1467 is rocked counter-clockwise, a finger 1488, formed on its lower end, engages the stud 1489 to restore the link 1481 and the bail 1483 to normal position, in the event that the beforementioned spring 1490 does not restore the yoke 1483 to its home position.

*Feeding mechanism*

The machine is provided with a table 1500 (Fig. 1), for receiving the pass book, and a table 1501 for receiving the ledger cards. The book or the card is placed on its respective table beneath a guide plate 1502 or 1503 (Figs. 68–A and 68–B), respectively, and they are alined with openings 1504 and 1505, respectively, in the guides 1502 and 1503, to select the line upon which the next data is to be printed. Mechanism is provided for feeding the card from the manually-positioned position into position one line-space short of the printing position adjacent the printing mechanism. Thereafter, the book and the card are fed one line-space, and the data will be printed on the line thus selected. After the data has been printed by the machine, the book or the card may be left in position to receive data in a different column on the same line, or be ejected from the machine, depending upon the data being entered. Thus the card or the book takes part in three movements; first, feeding from the manually-positioned position; second, line-spacing into the printing position; and third, ejection. Whether the card is to be line-spaced or ejected is controlled from the transaction keys through the transaction differentials, and from a feeler mechanism, which position notched disks for controlling the effectiveness of the feeding and ejecting mechanism.

*Tension rolls.*—Normally the feeding rollers are separated to permit easy insertion of the book or the card on the respective tables. Shortly before the first feeding mechanism is effectuated—that is, the mechanism for feeding the book or the card into printing position—the tension rollers are raised to impinge the book and the card against the feed rollers, so that, when the feed rollers are operated, the mechanism is effective to perform its feeding operation.

*Tension roll operating mechanism.*—Inasmuch as the mechanisms for the book printer and the card printer are identical, the same reference numerals are applied to corresponding parts in each printer section. Two tension rollers 1506 (Figs. 74, 76, and 78) are provided in each printing section. Each roller 1506 is mounted on a stud 1507, carried between a pair of arms 1508. The arms 1508 are pivotally mounted on the shaft 1487 and are spring-urged counter-clockwise by springs 1509. Each arm 1508 is provided with a roller 1510, which is normally held in engagement with a cam arm 1511 by the spring 1509. The cam arm 1511 is secured to the shaft 1471. Also secured to the shaft 1471 is an arm 1512. Pivoted to a stud on the arm 1512 is a link 1513, connected to a cam follower arm 1514 at its opposite end. The cam follower arm 1514 is rotatably mounted on the shaft 1439 and carries a pair of rollers 1515 in engagement with a pair of cam plates 1516 secured to the printer cam shaft 1441. The connection between the link 1513 and the cam arm 1514 comprises a notch 1517 engaging a roller 1518 on the cam arm 1514. The notch 1517 is wider than the diameter of the roller 1518 to provide easy disconnection and reconnection of the link 1513 and the roller 1518 for preventing the tension rolls from being operated in the manner described hereinafter.

When the notch 1517 is in engagement with the roller 1518 and the machine is operated, the cam plates 1516 rock the cam arm 1514 to move the link 1513 and rock the arm 1512, the shaft 1471, and the cam arms 1511 counter-clockwise (Fig. 74). Counter-clockwise movement of the cam arm 1511 permits the roller 1510 to follow the cam edge 1519 until the roller is seated in the terminal end of the cam edge 1519. When this takes place, the springs 1509 rock the arms 1508 to raise the tension rollers 1506 to impinge the book or the card against a pair of feed rollers 1520. Thereafter, when the feed rollers 1520 are rotated counter-clockwise in a manner to be described presently, the book or the card is fed into a printing position beneath the type wheel 465 (Fig. 74).

*Feeding mechanism.*—The mechanism for rotating the feed rollers 1520, together with the various controls thereover, is best illustrated in Figs. 76 to 84 inclusive. As illustrated in Fig. 78, the two feed rollers of each printer are connected by a sleeve 1521. Also secured to the sleeve 1521 is a pinion 1522, and the sleeve 1521 and the pinion 1522 are rotatably mounted on a shaft 1523. The pinion 1522 meshes with a gear 1524, rotatably mounted on a stud 1525, carried by the framework of the machine. The gear 1524 meshes with a gear 1526, secured to a shaft 1527. Also pinned to the shaft 1527 are two ratchet wheels, 1528 and 1529, divided by a disk 1530. The ratchet wheel 1528 is engaged by a feed pawl 1531, and the ratchet wheel 1529 is engaged by an eject pawl 1532. The pawls 1531 and 1532 are pivotally mounted on a stud 1533, carried by an operating arm 1534, rotatably mounted on the shaft 1527. Secured to the arm 1534 is a pinion 1535, meshing with teeth 1536 of a rack bar 1537. The rack bar 1537 is slidably mounted on a pair of studs 1538. The rack bar 1537 is urged leftwardly (Fig. 77) by a spring 1539, and the rack bar 1537 is limited in its leftward movement by a roller 1540, carried by a stud 1541, supported in the framework of the machine.

To obtain a fine adjustment of the rack bar 1537, rollers 1540 of various diameters may be provided to allow for more or less leftward movement of the rack bar 1537.

A link 1542 connects the rack bar 1537 to a pivoted arm 1543, carried by a stud 1544, supported in the framework of the machine. A link 1545 is connected to the arm 1543, and a roller 1546 on the link 1545 is supported in a slot 1547 of an arm 1485, secured to the printer control bail 1483 (Fig. 70). The slot 1547 is of sufficient length to provide for sliding movement of the link 1545. The right-hand end of the link 1545 is provided with a slightly-angled end 1548, lying in the path of movement of a roller 1549 of a cam follower arm 1550, pivoted on the beforementioned shaft 1439. A spring 1551 normally maintains a roller 1552 on the arm 1550 in contact with a cam plate 1553. The cam plate 1553 is secured to the printer cam shaft 1441.

When the parts are in the position illustrated in Fig. 77 and the machine is operated, the cam plate 1553 rocks the arm 1550 to move the link 1545 leftwardly (Fig. 77) to rock the arm 1543 counter-clockwise. Counter-clockwise movement of the arm 1543 moves the link 1542 rightwardly to draw the rack bar 1537 toward the right against the tension of the spring 1539. Rightward movement of the rack bar 1537 rotates the pinion 1535, together with the arm 1534, counter-clockwise (Fig. 77), thereby causing the pawl 1531, in engagement with the ratchet wheel 1528, to rock the shaft 1527 counter-clockwise. Counter-clockwise movement of the shaft 1527 rotates, through the gears 1526 and 1524, the pinion 1522 counter-clockwise to rotate the feed rollers 1520 counter-clockwise. At this time, the tension rollers 1506 have been released to impinge the card or book against the feed rollers 1520, and therefore the book or the card is fed into printing position.

The cam plate 1553 is provided with a low spot 1554 for backing up the feed pawl 1531 preparatory to giving the feeding mechanism a line-space when the machine is controlled for that purpose in the manner described hereinafter. Immediately after the control for determining whether or not a line-space is to be effective has been operated, the low spot 1554 again moves the feed pawl in the feeding direction.

Near the end of the feeding operation, the cam plate 1553 permits the spring 1551 to restore the arm 1550 to its home position, thus permitting the spring 1539 to restore the rack bar 1537, the link 1542, the arm 1543, and the link 1545 to their home positions. During this movement, the arm 1534 is rocked clockwise, and, when moving in this direction, the eject pawl 1532, engaging the ratchet wheel 1529, rotates the shaft 1527 clockwise, which, through the gears 1526 and 1524 and the pinion 1522, rotates the feed rollers 1520 clockwise to eject the book or the card from the machine.

As hereinbefore described in the consideration of the printing hammer control mechanism, the arm 1485 is connected to the bail 1483, and therefore, when no card or book is in the machine and the printing hammers are thrown off, the arm 1485 is elevated from the position shown in Fig. 77. When the arm 1485 is elevated, the arm, through the slot 1547 and the roller 1546, raises the cam edge 1548 out of the path of movement of the roller 1549, and therefore, when the cam plate 1553 is operated, the operation of the cam arm 1550 will be idle, due to the fact that the end 1548 is above the path of movement of the roller 1549. Therefore, when no book or card is in the machine, the feed mechanism is not operated.

*Line-space control.*—As above mentioned, the cam 1553 is provided with a low spot 1554 for effecting a line-space movement of the feeding mechanism. After the feeding mechanism has been fed from the manually-positioned location on the table, the low spot 1554 permits the feeding mechanism to back up, from the position shown in Fig. 84. As the feeding mechanism backs up, a face 1555 engages the end 1556 of a retaining pawl 1900, described later. Thereafter, the cam 1553 again actuates the rack 1537 and the feed arm 1534 to cause the feed pawl 1531 to line-space the book or the card.

The movement of the link 1545 is controlled by an arm 1560, which forms a part of a yoke 1561 (Fig. 79), having a second arm 1562. The arms 1560 and 1562 are pivoted on the shaft 1563. A spring 1564 (Fig. 77) normally urges the arms 1560 and 1562 clockwise until the arm 1560 is arrested by a square stud 1565, carried on the beforementioned link 1545. When the link 1545 is moved in the back-up direction, the stud 1565 passes beyond the end of the arm 1560, thus permitting the spring 1564 to raise the arm 1560 to bring a shouldered end 1566 into the path of the return movement of the stud 1565. The moved position of the stud 1565 is shown in dotted lines in Fig. 77.

The extent of movement given to the arm 1560 by the spring 1564 is controlled by a stud 1567 engaging the upper end 1568 of the bifurcated end of a link 1569. The upper end of the link 1569 is pivoted on a stud 1599, carried by an arm 1571, loose on the shaft 1443. The arm 1571 is connected to an arm 1570 by a hub, and the arm 1571 is provided with a stud 1572, which normally engages an arm 1573, pinned to the shaft 1443. The arm 1571 is provided with a downwardly-extending arm 1574. A feeler link 1575 is pivoted to the arm 1574 and is slotted to slide on the rod 1446. A spring 1576 normally maintains the link 1575 and the stud 1572 in engagement with the arm 1573.

When the cams 1450 rock the arm 1448 and the shaft 1443 clockwise (Figs. 42 and 47), the arm 1573 is lowered to permit the stud 1572 to be lowered therewith due to the action of the spring 1576 to project feeler fingers 1577 into engagement with control plates 1578, 1579, 1580, 1581B and 1581C (Figs. 67-A and 67-B).

For the system described herein, the plates 1578, 1579, 1580, 1581B and 1581C are notched in accordance with the chart (Fig. 105).

If the notching of the control plates is such that the feeler fingers 1577 and the link 1575 are arrested at the beginning of operation, the link 1569 is not lowered but remains in the position shown in Fig. 77. Under this setting, when the cam 1553 actuates the cam follower arm 1550 to shift the link 1545 leftwardly, the stud 1565 assumes the dotted-line position (Fig. 77), and the arm 1560 is raised under the action of the spring 1564. The notch 1568 in the lower end of the link 1569 is of sufficient length to permit the stud 1567 to move therein to position the end 1566 into the path of the stud 1565 to arrest the link 1545 in the projected position, and therefore the link 1545 cannot be restored to feed the card or the book.

The end of the arm 1560 is provided with an extending portion 1582, which extends slightly beyond the face 1566 of the arm. At the end of the operation of the machine, the extension 1582 comes to rest on top of the square stud 1565. When the link 1545 is actuated by the arm 1550, the square stud is given a slight overthrow to move beyond the extension 1582, and, when the spring 1539 restores the link 1545 after the arm 1560 has been raised, the square stud 1565 is permitted to move beneath the extension 1582.

Inasmuch as the arm 1560, when in position in front of the stud 1565, prevents restoring movement of the link 1545 to prevent line-spacing, the arm 1560 also prevents ejection of the book or the card. When this occurs, it is desirable to prevent the tension rollers 1506 (Fig. 74) from being restored to their normal positions, so that the tension rollers 1506 will remain in contact with the card or record and maintain the card or record impinged against the feed rollers 1520. To prevent restoration of the tension rollers 1506, the arm 1543 has pivoted thereto a link 1583, which is slotted to receive a stud 1584 on an arm 1585, secured to the shaft 1563. Also secured to the shaft 1563 is an arm 1586, bifurcated to embrace a stud 1587 on an ear of the beforementioned link 1513. When the arm 1543 is rocked counter-clockwise (Fig. 74) by the cam 1554, the link 1583 rocks the arms 1585 and 1586 clockwise (Fig. 74) to raise the link 1513 and disconnect the notch 1517 therein from the roller 1518, thus disconnecting the link 1513 from the cam follower arm 1514.

Since, when the link 1545 is held in its moved position by the arm 1560, when no line-spacing or ejecting operation is to take place, the link 1583 will remain in its moved position, thus maintaining the link 1513 disengaged from the stud 1518, the link 1513 is not restored to its home position at the end of operation of the machine. Since the link 1513 is not restored, the arm 1511 remains in its moved position to maintain the cam edge 1519 over the roller 1510 of the tension roller arm 1508 to maintain the tension roller 1506 in contact with the feed roller 1520. Thus, at the end of operation of the machine, the tension roller holds the book or card in the position into which it was fed during the operation of the machine, ready to receive another entry on the same line of the book or card in the succeeding operation of the machine.

The link 1569 is restored to its normal position either by the cams 1450 (Fig. 42) or by a cam 1590 (Fig. 80). The cam 1590 coacts with a roller 1591 on a three-armed member 1592, rotatably mounted on the beforementioned shaft 1443. Connected to the three-armed member 1592 is an arm 1594 (see Fig. 77 also).

The cam 1590 is timed to restore the link 1569 earlier in the machine cycle than the cams 1450. Which one of the cams 1590 or 1450 is effective to restore the link 1569 is controlled by the notches in the control plates 1578, 1579, 1580, and 1581. If deep notches are presented to the fingers 1577, the link 1575 receives its greatest movement, and therefore the link 1569 is lowered its greatest extent. In this setting of the notched control plate, the cams 1450 are controlled to restore the link 1569. However, if both high and half-depth notches are presented to the fingers 1577, the link 1575 moves a lesser extent, and therefore the link 1569 is lowered a lesser extent, in which event the restoring mechanism for the link 1569 is coupled to the arm 1594; therefore the cam 1590 restores the link 1569 earlier in the machine cycle than is the case when it is restored by the cams 1450. The arms 1573 and 1594 are lowered to release the arm 1571 at approximately the same time during the machine operation. The early return of the link 1569 is controlled by a pawl 1595, pivoted to the stud 1599, which is also the pivot point for the link 1569 on the arm 1571. When the link 1569 is lowered upon movement of the link 1575 toward the control plates 1578 to 1581, and the link 1575 is arrested by virtue of a high and shallow notch in the control plates, the arm 1573 continues to move, whereupon a stud 1600 on the pawl 1595 is guided down a cam edge 1596. A spring 1897, connected to the stud 1600 and the stud 1572, causes the stud 1600 to follow the inclined edge 1596 to move the end 1598 into the path of movement of the arm 1594. Thereafter, when the arm 1594 is rocked by the cams 1590, the arm 1594, engaging the end 1598 of the pawl 1595, raises the link 1569 to its normal position. However, if two high notches, two shallow notches, or one high notch and one deep notch are presented to the fingers 1577, the link 1569 follows the arm 1573 its entire extent; therefore the end 1598 of the pawl 1595 does not move over the arm 1594, and the arm 1594 is therefore not effective to restore the link 1569. In this setting, the cams 1450 restore the links 1569 to their normal positions, when they rock the arm 1573, at a time later than the arms 1594 would restore the link 1569.

As before mentioned, the cam plate 1553 is provided with a low spot 1554 (Fig. 77), which is effective to permit a restoring movement of the link 1545 a sufficient extent to cause one line-space feeding movement of the link 1545. After the low spot 1554 permits the line-space movement of the link 1545, the cam plate 1553 again restores the link 1545 to its moved position. If at this time the notched control plates control movement of the feeler link 1575 to be restored by the arm 1594, the arm 1560 is restored into the path of the square stud 1565 before the cam plate 1553 permits ejecting movement of the arm 1550, near the end of the operation. However, if the control plates permit the feeler link 1575 to move its fullest extent, and prevents coupling between the pawl 1595 and the arm 1594, the link is restored by the cams 1450 after the cam plate 1553 permits the ejection movement of the link 1545; that is to say, permits the link 1545 to move to its fullest extent, and the square stud 1565 again moves above the arm 1560 in the position shown in Fig. 77.

The respective timing of the cams 1553, 1450, and 1590 determines whether the records are to be line-spaced or whether they are to be ejected from the machine.

*Feed pawl control mechanism.*—As above described, the cam 1553 actuates the link 1545 and the arm 1534 to first feed the record into printing position, then backs up the rack 1537 preparatory for a line-spacing, and finally the cam 1553 actuates the link 1545 to eject the record from the machine. As before described, the line-space feed and the eject operation do not both take place in the same operation, since the controls described herein determine which operation is to take place during the machine operation.

Normally, the feed pawl 1531 and the eject pawl 1532 are in engagement with their ratchet wheels 1528 and 1529, respectively, as shown in Figs. 77, 80, and 81. At the end of the feed-in operation, the pawls 1531 and 1532 assume the positions shown in Fig. 82. When the low section 1554 of the cam plate 1553 backs up the rack 1537, preparatory for a line-space feed, it is necessary to hold the eject pawl out of engagement with its ratchet wheel 1529; also, to prevent retrograde movement of the ratchet wheel as the feed pawl drags over its ratchet wheel 1528, a retaining pawl 1900, pivotally mounted on a stud 1901, is provided. Secured to the retaining pawl 1900 is an arm 1902, to which is connected one end of a spring 1903, to urge the pawl counter-clockwise (Fig. 80) toward the ratchet wheel 1528. A stud 1904, carried by the arm 1902, is normally held in engagement with a surface 1905 of a control plate 1906. The control plate 1906 is also provided with a surface 1907, adapted to be engaged by a stud 1908 on the eject pawl when the eject pawl is in the full counter-clockwise position, as shown in Fig. 84. The control plate 1906 is yoked to an arm 1909, to which is also pivoted a link 1910, connected to a cam follower arm 1911, pivoted on the beforementioned shaft 1439. The cam follower arm 1911 is provided with a roller 1912, coacting with a cam 1913 on the printer cam shaft 1441. A spring 1914, connected to the arm 1909, normally maintains the roller 1912 in engagement with the cam 1913.

At the end of the feed-in operation, the cam 1913 rocks the control plate 1906 from the position shown in Fig. 82 into the position shown in Fig. 84, whereupon the surface 1905 passes from underneath the stud 1904, to release the retaining pawl 1900 to drop into engagement with the ratchet wheel 1528, and simultaneously the surface 1907, engaging the stud 1908 of the eject pawl 1532, rocks the eject pawl out of engagement with its ratchet wheel 1529. Thereafter, when the rack 1537 backs up the feed arm 1534, the eject pawl 1532 is out of engagement with the ratchet wheel 1529, the feed pawl 1531 ratchets over the ratchet wheel 1528, and the retaining pawl 1900 prevents retroactive movement of the ratchet wheel 1528. Thereafter, when a line-space feed is to be performed, the feed pawl 1531, being in engagement with the ratchet wheel 1528, rotates the ratchet wheel 1528 counter-clockwise (Fig. 81), and the feed pawl 1900 ratches over the ratchet wheel 1528. After the consecutive feed time has passed, the cam 1913 again restores the arm 1911, the link 1910, and the control plate 1906 to normal positions, wherein the retaining pawl 1900 is lifted out of engagement with the ratchet wheel 1528, and the eject pawl 1531 is again lowered into engagement with its ratchet wheel 1529, ready for an eject operation.

In those operations in which the link 1569 and the arm 1560 prevent a line-space feed operation, it is also desirable to prevent operation of the feed pawl control plate 1906. To this end, the arm 1560 is yoked to the beforementioned arm 1562. The arm 1562 is provided with a hook 1916, which is rocked in front of a stud 1917 on the beforementioned link 1910. Therefore, when the arm 1560 is in position behind the stud 1565, the hook 1916 lies in front of the stud 1917, thus preventing movement of the link 1910 and preventing throwout of the eject pawl. When the link 1569 is lowered to permit an eject operation by lowering the arm 1560 from behind the stud 1565, the hook 1916 is also lowered from the path of the stud 1917, thus permitting the link 1910 to actuate the eject pawl control arm 1906.

Further control over the line-spacing mechanism and the feed control plate 1906 is provided to prevent operation of these two mechanisms before the back-up operation and the consecutive feed take place, thus preventing a consecutive feed before the ejection. This mechanism is under control of a notched control plate 1920 (Fig. 80), mounted on the shaft 632, in the manner described hereinafter. The control plate 1920 is differentially adjusted by the first transaction bank in the usual manner. When the machine is operated with either the Balance key 121, the Overdraft key 123, or the Eject key 125 depressed, it is desirable to cause the record material to be ejected from the machine. Therefore, the control disk 1920 is provided with notches corresponding to these four positions. A feeler slide 1921 is spring-urged by a spring 1922 to sense for the notches in the control plate 1920. If a notch is opposite the feeler slide 1921 when the cam 1590 permits clockwise movement (Fig. 80) of the member 1592, a link 1923, connected thereto, is lowered. The link 1923 is pivoted to a hook arm 1924, which is lowered to engage the stud 1917 when a deep notch is opposite the feeler slide 1921. Also connected to the hook arm 1924 is an arm 1925, provided with a flange 1926, which is lowered into the path of an extension of the square stud 1565 when the link 1923 is lowered.

Engagement of the hook arm 1924 with the stud 1917 prevents operation of the control plate 1906 until after the time for the consecutive feed to take place, whereupon the cam 1590 again raises the link 1923 to release the link 1910. The timing of the cam 1590 is such that it lowers the link 1923 after the feed link 1545 is moved to its forward position. When in this position, and the hook arm 1924 is lowered over the stud 1917, the flange 1926 is moved behind the stud 1565, which now occupies the position shown in dot-and-dash lines in Fig. 83. This prevents return movement of the link 1545, thus preventing a line-space movement of the arm 1534. After the time for the line-spacing has been passed, the cam 1590 again raises the link 1923 to release the links 1910 and 1545, so that, upon continued operation of the machine, the record, either the ledger card or the book, is ejected from the machine.

At the end of the operation during which the hook and the card were line-spaced, the tension rollers 1506 remain in their effective position, impinging the book or the card against the feed rollers 1520. Also, at the end of this operation, the square stud 1565 is positioned below the extending portion 1582 on the arm 1560, thus holding the roller 1546 in the left-hand end (Fig. 77) of the slot 1547 on the arm 1485. At the end of this operation, it is intended that the book or the card remain in the machine until a succeeding operation, during which the book or the card is ejected from the machine by the ejecting mechanism. However, if through a misoperation the operator should grasp the book or the card and forcibly pull it out of the machine, a misoperation would follow during the next succeeding operation.

A misoperation would follow due to the fact that the feeler 1460, rising, would enter the opening in the table and rise to its fullest extent. This, as hereinbefore described, rocks the arm 1485 clockwise (Fig. 77). Since at this time the roller 1546 is near the left-hand end of the slot 1547 in the arm 1485, clockwise rotation of the latter would cause the roller 1546 to leave the slot 1547, thereby disconnecting the link 1545 from the arm 1485. To prevent such a misoperation, an interlock is provided, which is as follows:

Pinned to the shaft 1471 (Fig. 74) is a cam arm 1930, on which normally rests a roller 1931. The roller 1931 is carried on the side of an arm 1932, loose on the shaft 1487. The free end of the arm 1932 is adapted to drop behind a stud 1933 on the arm 1462, to which is pivoted the feeler 1460.

At the end of an operation with a record material in the machine, the cam arm 1511 (Fig. 74) remains in its moved position, maintaining the cam edge 1519 in engagement with the roller 1510 to maintain the tension roller 1506 in its effective position. The arm 1511 is also pinned to the shaft 1471, and therefore, when the arm 1511 is in its moved position, the cam arm 1930 is also in a moved position. As the cam arm 1930 is rocked with the arm 1511, the cam surface thereon permits the spring 1934 to lower the free end of the arm 1932 into the path of the stud 1933, where the arm remains at the end of the operation. If the book or the card is forcibly withdrawn from between the tension roller and the feed roller 1520, the arm 1932 will maintain the arm 1462 and the feeler 1460 in the lowered position, so that, even though the machine is operated without a book or a card therein, the feeler will not rise, and therefore the feeler mechanism is not operated to disable the printing mechanism and the arm 1485.

The arm 1932 remains behind the stud 1933 until the card or book ejecting mechanism is operated to effect the ejecting operation, whereupon the tension roller 1506 is lowered, and the cam arm 1930 is restored to its home position to lift the arm 1932 out from in front of the stud 1933.

*Last line printing, ejecting, and printing hammer controls.*—When the ledger card is full—that is, when an entry has been made on the last line of the card—the machine is locked against all operations except operations by depression of either the "Loan Interest" key 142, the "Eject" key 125, the "Overdraft" key 123, the "Sub-Balance" key 122, or the "Balance" key 121. These keys have been selected for illustrating the invention primarily because they fit into the system used to illustrate the invention. Other combinations of keys can be used to control the machine by varying the notching of certain of the control plates described herein. The same controls are effective when the last line of the book page has been printed upon, and the controls are effective when either the ledger card or the book is filled, or when both are filled.

The printing and ejecting mechanisms described above are also controlled by the last line controls. The following operations and controls are tabulated to list certain of said controls when the operations follow the entry of an item on the last line of either the book or the card, and the machine is locked:

1. Balance Operation—print in balance column and eject card and book whether full or not.
2. Sub-Balance Operation:
   (a) Card is full—print in balance column of card, eject card, and non-print book.
   (b) Book is filled—print in balance column of book, eject book, and non-print card.
   (c) Card and book full—print in balance column of both card and book, and eject both.
3. Sub-Balance Operation—Card and book not full—print in balance column on card and book—does not eject either.
4. Loan Interest Operation—print in second column on book and card whether full or not.
5. Eject Operation—eject book and card.

The control plates for controlling the printing and ejecting mechanisms for the book and the card from the keyboard have been described above. These plates include plates 1406, 1407, and 1408 (Figs. 67–A and 67–B) for controlling the printing hammers in the Balance column of both the book and the card, and the plates 1578, 1579, and 1580, 1581B and 1581C for controlling the ejecting mechanisms for both the book and the card. As before mentioned, the said groups of control plates also include plates 1405 and 1581, respectively, in the card-controlling group and in the book-controlling group. To distinguish one from the other in the following description, the plates 1405 and 1581 are provided with exponents B and C and are so designated in Figs. 67–A, 67–B, 97, and 100. The control plates 1405–B, 1405–C, 1581–B, and 1581–C are adjusted under control of record material feelers, one being provided for the book and one for the card.

The size of the book or ledger card may vary with the standards adopted by the bank using the machine. For this reason, and to obtain accurate control by the feelers in respect to the ends of the book or the card, the feelers are adjustably mounted so as to permit them to be adjusted from the front to the rear of the machine.

The feeler mechanism for the book is illustrated in Figs. 87 and 101 and includes an adjustable feeler finger 1950. The feeler 1950 may be adjustably secured in either one of two slots 1951 (see Fig. 101) by a bolt 1949. The bolt 1949 is a means for securing the feeler in the slots 1951, in either a right- or a left-hand position, thus providing a maximum of positions of adjustment thereof. The slots 1951 are in a horizontal flange 1952 of a slide 1953, provided with a slot 1954 and a bifurcated end 1955, through which project studs 1956 and 1957, respectively. The studs 1956 and 1957 are mounted on a bracket 1958, secured to the base 162 of the machine. The slide 1953 is provided with a stud 1959, engaged by a bifurcated end of an arm 1960. See also Fig. 86. The bifurcated arm 1960 is rotatably mounted on a shaft 1961, supported by the machine frames 160, 163, and 164. A sleeve 1962 (Fig. 101) connects the arm 1960 to a segmental shaped arm 1963 (Fig. 87) having a toe 1964 held in engagement with a stud 1965 on an arm 1966. A spring 1967, having one end thereof connected to the arm 1960 and the other end to a stud 1968 on the bracket 1958, normally urges the toe 1964 into engagement with the stud 1965. An upper branch of the arm 1966 has pivoted thereto one end of a link 1969, the other end of which is connected to a cam follower arm 1970. The follower arm 1970 is provided with a roller 1971, in engagement with a cam 1972, secured on the beforementioned cam shaft 1441. The cam 1972 has secured to its side a roller 1973, for engagement with one end 1974 of the follower arm 1970, during the machine operation.

Pivotally supported on the forward extension of a branch 1975 of the arm 1966 is a pawl 1976. The pawl 1976 is provided with a flange 1977, which is normally held in engagement with a surface 1978 of the segmental arm 1963 by a spring 1979.

When the book is inserted into the machine, it rests upon the table 1500. The table 1500 is provided with an opening through which the feeler 1950 can pass for sensing the presence or absence of a book on the table. When the book is not full—that is, when the last item entry made thereon is not on the last line of the book—and the feeler 1950 rises in the manner to be described presently, the feeler 1950 is not arrested. However, when the book is in position to receive an entry on its last line, the book is so located that the feeler 1950 will contact the end of the book as it rises, to arrest the feeler 1950.

When the machine is operated and the cam 1972 rotates counter-clockwise (Fig. 87), the cam follower arm 1970 is permitted to rock clockwise, with the roller 1973 engaging the end 1974 of the arm, to rock the arm 1970 clockwise. Clockwise rotation of the cam follower arm 1970 thrusts the link 1969 leftwardly (Fig. 87) to rock the arm 1966 counter-clockwise, thus lowering the pawl 1976. Rocking the arm 1966 counter-clockwise also moves the stud 1965 away from the toe 1964, thus permitting the arm 1960 to rock counter-clockwise. Counter-clockwise movement of the arm 1960 raises the slide 1953 to project the feeler 1950 through the opening in the table 1500, to sense for the presence or absence of the end of the book thereon. When the feeler 1950 engages the under side of the book, the feeler will be arrested, and the arm 1966 will continue to operate, thus permitting the flange 1977 of the pawl 1976 to drop behind the segmental extension 1963 of the arm 1960. Thereupon, when the cam 1972 restores the arm 1970, the link 1969, and the arm 1966 to their home positions, the pawl 1976 restores the arm 1960 to its home position to withdraw the feeler 1950 from engagement with the book. At the end of this operation the flange 1977 remains beneath the arm 1960. During a succeeding operation, when the arm 1966 is rocked counter-clockwise (Fig. 87) its fullest extent, a tail on the pawl 1977, having a cam edge 1887, contacts a stud 4000 (Fig. 88), by means of which the pawl 1977 is restored in a counter-clockwise direction around its pivot.

If, on the other hand, the last line of the book has not been printed upon, the feeler 1950 will not be arrested when the cam 1972 rocks the arm 1966 and the pawl 1976 counter-clockwise. During this operation, the flange 1977 does not drop below the arm 1963 but remains in contact with the surface 1978, as the arms 1960 and 1966 move counter-clockwise in unison, and therefore, when the cam 1972 restores the parts to their home positions, the flange 1977 will ride on the top thereof and will not restore the feeler 1950 to its home position. To restore the feeler to its home position, the stud 1965 engages the toe 1964 and rocks the arm 1960 clockwise (Fig. 87) to lower the feeler 1950 into its home position.

If the feeler 1950 is arrested by reason of the fact that the book is in position to receive a record on the last line, and the pawl 1976 drops below the arm 1963, the flange 1977 thereof drops behind a notch 1980 (Fig. 88) on the free end of an arm 1981, pivoted to the shaft 1961. The arm 1981 is yoked to an arm 1982 by a yoke 1983. The arm 1982 has pivoted thereto a link 1984, pivoted to a ring 1985, having internal teeth meshing with a pinion 1986 of a square shaft 1987 of an internal gear drive, like that shown in the above-mentioned Kreider patent, and, in the manner described therein, the square shaft extends through the control plate assembly (Figs. 67–A and 67–B).

Also mounted on the square shaft 1987 is a pinion 1988 (Fig. 95), meshing with the inner teeth of a ring 1989. The ring 1989 is provided with a stud 1990, projecting into a notch 1991 on the forward end of a pitman 1992 (see also Fig. 94). The pitman 1992 is pivoted to a cam follower arm 1993, pivoted on a stud 1994. The cam follower arm 1993 is provided with two rollers 1995, engaging a pair of plate cams 1996 on the beforementioned cam shaft 200.

When the ring 1989 is rocked clockwise upon lowering of the link 1984, the stud 1990, engaging the notch 1991, lowers the free end of the pitman 1992 to position an end 1093 of the pitman 1992 into the path of a stud 1094. The stud 1094 is carried on a ring 1095, having internal gears meshing with a pinion 1096 on a square shaft 1997. Also mounted on the square shaft 1997 is a pinion 1998 (Fig. 93), meshing with the internal teeth of a ring 1999. The ring 1999 is notched at 2000, and a stud 2001 on the control plate 1405–C (Fig. 97) is located within the notch 2000. A spring 2002 normally maintains the stud 2001 in engagement with the right-hand wall (Fig. 93) of the notch 2000.

As previously mentioned, when the ledger card obstructs the feeler 1950 (Fig. 87), due to the last line being printed upon, the flange 1977 drops behind the segment 1963 so as to restore the latter when the pawl makes its upward return movement. Since said flange 1977 has also engaged in the notch 1980 in the arm 1981, then, during the upward movement of the pawl 1976, the arm 1981 will be driven clockwise (Fig. 88), lowering the link 1984 and rocking the ring gear 1985 clockwise (Fig. 88), and the pinion 1986 also clockwise. The consequential clockwise movement of the square shaft 1987 rocks the ring gear 1989 clockwise (Fig. 95) by means of pinion 1988. Thereupon the stud 1990 lowers the pitman 1992 so that its surface 1093 lies in the same horizontal plane as the stud 1094 (Fig. 94) on the ring gear 1095. The cams 1996 (Fig. 92), now rock the cam follower arm 1993 counter-clockwise and the pitman 1992 leftwardly (Fig. 94), thus bringing the end 1093 into engagement with the stud 1094 and rotating the rings 1095 and 1999 counter-clockwise. Counter-clockwise movement of the ring 1999, through the spring 2002, pulls on the stud 2001 and rotates the plate 1405–C to position a high point of the control plate 1405–C into the path of the feeler 1451 (Fig. 70) of the card-printing mechanism. As before mentioned, when the high spot of the feeler 1451 engages a high spot on the disk 1405–C, the printing mechanism for the card is disabled. Therefore, when the last line on the book has been printed upon, the printing mechanism for the card is disabled, so that no entry will be made on the card in those operations in which the last line of the book has been printed upon.

An aliner 2003 on a shaft 2004 is brought into engagement with one or the other of notches 2005 of the ring plate 1405–C to maintain the control ring 1405–C in its position.

The above-described controls, through the feeler for feeling for the last line of the book, when the book is filled, apply to those operations in which the card is not full.

A second feeling mechanism is provided for feeling for the last line on the card. This mechanism is similar to that described above. When the last line of the card is filled, it is desired to throw off the printing in the book. However, if both the book and the card are full—that is to say, the last line is in printing position on both—then the data is printed on both the book and the card, and both the book and the card are ejected from the machine. The control over the non-printing in the book will be described first.

When the card is in position to be printed upon, it rests on the table 1501 (Fig. 104). Located beneath the table 1501 is a feeler 2050 (Figs. 101 and 104). The feeler 2050 is adapted to be projected through an opening in the under side of the table 1501 to feel for the presence of the end of the card. If the card is in position to receive printing on the last line, the feeler 2050 will contact the card, thus being prevented from rising its fullest extent. If the card has not reached the last-line position, the end of the card will not be in the path of the feeler 2050, and therefore the feeler can move its fullest extent.

The feeler 2050 may be mounted in one of the slots 2051 on the flange 2053 on the slide 2054, by means of the bolt 2052. The bolt-and-slot connection on the slide 2054 provides a means for adjusting the feeler 2050 in relation to the card, so that cards of varying lengths may be used in the machine. The slide 2054 is provided with a slot 2055 and a bifurcated end 2056, which may slide on studs 2057 and 2058, respectively, mounted on a bracket 2059. The slide 2054 is provided with a stud 2060, which engages a bifurcated end of an arm 2061, pivotally mounted on the shaft 1961. The arm 2061 is connected by a sleeve to a segmental arm 2063. The arm 2061 is also provided with a toe 2064, held in engagement with a stud 2065, on an arm 2066, by a spring 2067, connected to a downward extension of the arm 2061. One end of the spring 2067 is connected to a stud 2062 on the bracket 2059. The arm 2066 has connected thereto a link 2069, the other end of which is connected to a cam follower arm 2070, pivoted on the beforementioned shaft 1439. The cam follower arm 2070 is provided with a roller 2071, contacting a cam 2072 on the cam shaft 1441. The cam plate 2072 is provided with a stud 2073 for engaging the end 2074 for rocking the cam follower arm 2070 during the machine operation. The arm 2066 is provided with a stud 2075, on which is mounted a pawl 2076, having a flange 2077, normally held in engagement with the outer periphery of the segmental arm 2063 by a spring 2079.

When, during the operation of the machine, the cam 2072 rocks the arm 2070 to project the link 2069 leftwardly (Fig. 104), the arm 2066 is rocked counter-clockwise. This movement, through the stud 2065 and the spring 2067, causes the arm 2063 to move therewith, to raise the slide 2054 and the feeler 2050 to feel for the presence of a card. If the card is not in position to print upon the last line, the feeler will move its fullest extent, and therefore the segmental arm 2063 will rock with the arm 2066 during its entire rocking movement, and therefore the flange 2077 of the pawl 2076 remains on the surface 2078. Upon return movement of the arm 2061, the stud 2065 engages the toe 2064 and restores the arm 2063 and the feeler 2050 to normal position.

However, if the card is in position to receive an impression on the last line, the feeler 2050 will engage the card, and the feeler will be arrested before it reaches its fullest extent of movement. However, the arm 2066 will continue to move, thus causing the flange 2077 to pass from the surface 2078 of the arm 2063 and drop behind the arm. Upon return movement of the arm 2066, the flange 2077 will restore the arm 2063 and the feeler 2050 to home position.

When the flange 2077 rocks below the arm 2063, the flange is moved behind a shoulder 2080 of an arm 2081, which arm is connected to a second arm 2082 by a bail 2083. The arm 2082 is connected to a link 2084, and its upper end is connected to a ring 2085.

When the flange 2077 drops behind the shoulder 2080, and the arm 2066 is restored to its home position, the arm 2081, together with the bail 2083 in the arm 2082, will raise the link 2084 to rotate the ring 2085. The ring 2085 is provided with internal teeth meshing with a pinion 2086 on a square shaft 2087 to form an internal drive similar to that disclosed in the above-mentioned Kreider patent. The square shaft 2087 is provided with a pinion 2088, meshing with the internal gears of a ring 2089 (Fig. 92). The ring 2089 is provided with a stud 2090, projecting into a notch 2091 of a pitman 2092. The right-hand end of the link 2092 (Fig. 92) is connected to the same stud on the cam follower arm 1993 as the pitman 1992, as clearly shown in Fig. 101.

When the ring 2085 (Fig. 103) is rocked under control of the feeler mechanism, the stud 2090 (Fig. 92) lowers the free end of the pitman 2092 to position an end 2093 thereon into the path of a stud 2094 (Fig. 91) of a ring 2095. The ring 2095 is provided with internal teeth, which mesh with a pinion 2096, secured to a square shaft 2097. Also secured to the shaft 2097 is a pinion 2098 (Fig. 98) meshing with internal teeth of a ring 2099. The ring 2099 is provided with a notch 2100, into which projects a stud 2101 on the control plate 1405–B. A spring 2102 normally maintains the right-hand end of the notch 2100 in engagement with the stud 2101.

The beforementioned plate 1581–C is also adjusted by the square shaft 2097, which carries a pinion meshing with internal teeth in the plate 1581–C.

When the cams 1996 are rotated during a machine operation and the cam follower arm 1993 is rocked counter-clockwise, the pitman 2092 is thrust leftwardly (Fig. 92). If at this time the end 2093 is behind the stud 2094, the ring 2095 is rocked counter-clockwise (Fig. 91). Counter-clockwise rotation of the ring 2095, through the square shaft 2097 and the pinion 2098, rocks the ring 2099 likewise. When this occurs, the spring 2102 pulls on the stud 2101 to position the control plate 1405–B into position to present a high spot to the feeler 1451 for throwing off the printing hammers for the book.

Thus, when the card is in position to have the last line printed upon, and the book is not filled, the printing on the book will be thrown off, so that no record will be made on the book.

When both the book and the card are full, it is desired to print the balance on both and eject both. In this set-up, the feeler would normally rotate the control plates 1405–C and 1405–B into position to present a high spot to the respective feelers 1451, and therefore no impression would be made on either the book or the card. To prevent such a happening, the following mechanism is provided:

Meshing with internal teeth of a ring 2104 (Fig. 96) is a pinion 2105 on the above-mentioned shaft 2087. The shaft 2087 is rocked clockwise (Fig. 92) by the ring 2085 (Fig. 103) and the link 2084, when the card is full, to permit movement of the control plate 1405–B to throw off the print for the book. However, under the condition just mentioned—that is, when both the card and the book are full—it is desired to prevent movement of the control plate 1405–B; therefore, when the shaft 2087 is rocked, the ring 2104 is moved clockwise into engagement with the stud 2001 to prevent movement of the control plate 1405–C by the spring 2002.

Likewise, when the shaft 1987 is rocked under control of the feeler 1950, a ring 2106 (Fig. 99) is rotated by a pinion 2107 on the square shaft 1987 to move a shoulder thereon into engagement with the stud 2101 to prevent movement of the control plate 1405–B. Therefore, the high spot on the control plate 1405–C is withheld from movement into the path of the feeler finger 1451, thus permitting the printing mechanism for the card to be effective.

The spring-urged alining yoke 2110 (Fig. 103) is provided to maintain the arm 2082 and its connected mechanisms in a normal position. The yoke 2110 is provided with a stud 2111, which normally engages a notch 2112 (Fig. 86) in the arm 2082. A similar yoke 2110 is provided for maintaining the arm 1982 and its connected mechanism in home position.

The printing throwoff controls just described relate to the printing in the fourth column of the book or card. It should be noted that the printing of the items in columns 2 and 3 can be effective on the last line of the book or card, but certain entries in column 4, after the last line of the book or card has received entries in columns 2 and 3, are suppressed. In the system disclosed herein, as will be described later, this control is effective when sub-totals are entered, and the sub-total is printed only in column 4 of the book or card on the last line thereof, following the entry of an item on the last line. Thus, if the item is printed on the last line of the book but not on the last line of the card, and the Sub-Total key is depressed for the succeeding operation, the sub-total is printed in the book but not on the card. When the item is printed on the last line of the card, but not on the last line of the book, the sub-total is printed on the card but not in the book. However, when the item is printed on the last line of both the book and the card, the sub-total is printed in column 4 of both.

*Last line printing—machine locking controls.*—At the end of an operation in which the last line receives data, the machine is locked against operation, except by certain keys. In the present illustration, these keys are the "Loan Interest" key 142, the "Balance" key 121, the "Sub-Balance" key 122, the "Overdraft" key 123, and the "Eject" key 125.

The beforementioned arms 1982 and 2082, which are rocked clockwise (Fig. 103) when the last line on the book or the card, respectively, has been printed upon, in the manner described above, under control of the feelers 1950 or 2050, are each provided with a stud 3000. A finger 3001 is normally held in engagement with each stud 3000, and the fingers are secured to hubs 3002, pinned to the shaft 1961 (see also Figs. 89 and 90). Also secured to the shaft 1961 is an arm 3003, which is spring-urged counter-clockwise by a spring 3004, and the arm 3003 is provided with a finger 3005, which is held in engagement with a stud 3006 on the machine side frame 160. The lower end of the arm 3003 has pivoted thereto a link 3007, connected to an arm 3008, pivoted on a shaft 3009. Hubbed to the arm 3008 is an arm 3010, provided with a stud 3011, projecting into a notch in a stop arm 3012 (see also Fig. 102). The stop arm 3012 is freely mounted on the shaft 3009, and the upper wall of the notch in the arm 3012 is normally held in engagement with the stud 3011 by a spring 3013. The arm 3012 is provided with a locking surface 3014, which is adapted to be moved into the path of a flange 3015 of an arm 3016, pivoted on the beforementioned shaft 940. The arm 3016 is secured to the beforementioned arm 938, which is rocked clockwise upon release of the machine.

If the locking surface 3014 is moved into the path of movement of the flange 3015, the releasing mechanism cannot operate, inasmuch as the flange 3015 is in contact with the locking surface 3014.

When either arm 1982 or 2082 is rocked clockwise (Fig. 103) by virtue of the feelers 1950 or 2050 being arrested because the book or the card, or both, are in the last-line position, one or both studs 3000, engaging one or both fingers 3001, rock the shaft 1961, which, through the arm 3003, shifts the link 3007 and rocks the arm 3008 clockwise (Fig. 103). Clockwise movement of the arm 3008 rocks the arm 3010 likewise and, through the spring 3013, moves the arm 3012 into position to prevent movement of the arm 3016, thus locking the machine against release.

To permit further operation of the machine, it is necessary to withdraw the arm 3012 to withdraw the locking surface 3014 from beneath the flange 3015. The withdrawal of the arm 3012 is effective upon depression of the "Loan Interest" key 142, the "Balance" key 121, the "Sub-Balance" key 122, the "Overdraft" key 123, or the "Eject" key 125.

The withdrawal of the arm 3012 is accomplished by energizing a solenoid 3018 (Figs. 20 and 103). The solenoid 3018 is energized upon the closing of a switch when one of the last-mentioned keys is depressed. When the solenoid 3018 is energized in the manner described hereinafter, its armature 3019 is raised (Fig. 103) to raise a link 3020, connected to an arm 3021 (see also Fig. 102), mounted on the shaft 3009. A spring 3055, connected to an arm 3056, hubbed to the arm 3021, maintains the armature 3019 in its normal position. The arm 3021 is provided with an upstanding finger 3022, lying in the path of movement of a stud 3023 on the arm 3012. When the arm 3012 is moved into its locking position, the stud 3023 lies against the left-hand wall of the finger 3022. Thus, when the solenoid 3018 is energized to withdraw its armature 3019, the arm 3021 is rocked counter-clockwise (Figs. 102 and 103), and the finger 3022, engaging the stud 3023, rocks the arm 3012 back into its normal, or unlocking, position.

Secured to the arm 3010 is a switch arm 3024, which is adapted to close a switch 3025 when the arm 3012 is moved to its locking position.

The switch 3025, as indicated in the diagram (Fig. 20) is in a circuit for energizing the solenoid 3018. A second switch, 3026, is also provided in the circuit through the solenoid 3018, which switch is closed upon depression of one of the last-named five keys.

The switch 3026 (Fig. 27) is mounted on the front cross bar of the machine and is closed by a switch arm 3027, secured to one arm of a yoke 3028, which yoke spans the space between the transaction banks of keys. One arm of the yoke 3028 is provided with a finger 3029 (Fig. 28), in engagement with a stud 3030 on a detent 3031 in the third transaction bank. The key stud 579 of the "Loan Interest" key projects through an opening in the detent 3031, and the detent is provided with a cam edge 3032, with which the key stud 579 coacts. Depression of the "Loan Interest" key, coacting with the cam edge 3032, shifts the detent 3031 leftwardly (Fig. 28) to rock the finger 3029 clockwise and, through the yoke 3028, rocks the switch arm 3027 clockwise to close the switch 3026.

Adjacent the first transaction bank of keys is a detent 3033 (Fig. 29), having cam edges 3034, engaging the key studs 579 on the "Balance," "Sub-Balance," "Overdraft," and "Eject" keys. The detent 3033 is provided with a stud 3035 on an arm 3036, which arm is notched to engage the yoke 3028.

When a "Balance," "Sub-Balance," "Overdraft," or "Eject" key is depressed, its corresponding key stud 579, engaging the cam edges 3034, shifts the detent 3033 leftwardly (Fig. 29) to cause the stud 3035, by engaging the arm 3036, to rock the yoke 3028 and the switch arm 3027 to close the switch 3026.

As beforementioned, the switch 3025 is closed when the machine is locked, upon printing on the last line of a record. On depression of any one of the above keys, which actuate the switch 3026, a circuit is closed through the solenoid 3018, thus raising the armature 3019 and withdrawing the arm 3012 in the manner described above.

Depression of any of the other ones of the transaction or control keys has no effect on the closing of the switch 3026, and therefore the machine cannot be released by any of the keys other than the five enumerated above.

The operation of the machine with either the "Loan Interest," the "Balance," the "Sub-Balance," the "Overdraft," or the "Eject" key depressed, following the locking of the machine by reason of the last line's being printed upon, leaves the record material in the last-line position, and therefore the feelers 1950 and 2050 would again lock the machine at the end of each of these operations. To prevent locking of the machine at the end of a "Balance," "Overdraft," or "Eject" operation, a special control mechanism (Fig. 42) is provided.

A notched disk 3040 (Fig. 42) is adjusted in respect to a feeler 3041 under control of the first transaction differential mechanism, through an internal gear drive of the Kreider disclosure. During a machine operation in which either the "Balance" key, the "Overdraft" key, or the "Eject" key is depressed, the notched disk 3040 is positioned to position a notch into the path of the feeler 3041. The feeler 3041 is provided with a slot through which a stud 3042 projects, and on which the feeler is guided at one end, and at the other end the feeler is pivoted to an arm 3043. A spring 3044 normally tends to shift the feeler 3041 into engagement with the control disk 3040. The arm 3043 is provided with a stud 3045, which is held in engagement with a finger 3046, secured to the beforementioned shaft 1443, which is actuated by the cams 1450. The arm 3043 has connected thereto a link 3047, pivoted to a bell crank 3048, pivoted on the shaft 1439. Also secured to the bell crank 3048 is a link 3049, connected to an arm 3050, pivoted on the shaft 1961. The arm 3050 has formed thereon a segment 3051, which may be rocked into the path of movement of the flange 1977 on the pawl 1976.

The segment 3051 is moved into the path of movement of the flange 1977 during machine operation, when the cams 1450 rock the arm 1448 and the finger 3046, to permit the spring 3044 to project the feeler 3041 into the alined notch designated by the numerals 1, 3, and 5 in Fig. 42. When the feeler 3041 is projected into a notch, the arm 3043, rocking clockwise, lowers the finger 3046 and through the bell crank 3048, shifts the link 3049 rightwardly to rock the arm 3050 and the segment 3051 clockwise.

The outer periphery of the segment 3051 comes into alinement with the outer periphery 3053 of the arm 1981 when the segment 3051 is moved into said clockwise position. When in such clockwise position, the segment 3051 is moved high enough to prevent the pawl 1976 from coming into engagement with the notch 1980 during the machine operation. Therefore, when the pawl 1976 is rocked upwardly (Fig. 42), the flange 1977 cannot engage the shoulder 1980; therefore the arm 1982 is not moved to rotate the finger 3001 (Fig. 103), and the arm 3003, the link 3007, the arm 3008, and the arm 3012 are not moved to their locking positions.

A control disk 3040 (Fig. 42) and the connections therefrom to segment 3051 are provided to block engagement of the pawl 1976 with the notch 1980 of the arm 1982 in the book printer. A duplicate mechanism is provided in the card printer.

During the initial movement of the arm 1975, a stud 3052 (Figs. 86 and 90) on the arm 1975 engages a finger 3037 of an arm secured to the hub 3002 on the shaft 1961, and therefore, during the beginning of a machine operation, the stud 3052, engaging the finger 3037, restores the shaft 1961 and the arm 3012 to normal position, ready to be readjusted according to the controls during the succeeding operation of the machine.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a machine of the class decribed, the combination of a plurality of means to record data in columns on a plurality of record materials, one recording means being provided for each column, line-spacing means to line-space the record materials, sensing means coacting with the record materials, means controlled by the sensing means when one of the plurality of record materials is fed into position to receive data on the last line thereof to disable one of the column-recording means for the other record material; and means set under control of the sensing means to disable the last-named means when the record materials are simultaneously fed into positions to receive data on the last lines thereof to thereby cause the data to be printed in the said one column on the last lines of the record materials.

2. In a machine of the class described, the combination of two data-recording means to record data in a column of two record-receiving means, one of said data-recording means for each data-receiving means, both of the data-receiving means provided with a plurality of lines to receive data; a line-spacing mechanism to line-space each data-receiving means; a sensing mechanism to sense each data-receiving means; control devices adjusted under control of the sensing means to disable the data-recording means for one data-receiving means when the other data-receiving means is moved into position to receive data on the last line thereof and the said one data-receiving means is not in position to receive data on the last line thereof; and means controlled by the sensing means when both data-receiving means are in position to receive data on the last lines thereof to disable the control devices to cause the data to be recorded in said columns on the last lines of both data-receiving means.

3. In a machine of the class described, the combination of two data-receiving means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, two control disks, a feeler coacting with each control disk, a disabling mechanism actuated by each feeler to disable one of the two data-recording means, connections between the control disks and the sensing mechanism whereby the control disks are moved into positions to disable the data-recording means for one data-receiving means when the other data-receiving means is moved into position to receive data on the last line thereof, and the said one data-receiving means is not in position to receive data on the last line thereof, and means controlled by the two sensing means whereby the control disks are both moved into non-disabling positions when both data-receiving means are in positions to receive data on the last lines thereof to cause the data to be recorded in said columns on the last line of both data-receiving means.

4. In a machine of the class described, the combination of two data-receiving means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, a settable device adjusted under control of each sensing means when either record-receiving means is in position to receive an entry on the last line thereof, control devices adjustable to disable the data-recording means, an operating means, connections between the operating means and the control devices and operable during a machine operation to adjust the control devices into said disabling positions, and connections between the settable devices and the operating means whereby the settable devices move one element of the operating means into position to adjust the connections and the control devices to disable the data-entering means on one record-receiving means when the other record-receiving means is in position to receive data on the last line.

5. In a machine of the class described, the combination of two data-recording means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, a settable device adjusted under control of each sensing means when either record-receiving means is in position to receive an entry on the last line thereof, control devices adjustable to disable the data-recording means, an operating means, connections between the operating means and the control devices and operable during a machine operation to adjust the control devices into said disabling positions, connections between the settable devices and the operating means whereby the settable devices move one element of the operating means into position to adjust the connections and the control devices to disable the data-entering means on one record-receiving means when the other record-receiving means is in position to receive data on the last line, and means settable by the sensing means to arrest the control disks in non-disabling positions when both data-receiving means are in positions to receive an entry in said column on the last lines thereof.

6. In a machine of the class described, the combination of two data-recording means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, a settable device adjusted under control of each sensing means when either record-receiving means is in position to receive an entry on the last line thereof, control devices adjustable to disable the data-recording means, an operating means, connections between the operating means and the control devices and operable during a machine operation to adjust the control devices into said disabling positions, connections between the settable devices and the operating means whereby the settable devices move one element of the operating means into position to adjust the connections and the control devices to disable the data-entering means on one record-receiving means when the other record-receiving means is in position to receive data on the last line, means settable by the sensing means to arrest the control disks in non-disabling positions when both data-receiving means are in positions to receive an entry in said column on the last lines thereof, and resilient connections between the last-named means and the control disks to actuate the control disks whereby the control disks can be arrested in said non-disabling positions.

7. In a machine of the class described, the combination of a plurality of means to record data on a plurality of lines on a plurality of record materials, sensing means coacting with each record material, means controlled by the sensing means when the last line of one of the record materials is in data-recording position, to disable the recording means for the other record material, and locking means controlled by the sensing means to lock the machine against operation when the last line has received data.

8. In a machine of the class described, the combination of a plurality of means to record data on a plurality of lines on a plurality of record materials, sensing means coacting with each record material, means controlled by the sensing means when the last line of one of the record materials is in data-recording position, to disable the recording means for the other record material, locking means controlled by the sensing means to lock the machine against operation when the last line has received data, a plurality of function control manipulative devices, and means actuated by certain ones of said manipulative control devices to unlock the machine for certain entries after the machine has been locked under control of the sensing means.

9. In a machine of the class described, the combination of a plurality of means to record data on a plurality of lines on a plurality of record materials, sensing means coacting with each record material, means controlled by the sensing means when the last line of one of the record materials is in data-recording position, to disable the recording means for the other record material, locking means controlled by the sensing means to lock the machine against operation when the last line has received data, a plurality of function control manipulative devices, electrically-operated means for unlocking the machine after the machine has been locked under control of the sensing means, a switch for closing an electric circuit through the electrically-operated means, and means actuated by certain of said manipulative devices to close the switch.

10. In a machine of the class described, the combination of a plurality of means to record data on a plurality of lines on a plurality of record materials, sensing means coacting with each record material, means controlled by the sensing means when the last line of one of the record materials is in data-recording position, to disable the recording means for the other record material, locking means controlled by the sensing means to lock the machine against operation when the last line has received data, a plurality of function control manipulative devices, electrically-operated means for unlocking the machine after the machine has been locked under control of the sensing means, a pair of switches for closing an electric circuit through said electrically-operated means, means actuated by the locking means to close one of said switches when moved into locking position, and means actuated by certain ones of said manipulative devices to close the other switch to thereby activate the electrically-operated means.

11. In a machine of the class described, the combination of a plurality of means to record data in columns on a plurality of record materials, one recording means being provided for each column, line-spacing means to line-space the record materials, sensing means coacting with the record materials, means controlled by the sensing means when one of the plurality of record materials is fed into position to receive the data on the last line thereof to disable one of the column-recording means for the other record material, and locking means controlled by the sensing means to lock the machine against operation when the last line has received data.

12. In a machine of the class described, the combination of a plurality of means to record data in columns on a plurality of record materials, one recording means being provided for each column, line-spacing means to line-space the record materials, sensing means coacting with the record materials, means controlled by the sensing means when one of the plurality of record materials is fed into position to receive the data on the last line thereof to disable one of the column-recording means for the other record material, locking means controlled by the sensing means to lock the machine against operation when the last line has received data, a plurality of function control manipulative devices, and means actuated by certain ones of said manipulative control devices to unlock the machine for certain entries after the machine has been locked under control of the sensing means.

13. In a machine of the class described, the combination of a plurality of means to record data in columns on a plurality of record materials, one recording means being provided for each column, line-spacing means to line-space the record materials, sensing means coacting with the record materials, means controlled by the sensing means when one of the plurality of record materials is fed into position to receive data on the last line thereof to disable one of the column-recording means for the other record material, locking means controlled by the sensing means to lock the machine against operation when the last line has received data, a plurality of function control manipulative devices, electrically-operated means for unlocking the machine after the machine has been locked under control of the sensing means, a switch for closing an electric circuit through the electrically-operated means, and means actuated by certain of said manipulative devices to close the switch.

14. In a machine of the class described, the combination of a plurality of means to record data in columns on a plurality of record materials, one recording means being provided for each column, line-spacing means to line-space the record materials, sensing means coacting with the record materials, means controlled by the sensing means when one of the plurality of record materials is fed into position to receive data on the last line thereof to disable one of the column-recording means for the other record material, locking means controlled by the sensing means to lock the machine against operation when the last line has received data, a plurality of function control manipulative devices, electrically-operated means for unlocking the machine after the machine has been locked under control of the sensing means, a pair of switches for closing an electric circuit through said electrically-operated means, means actuated by the locking means to close one of said switches when moved into locking position, and means actuated by certain ones of said manipulative devices to close the other switch to thereby activate the electrically-operated means.

15. In a machine of the class described, the combination of a plurality of means to record data in columns on a plurality of record materials, one recording means being provided for each column, line-spacing means to line-space the record materials, sensing means coacting with the record materials, means controlled by the sensing means when one of the plurality of record materials is fed into position to receive data on the last line thereof to disable one of the column-recording means for the other record material, means set under control of the sensing means to disable the last-named means when the record materials are simultaneously fed into positions to receive data on the last lines thereof to thereby cause the data to be printed in the said one column on the last lines of the record materials, and locking means controlled by the sensing means to lock the machine against operation when the last line has received data.

16. In a machine of the class described, the combination of a plurality of means to record data in columns on a plurality of record materials, one recording means being provided for each column, line-spacing means to line-space the record materials, sensing means coacting with the record materials, means controlled by the sensing means when one of the plurality of record materials is fed into position to receive data on the last line thereof to disable one of the column-recording means for the other record material, means set under control of the sensing means to disable the last-named means when the record materials are simultaneously fed into positions to receive data on the last lines thereof to thereby cause the data to be printed in the said one column on the last lines of the record materials, locking means controlled by the sensing means to lock the machine against operation when the last line has received data, and manipulative control devices to unlock the machine after the machine has been locked under control of the sensing means.

17. In a machine of the class described, the combination of a plurality of means to record data in columns on a plurality of record materials, one recording means being provided for each column, line-spacing means to line-space the record materials, sensing means coacting with the record materials, means controlled by the sensing means when one of the plurality of record materials is fed into position to receive data on the last line thereof to disable one of the column-recording means for the other record material, means set under control of the sensing means to disable the last-named means when the record materials are simultaneously fed into positions to receive data on the last lines thereof to thereby cause the data to be printed in the said one column on the last lines of the record materials, locking means controlled by the sensing means to lock the machine against operation when the last line has received data, a plurality of function control manipulative devices, electrically-operated means for unlocking the machine after the machine has been locked under control of the sensing means, and means actuated by certain of said manipulative control devices to activate the electrical means.

18. In a machine of the class described, the combination of a plurality of means to record data in columns on a plurality of record materials, one recording means being provided for each column, line-spacing means to line-space the record materials, sensing means coacting with the record materials, means controlled by the sensing means when one of the plurality of record materials is fed into position to receive data on the last line thereof to disable one of the column-recording means for the other record material, means set under control of the sensing means to disable the last-named means when the record materials are simultaneously fed into positions to receive data on the last lines thereof to thereby cause the data to be printed in the said one column on the last lines of the record materials, locking means controlled by the sensing means to lock the machine against operation when the last line has received data, a plurality of function control manipulative devices, electrically-operated means for unlocking the machine after the machine has been locked under control of the sensing means, a pair of switches for closing an electric circuit through said electrically-operated means, means actuated by the locking means to close one of said switches when moved into locking position, and means actuated by certain ones of said manipulative devices to close the other switch to thereby activate the electrically-operated means.

19. In a machine of the class described, the combination of two data-recording means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, control devices adjusted under control of the sensing means to disable the data-recording means for one data-receiving means when the other data-receiving means is moved into position to receive data on the last line thereof and the said one data-receiving means is not in position to receive data on the last line thereof, and locking means controlled by the sensing means to lock the machine against operation when the last line has received data.

20. In a machine of the class described, the combination of two data-recording means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, control devices adjusted under control of the sensing means to disable the data-recording means for one data-receiving means when the other data-receiving means is moved into position to receive data on the last line thereof and the said one data-receiving means is not in position to receive data on the last line thereof, locking means controlled by the sensing means to lock the machine against operation when the last line has received data, and manipulative control devices to unlock the machine after the machine has been locked under control of the sensing means.

21. In a machine of the class described, the combination of two data-recording means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, control devices adjusted under control of the sensing means to disable the data-recording means for one data-receiving means when the other data-receiving means is moved into position to receive data on the last line thereof and the said one data-receiving means is not in position to receive data on the last line thereof, locking means controlled by the sensing means to lock the machine against operation when the last line has received data, a plurality of function control manipulative devices, electrically-operated means for unlocking the machine after the machine has been locked under control of the sensing means, a switch for closing an electric circuit through the electrically-operated means, and means actuated by certain of said manipulative devices to close the switch.

22. In a machine of the class described, the combination of two data-recording means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, control devices adjusted under control of the sensing means to disable the data-recording means for one data-receiving means when the other data-receiving means is moved into position to receive data on the last line thereof and the said one data-receiving means is not in position to receive data on the last line thereof, locking means controlled by the sensing means to lock the machine against operation when the last line has received data, a plurality of function control manipulative devices, electrically-operated means for unlocking the machine after the machine has been locked under control of the sensing means, a pair of switches for closing an electric circuit through said electrically-operated means, means actuated by the locking means to close one of said switches when moved into locking position, and means actuated by certain ones of said manipulative devices to close the other switch to thereby activate the electrically-operated means.

23. In a machine of the class described, the combination of two data-recording means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, control devices adjusted under control of the sensing means to disable the data-recording means for one data-receiving means when the other data-receiving means is moved into position to receive data on the last line thereof and the said one data-receiving means is not in position to receive data on the last line thereof, means controlled by the sensing means when both data-receiving means are in position to receive data on the last lines thereof to disable the control devices to cause the data to be recorded in said columns on the last lines of both data-receiving means, and locking means controlled by the sensing means to lock the machine against operation when the last line has received data.

24. In a machine of the class described, the combination of two data-recording means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, two control disks, a feeler coacting with each control disk, a disabling mechanisc actuated by each feeler to disable one of the two data-recording means, connections between the control disks and the sensing mechanism whereby the control disks are moved into positions to disable the data-recording means for one data-receiving means when the other data-receiving means is moved into position to receive data on the last line thereof, and the said one data-receiving means is not in position to receive data on the last line thereof, and locking means controlled by the sensing means to lock the machine against operation when the last line has received data.

25. In a machine of the class described, the combination of two data-recording means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, two control disks, a feeler coacting with each control disk, a disabling mechanism actuated by each feeler to disable one of the two data-recording means, connections between the control disks and the sensing mechanism whereby the control disks are moved into positions to disable the data-recording means for one data-receiving means when the other data-receiving means is moved into position to receive data on the last line thereof, and the said one data-receiving means is not in position to receive data on the last line thereof, locking means controlled by the sensing means to lock the machine against operation when the last line has received data, a plurality of function control manipulative devices, and means actuated by certain ones of said manipulative control devices to unlock the machine for certain entries after the machine has been locked under control of the sensing means.

26. In a machine of the class described, the combination of two data-recording means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, two control disks, a feeler coacting with each control disk, a disabling mechanism actuated by each feeler to disable one of the two data-recording means, connections between the control disks and the sensing mechanism whereby the control disks are moved into positions to disable the data-recording means for one data-receiving means when the other data-receiving means is moved into position to receive data on the last line thereof, and the said one data-receiving means is not in position to receive data on the last line thereof, locking means controlled by the sensing means to lock the machine against operation when the last line has received data, a plurality of function control manipulative device, electrically-operated means for unlocking the machine after the machine has been locked under control of the sensing means, a switch for closing an electric circuit through the electrically-operated means, and means actuated by certain of said manipulative devices to close the switch.

27. In a machine of the class described, the combination of two data-recording means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, two control disks, a feeler coacting with each control disk, a disabling mechanism actuated by each feeler to disable one of the two data-recording means, connections between the control disks and the sensing mechanism whereby the control disks are moved into positions to disable the data-recording means for one data-receiving means when the other data-receiving means is moved into position to receive data on the last line thereof, and the said one data-receiving means is not in position to receive data on the last line thereof, locking means controlled by the sensing means to lock the machine against operation when the last line has received data, a plurality of function control manipulative devices, electrically-operated means for unlocking the machine after the machine has been locked under control of the sensing means, a pair of switches for closing an electric circuit through said electrically-operated means, means actuated by the locking means to close one of said switches when moved into locking position, and means actuated by certain ones of said manipulative devices to close the other switch to thereby activate the electrically-operated means.

28. In a machine of the class described, the combination of two data-recording means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, two control disks, a feeler coacting with each control disk, a disabling mechanism actuated by each feeler to disable one of the two data-recording means, connections between the control disks and the sensing mechanism whereby the control disks are moved into positions to disable the data-recording means for one data-receiving means when the other data-receiving means is moved into position to receive data on the last line thereof, and the said one data-receiving means is not in position to receive data on the last line thereof, means controlled by the two sensing means whereby the control disks are both moved into non-disabling positions when both data-receiving means are in positions to receive data on the last lines thereof to cause the data to be recorded in said columns on the last line of both data-receiving means, and locking means controlled by the sensing means to lock the machine against operation when the last line has received data.

29. In a machine of the class described, the combination of two data-recording means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, two control disks, a feeler coacting with each control disk, a disabling mechanism actuated by each feeler to disable one of the two data-recording means, connections between the control disks and the sensing mechanism whereby the control disks are moved into positions to disable the data-recording means for one data-receiving means when the other data-receiving means is moved into position to receive data on the last line thereof, and the said one data-receiving means is not in position to receive data on the last line thereof, means controlled by the two sensing means whereby the control disks are both moved into non-disabling positions when both data-receiving means are in positions to receive data on the last lines thereof to cause the data to be recorded in said columns on the last line of both data-receiving means, locking means controlled by the sensing means to lock the machine against operation when the last line has received data, a plurality of function control manipulative devices, and means actuated by certain ones of said manipulative control devices to unlock the machine for certain entries after the machine has been locked under control of the sensing means.

30. In a machine of the class described, the combination of two data-recording means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, two control disks, a feeler coacting with each control disk, a disabling mechanism actuated by each feeler to disable one of the two data-recording means, connections between the control disks and the sensing mechanism whereby the control disks are moved into positions to disable the data-recording means for one data-receiving means when the other data-receiving means is moved into position to receive data on the last line thereof, and the said one data-receiving means is not in position to receive data on the last line thereof, means controlled by the two sensing means whereby the control disks are both moved into non-disabling positions when both data-receiving means are in positions to receive data on the last lines thereof to cause the data to be recorded in said columns on the last line of both data-receiving means, locking means controlled by the sensing means to lock the machine against operation when the last line has received data, a plurality of function control manipulative devices, electrically-operated means for unlocking the machine after the machine has been locked under control of the sensing means, a switch for closing an electric circuit through the electrically-operated means, and means actuated by certain of said manipulative devices to close the switch.

31. In a machine of the class described, the combination of two data-recording means to record data in a column of two record-receiving means, one of said data-recording means for each data-receiving means, both of the data-receiving means provided with a plurality of lines to receive data, a line-spacing mechanism to line-space each data-receiving means, a sensing mechanism to sense each data-receiving means, two control disks, a feeler coacting with each control disk, a disabling mechanism actuated by each feeler to disable one of the two data-recording means, connections between the control disks and the sensing mechanism whereby the control disks are moved into positions to disable the data-recording means for one data-receiving means when the other data-receiving means is moved into position to receive data on the last line thereof, and the said one data-receiving means is not in position to receive data on the last line thereof, means controlled by the two sensing means whereby the control disks are both moved into non-disabling positions when both data-receiving means are in positions to receive data on the last lines thereof to cause the data to be recorded in said columns on the last line of both data-receiving means, locking means controlled by the sensing means to lock the machine against operation when the last line has received data, a plurality of function control manipulative devices, electrically-operated means for unlocking the machine after the machine has been locked under control of the sensing means, a pair of switches for closing an electric circuit through said electrically-operated means, means actuated by the locking means to close one of said switches when moved into locking position, and means actuated by certain ones of said manipulative devices to close the other switch to thereby activate the electrically-operated means.

32. In a machine of the class described, a machine release means, a plurality of manipulative devices for releasing the machine release means, a receptacle for record material, said record material having a plurality of lines for receiving data, a sensing means to sense the record material, a stop device, means adjusted under control of the sensing means to move the stop device into a position to arrest movement of the machine releasing means when the sensing means is actuated while the record material is in position to receive data on the last line thereof, and means operated upon manipulation of certain ones of said manipulative devices to withdraw the stop device from the position in which the stop device arrests movement of the machine releasing means.

33. In a machine of the class described, a machine release means, a plurality of manipulative devices for releasing the machine release means, a receptacle for record material, said record material having a plurality of lines for receiving data, a sensing means to sense the record material, a stop device, means adjusted under control of the sensing means to move the stop device into a position to arrest movement of the machine releasing means when the sensing means is actuated while the record material is in position to receive data on the last line thereof, an electrically-operated device to withdraw the stop device, and means to activate the electrically-operated device upon manipulation of certain ones of said manipulative devices.

34. In a machine of the class described, a machine release means, a plurality of manipulative devices for releasing the machine release means, a receptacle for record material, said record material having a plurality of lines for receiving data, a sensing means to sense the record material, a stop device, means adjusted under control of the sensing means to move the stop device into a position to arrest movement of the machine releasing means when the sensing means is actuated while the record material is in position to receive data on the last line thereof, a solenoid, connections between the solenoid and the stop device whereby the solenoid withdraws the stop device from the arresting position, and a switch closed by the manipulation of certain ones of said manipulative devices to activate the solenoid.

35. In a machine of the class described, a machine release means, a plurality of manipulative devices for releasing the machine release means, a receptacle for record material, said record material having a plurality of lines for receiving data, a sensing means to sense the record material, a stop device, means adjusted under control of the sensing means to move the stop device into a position to arrest movement of the machine releasing means when the sensing means is actuated while the record material is in position to receive data on the last line thereof, a solenoid, an electric circuit for energizing the solenoid, an element connected to the armature of the solenoid, said element engageable with the stop device so as to move the stop device, a switch in the electrical circuit, and means actuated by certain ones of the manipulative devices to close the switch to energize the solenoid and thereby withdraw the stop device.

36. In a machine of the class described, a machine release means, a plurality of manipulative devices for releasing the machine release means, a receptacle for record material, said record material having a plurality of lines for receiving data, a sensing means to sense the record material, a stop device, means adjusted under control of the sensing means to move the stop device into a position to arrest movement of the machine releasing means when the sensing means is actuated while the record material is in position to receive data on the last line thereof, a solenoid, an electric circuit for energizing the solenoid, an element connected to the armature of the solenoid, said element engageable with the stop device so as to move the stop device, a first switch in the electric circuit, means connected to the stop device to close the first switch when the stop device moves into arresting position, a second switch in said electric circuit, and means actuated by certain ones of the manipulative devices to close the second switch to energize the solenoid after the first switch is closed by the slip device upon moving to arresting position to thereby energize the solenoid to withdraw the switch from its arresting position.

37. In a machine of the class described, a machine release means, a plurality of manipulative devices for releasing the machine release means, a receptacle for record material, said record material having a plurality of lines for receiving data, a sensing means to sense the record material, a stop device, means adjusted under control of the sensing means to move the stop device into a position to arrest movement of the machine releasing means when the sensing means is actuated while the record material is in position to receive data on the last line thereof, a solenoid, an electric circuit for energizing the solenoid, an element connected to the armature of the solenoid, said element engageable with the stop device so as to move the stop device, a first switch in the electric circuit, means connected to the stop device to close the first switch when the stop device moves into arresting position, a second switch in said electric circuit, means actuated by certain ones of the manipulative devices to close the second switch to energize the solenoid after the first switch is closed by the slip device upon moving to arresting position to thereby energize the solenoid to withdraw the switch from its arresting position, and a resilient connection between the stop device and the means adjusted under control of the sensing means whereby the stop device and the last-mentioned means may be moved separately or together.

38. In a machine of the class described, the combination of a plurality of means to record data on a plurality of lines on a plurality of record materials, sensing means coacting with each record material, means controlled by the sensing means when the last line of one of the record materials is in data-recording position, to disable the recording means for the other record material, locking means controlled by the sensing means to lock the machine against operation when the last line has received data, manipulative control devices to unlock the machine after the machine has been locked under control of the sensing means, and means set under control of said manipulative control devices to disable the means controlled by the sensing means to thereby render the locking means ineffective.

39. In a machine of the class described, the combination of a plurality of means to record data on a plurality of lines on a plurality of record materials, sensing means coacting with each record material, means controlled by the sensing means when the last line of one of the record materials is in data-recording position, to disable the recording means for the other record material, locking means controlled by the sensing means to lock the machine against operation when the last line has received data, manipulative control devices to unlock the machine after the machine has been locked under control of the sensing means, a control disk set under control of said manipulative devices, and means controlled by the control disk to disable the means controlled by the sensing means.

40. In a machine of the class described, the combination of a plurality of means to record data on a plurality of lines on a plurality of record materials, sensing means coacting with each record material, means controlled by the sensing means when the last line of one of the record materials is in data-recording position, to disable the recording means for the other record material, locking means controlled by the sensing means to lock the machine against operation when the last line has received data, manipulative control devices to unlock the machine after the machine has been locked under control of the sensing means, a notched control disk settable under control of the said manipulative devices, a feeler for sensing the notched control disk, and means set by the feeler when the feeler senses a notch in the control disk to disable the means controlled by the sensing means.

41. In a machine of the class described, the combination of a plurality of means to record data on a plurality of lines on a plurality of record materials, sensing means coacting with each record material, means controlled by the sensing means when the last line of one of the record materials is in data-recording position, to disable the recording means for the other record material, locking means controlled by the sensing means to lock the machine against operation when the last line has received data, a plurality of function control manipulative devices, means actuated by certain ones of said manipulative control devices to unlock the machine for certain entries after the machine has been locked under control of the sensing means, and means settable under control of said certain manipulative control devices to disable the means controlled by the sensing means.

42. In a machine of the class described, the combination of a plurality of means to record data on a plurality of lines on a plurality of record materials, sensing means coacting with each record material, means controlled by the sensing means when the last line of one of the record materials is in data-recording position, to disable the recording means for the other record material, locking means controlled by the sensing means to lock the machine against operation when the last line has received data, a plurality of function control manipulative devices, means actuated by certain ones of said manipulative control devices to unlock the machine for certain entries after the machine has been locked under control of the sensing means, a control disk set under control of said manipulative device, and means controlled by the control disk to disable the means controlled by the sensing means.

43. In a machine of the class described, the combination of a plurality of means to record data on a plurality of lines on a plurality of record materials, sensing means coacting with each record material, means controlled by the sensing means when the last line of one of the record materials is in data-recording position, to disable the recording means for the other record material, locking means controlled by the sensing means to lock the machine against operation when the last line has received data, a plurality of function control manipulative devices, means actuated by certain ones of said manipulative control devices to unlock the machine for certain entries after the machine has been locked under control of the sensing means, a notched control disk settable under control of said manipulative devices, a feeler for sensing the notched control disk, and means set by the feeler when the feeler senses a notch in the control disk to disable the means controlled by the sensing means.

44. In a machine of the class described, a machine release means, a plurality of manipulative devices for releasing the machine release means, a receptacle for record material, said record material having a plurality of lines for receiving data, a sensing means to sense the record material, a stop device, means adjusted under control of the sensing means to move the stop device into a position to arrest movement of the machine releasing means when the sensing means is actuated while the record material is in position to receive data on the last line thereof, and means set under control of said manipulative control devices to disable the means controlled by the sensing means to thereby render the locking means ineffective.

45. In a machine of the class described, a machine release means, a plurality of manipulative devices for releasing the machine release means, a receptacle for record material, said record material having a plurality of lines for receiving data, a sensing means to sense the record material, a stop device, means adjusted under control of the sensing means to move the stop device into a position to arrest movement of the machine releasing means when the sensing means is actuated while the record material is in position to receive data on the last line thereof, a control disk set under control of said manipulative device, and means controlled by the control disk to disable the means controlled by the sensing means.

46. In a machine of the class described, a machine release means, a plurality of manipulative devices for releasing the machine release means, a receptacle for record material, said record material having a plurality of lines for receiving data, a sensing means to sense the record material, a stop device, means adjusted under control of the sensing means to move the stop device into a position to arrest movement of the machine releasing means when the sensing means is actuated while the record material is in position to receive data on the last line thereof, a notched control disk settable under control of the said manipulative devices, a feeler for sensing the notched control disk, and means set by the feeler when the feeler senses a notch in the control disk to disable the means controlled by the sensing means.

47. In a machine of the class described, the combination of a record-receiving table, sensing means to sense the position of records on the table, means, including a coupling pawl, for locking the machine when the sensing means senses the record material when the record material is in a position to receive an entry on the last line thereof, manipulative control devices, and means set under control of certain of said manipulative control devices to disable the coupling pawl to render the second-named means ineffective.

48. In a machine of the class described, the combination of a record-receiving table for receiving record material in a plurality of line-printing positions, sensing means to sense the line-printing position of the record material on the table, a machine release locking device, normally ineffective means to move the locking device into locking position, a spring-urged coupling pawl movable into engagement with one element of means to move the locking device into locking position, power-operated means to move the coupling pawl after the coupling pawl has been engaged with the said one element to thereby move the locking device into locking position, and means adjusted by the sensing device when the sensing device is operated with the record material in position to receive a record on the last line thereof to release the coupling pawl to engage said one element.

49. In a machine of the class described, the combination of a record-receiving table for receiving record material in a plurality of line-printing positions, sensing means to sense the line-printing position of the record material on the table, a machine release locking device, normally ineffective means to move the locking device into locking position, a spring-urged coupling pawl movable into engagement with one element of means to move the locking device into locking position, power-operated means to move the coupling pawl after the coupling pawl has been engaged with the said one element to thereby move the locking device into locking position, a segment normally engaging the coupling pawl to maintain the coupling pawl out of engagement with said one element, and connections between the segment and the sensing means whereby the segment is withdrawn from engagement with the coupling pawl when the sensing means is moved while the record material is in position to receive an entry on the last line thereof, to thereby release the coupling pawl to move into engagement with said one element.

50. In a machine of the class described, the combination of a record-receiving table for receiving record material in a plurality of line-printing positions, sensing means to sense the line-printing position of the record material on the table, a machine release locking device, normally ineffective means to move the locking device into locking position, a spring-urged coupling pawl movable into engagement with one element of means to move the locking device into locking position, power-operated means to move the coupling pawl after the coupling pawl has been engaged with the said one element to thereby move the locking device into locking position, means adjusted by the sensing device when the sensing device is operated with the record material in position to receive a record on the last line thereof to release the coupling pawl to engage said one element, manipulative control devices, and means controlled by certain of the manipulative control devices to engage the coupling pawl to maintain the coupling pawl out of engagement with said one element.

51. In a machine of the class described, the combination of a record-receiving table for receiving record material in a plurality of line-printing positions, sensing means to sense the line-printing position of the record material on the table, a machine release locking device, normally ineffective means to move the locking device into locking position, a spring-urged coupling pawl movable into engagement with one element of means to move the locking device into locking position, power-operated means to move the coupling pawl after the coupling pawl has been engaged with the said one element to thereby move the locking device into locking position, a segment normally engaging the coupling pawl to maintain the coupling pawl out of engagement with said one element, connections between the segment and the sensing means whereby the segment is withdrawn from engagement with the coupling pawl when the sensing means is moved while the record material is in position to receive an entry on the last line thereof, to thereby release the coupling pawl to move into engagement with said one element, manipulative control devices, and means controlled by certain of the manipulative control devices to engage the coupling pawl to maintain the coupling pawl out of engagement with said one element.

52. In a machine of the class described, the combinatione of a record-receiving table for receiving record material in a plurality of line-printing positions, sensing means to sense the line-printing position of the record material on the table, a machine release locking device, normally ineffective means to move the locking device into locking position, a spring-urged coupling pawl movable into engagement with one element of means to move the locking device into locking position, power-operated means to move the coupling pawl after the coupling pawl has been engaged with the said one element to thereby move the locking device into locking position, means adjusted by the sensing device when the sensing device is operated with the record material in position to receive a record on the last line thereof to release the coupling pawl to engage said one element, manipulative control devices, a notched control disk differentially positioned under control of said manipulative control devices, a feeler mechanism for feeling for the notches in the notched control disk, and a blocking means moved into engagement with the coupling pawl when the feeler enters a notch in the control disk to maintain the coupling pawl out of engagement with said one element.

53. In a machine of the class described, the combination of a record-receiving table for receiving record material in a plurality of line-printing positions, sensing means to sense the line-printing position of the record material on the table, a machine release locking device, normally ineffective means to move the locking device into locking position, a spring-urged coupling pawl movable into engagement with one element of means to move the locking device into locking position, power-operated means to move the coupling pawl after the coupling pawl has been engaged with the said one element to thereby move the locking device into locking position, a segment normally engaging the coupling pawl to maintain the coupling pawl out of engagement with said one element, connections between the segment and the sensing means whereby the segment is withdrawn from engagement with the coupling pawl when the sensing means is moved while the record material is in position to receive an entry on the last line thereof, to thereby release the coupling pawl to move into engagement with said one element, manipulative control devices, a notched control disk differentially positioned under control of said manipulative control devices, a feeler mechanism for feeling for the notches in the notched control disk, and a blocking means moved into engagement with the coupling pawl when the feeler enters a notch in the control disk to maintain the coupling pawl out of engagement with said one element.

References Cited in the file of this patent

UNITED STATES PATENTS

| | | |
|---|---|---|
| 1,814,178 | Muller | July 14, 1931 |
| 2,016,709 | Eichenauer | Oct. 8, 1935 |
| 2,157,980 | Daubmeyer | May 9, 1939 |
| 2,353,938 | Spurlino et al. | July 18, 1944 |
| 2,373,510 | Spurlino et al. | Apr. 10, 1945 |
| 2,467,704 | Spurlino | Apr. 19, 1949 |
| 2,616,623 | Goodbar | Nov. 4, 1952 |